United States Patent
Gerszberg et al.

(10) Patent No.: US 6,452,923 B1
(45) Date of Patent: Sep. 17, 2002

(54) CABLE CONNECTED WAN INTERCONNECTIVITY SERVICES FOR CORPORATE TELECOMMUTERS

(75) Inventors: Irwin Gerszberg, Kendell Park; Jeffrey S. Martin, Dover; Philip Andrew Treventi, Murray Hill; Hopeton S. Walker, Haledon; Edward L. Wallace, South Orange, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/224,288

(22) Filed: Dec. 31, 1998

(51) Int. Cl.[7] .............................. H04L 12/66; H04J 3/16
(52) U.S. Cl. .................. 370/352; 370/466; 370/468; 379/114.21
(58) Field of Search .................. 370/230, 235, 370/270, 276, 352, 389, 400, 401, 466, 468, 467; 725/31, 82, 103, 114; 379/219, 114.03, 114.05, 114.21; 707/250, 220, 229; 705/8, 9, 10

(56) References Cited

U.S. PATENT DOCUMENTS

| | | | |
|---|---|---|---|
| 4,654,868 A | | 3/1987 | Shelley |
| 5,475,740 A | | 12/1995 | Biggs, Jr. et al. |
| 5,610,910 A | | 3/1997 | Focsaneanu et al. |
| 5,758,288 A | | 5/1998 | Dunn et al. |
| 5,774,802 A | | 6/1998 | Tell et al. |
| 5,953,344 A | * | 9/1999 | Dail et al. .................. 370/443 |
| 5,999,207 A | | 12/1999 | Rodriguez et al. |
| 5,999,612 A | * | 12/1999 | Dunn et al. .................. 379/212 |
| 6,012,100 A | * | 1/2000 | Frailong et al. ............. 709/250 |
| 6,026,158 A | | 2/2000 | Bayless et al. |
| 6,028,918 A | * | 2/2000 | Lehmacher et al. ......... 379/114 |
| 6,240,091 B1 | * | 5/2001 | Ginzaboorg et al. ........ 370/401 |

* cited by examiner

Primary Examiner—Alpus H. Hsu
Assistant Examiner—Duc Ho

(57) ABSTRACT

A twisted pair and/or coaxial cable fed, integrated residence gateway controlled set-top device provides a plurality of services. One service is lifeline service which may be provided over the coaxial cable via a cable modem of the integrated residence gateway or over the twisted pair facility. An integrated residence gateway is coupled to either or both of the coaxial cable or twisted pair and distributes the bandwidth facilities available over either service vehicle to customer devices including a set top box. For corporate telecommuters who work from home, a greater variety of services is available. The greater bandwidth of the cable network allows for the faster exchange of information between home and office, allowing the employee working at home to function as if he or she were actually at the office. Individual pieces of equipment connected to the telecommuter's home may be addressed, so that phone and message forwarding may be properly forwarded to the telecommuter's home. Dynamic allocation of the bandwidth available on the cable network allows cable head ends to provide multiple tiers, or levels, of service such that the higher service tiers are less likely to lose bandwidth when traffic increases. Advanced billing options automatically bill the employer for costs associated with telephone calls placed from the telecommuter's home.

13 Claims, 34 Drawing Sheets

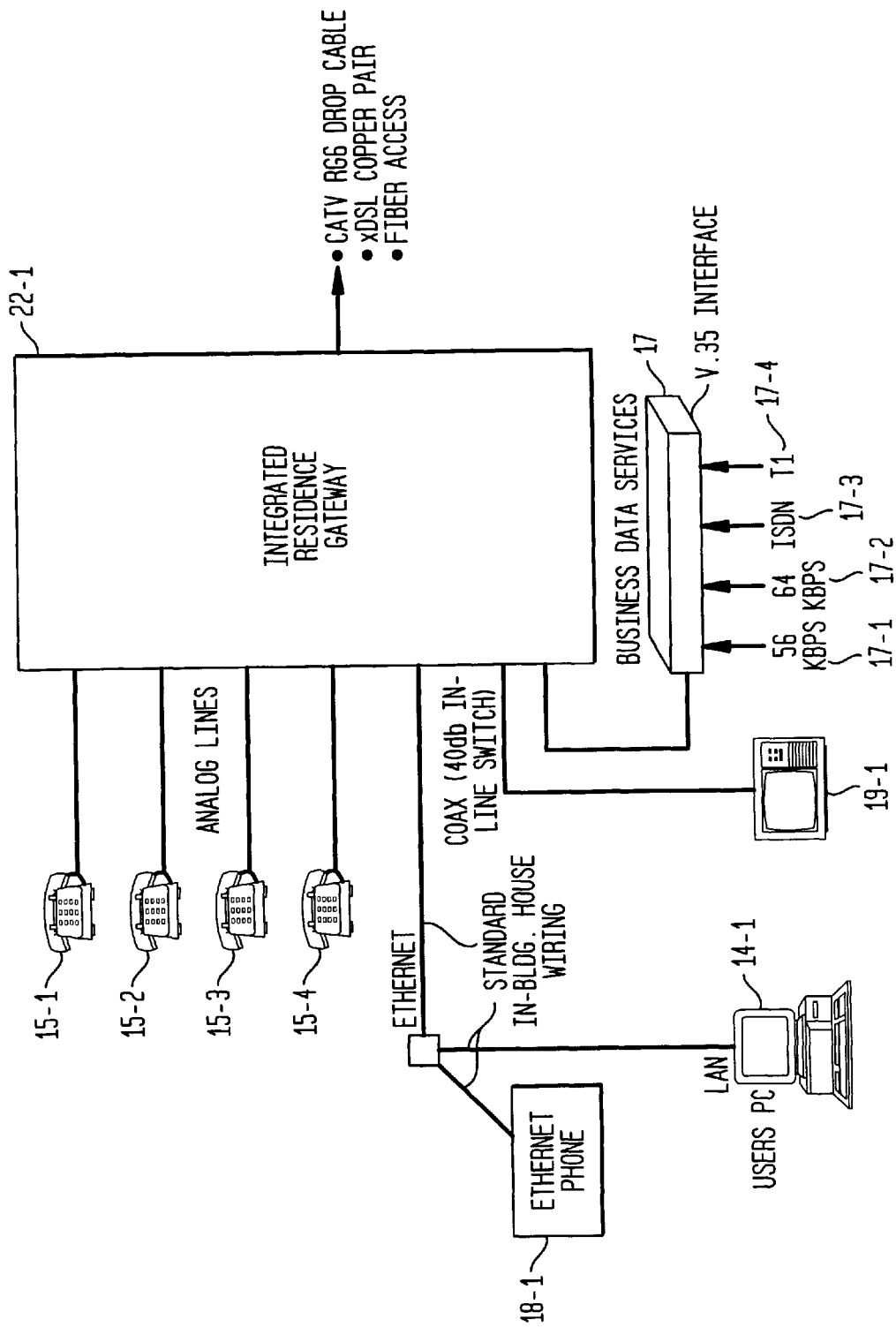

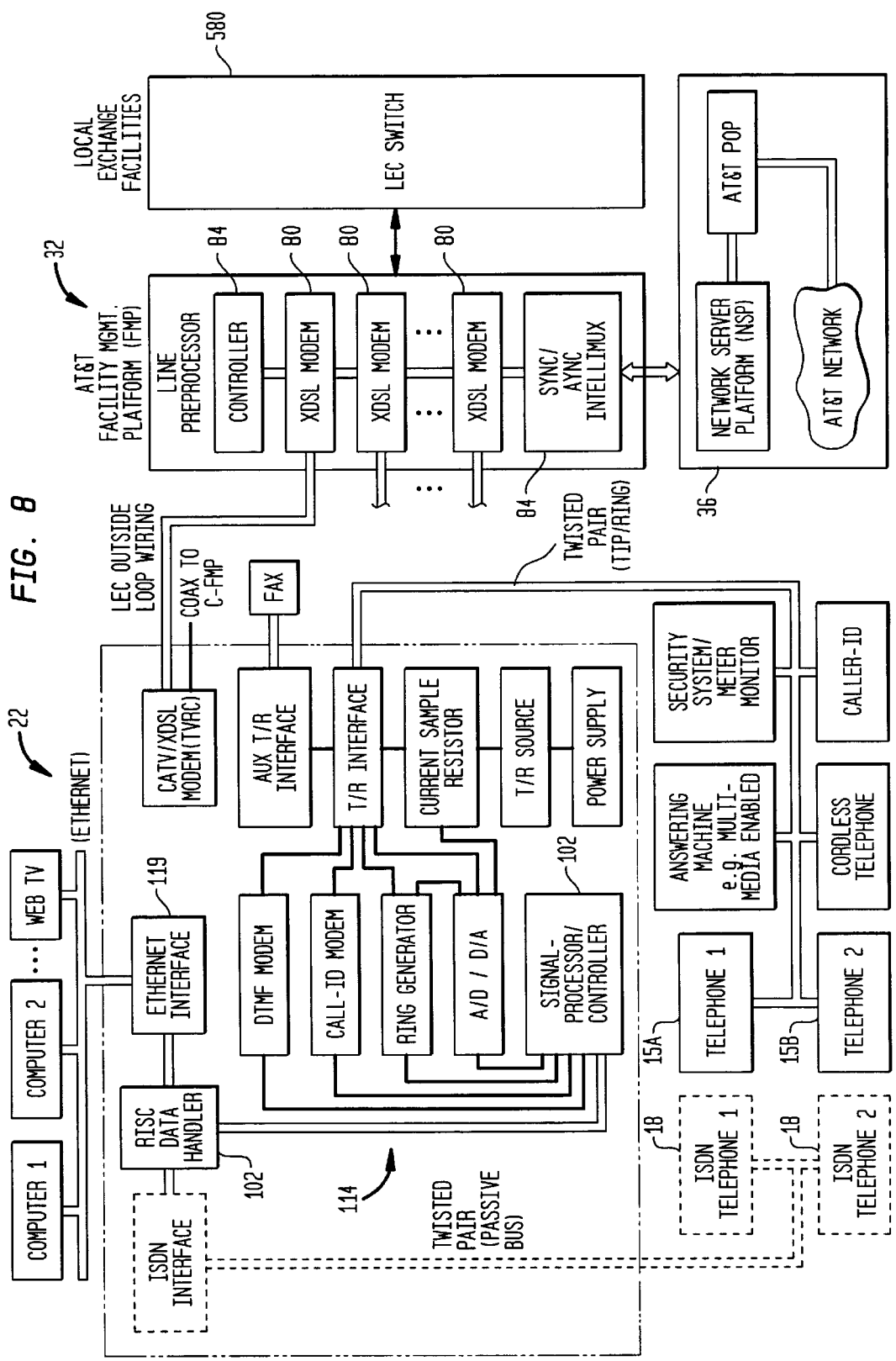

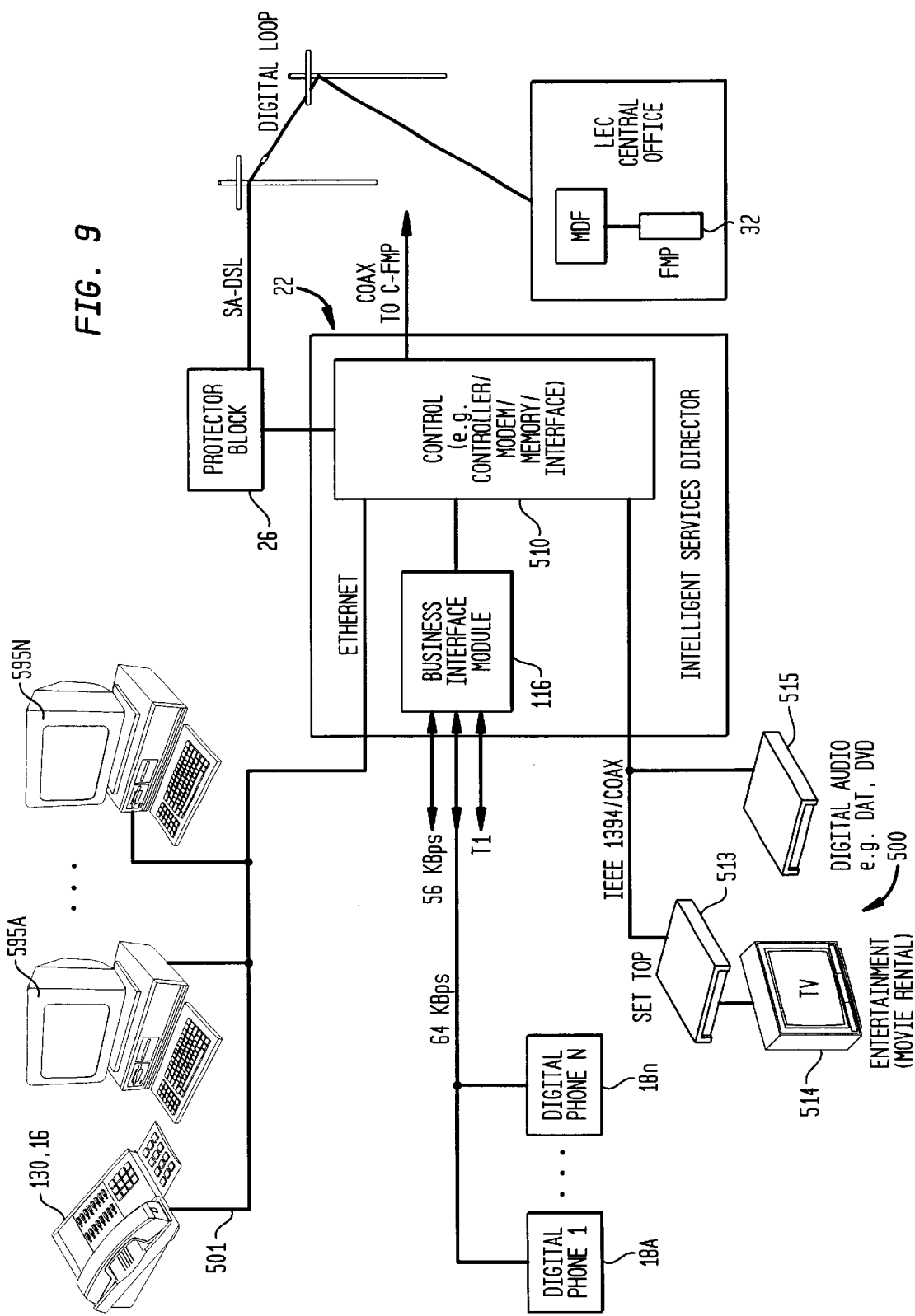

FIG. 17
FIG. 18
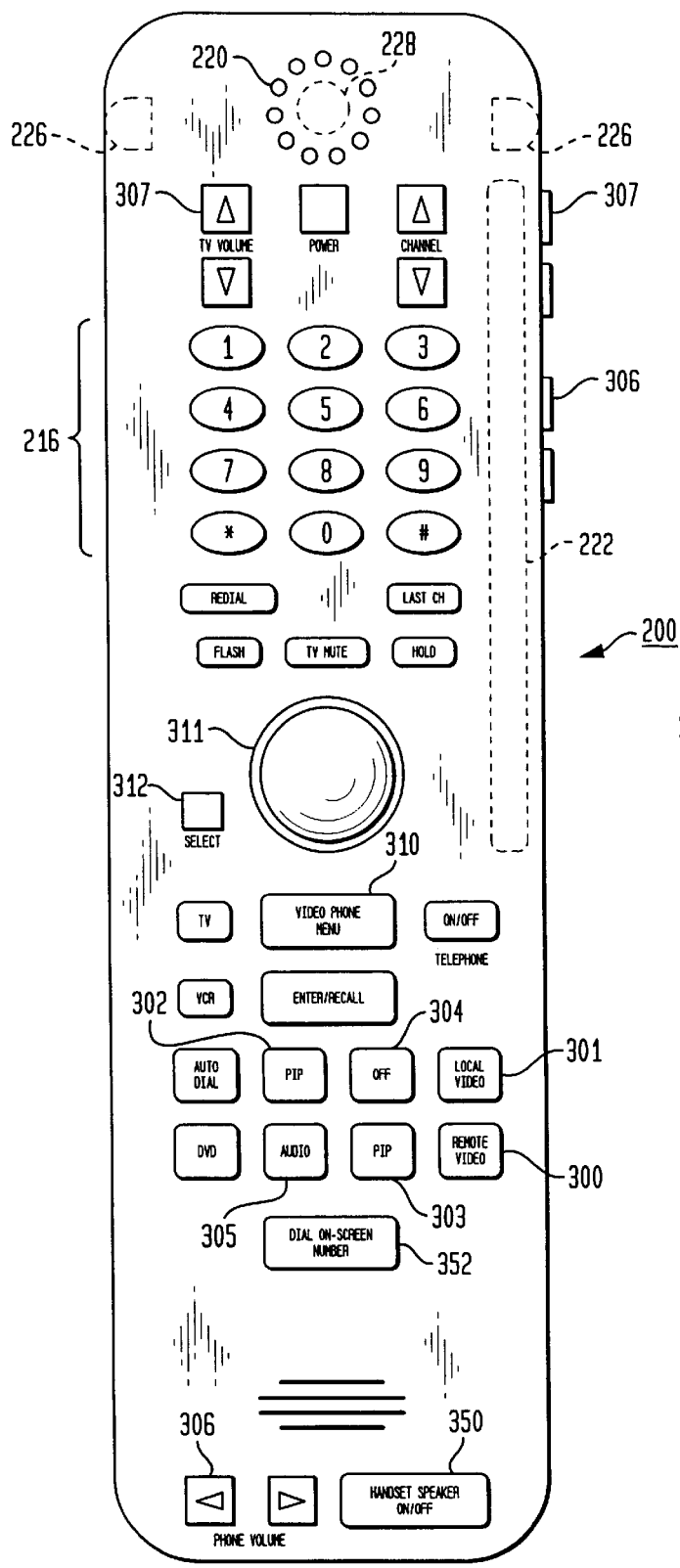
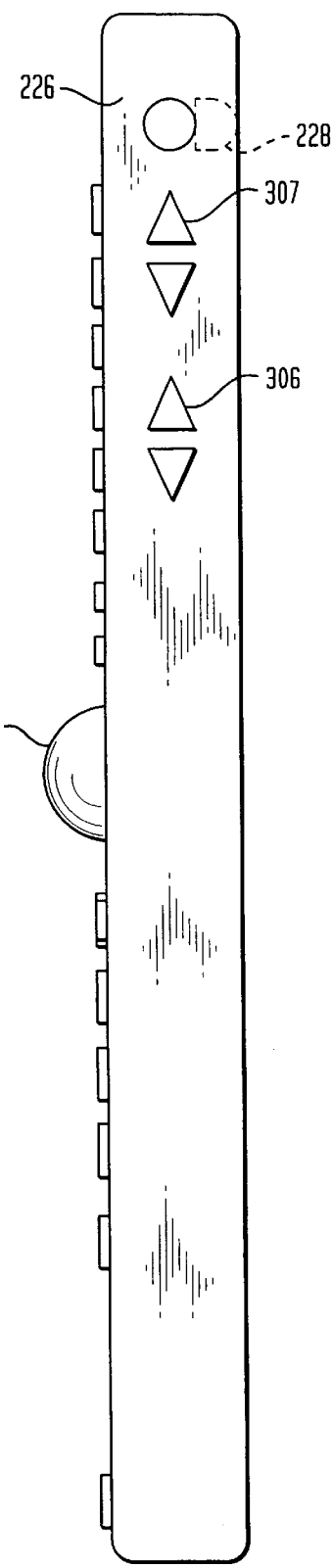

FIG. 26

| CABLE NETWORK ADDRESS | LOCAL ADDRESS | SENDER ADDRESS INFO |

DATA

FIG. 27

| CPE | CODE |
|---|---|
| WORK PHONE | 10 |
| WORK FAX | 20 |
| WORK COMPUTER | 30 |
| PERSONAL COMPUTER | 40 |

FIG. 28A

| IRG 1 | IRG 2 | IRG 3 | IRG 4 | IRG 5 |

FIG. 28B

| IRG 1 | IRG 2 | IRG 3 | IRG 4 | IRG 5 | IRG 6 | IRG 7 | IRG 8 |

FIG. 28C

| IRG 1 | IRG 2 | IRG 3 | IRG 4 |

FIG. 28D

| IRG 1 | IRG 2 | IRG 3 | IRG 4 | IRG 5 | IRG 6 |

FIG. 31

Reverse Billing Database for Calls Placed to: (301)555-1223

| From | Time | Duration | PIN | Third Party Bill |
|---|---|---|---|---|
| (301)555-4444 | 9am-5pm | 0:15 | XXXX | N/A |
| [Cable Network][CPE] | M-F | | | |
| (301)555-3774 | Any | Any | XXXX | (202)555-9933 |
| [Cable Network][CPE] | | | | | ns
CABLE CONNECTED WAN INTERCONNECTIVITY SERVICES FOR CORPORATE TELECOMMUTERS

FIELD OF THE INVENTION

The invention relates generally to telephone communication systems and, more particularly, to a local house or feeder to a house network architecture using a hybrid optical fiber and twisted pair and/or coaxial cable connected multiplexing device. The invention relates more specifically to a system and method for providing additional services and security for governments, corporations, law firms, and others who employ individuals wishing to conduct business from home.

BACKGROUND

As deregulation of the telephone industry continues and as companies prepare to enter the local telephone access market, there is a need to offer new and innovative, high bandwidth services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange carrier company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

Another opportunity is for the interexchange carrier to employ wireless means of reaching the local telecommunications service subscriber. In copending U.S. patent application Ser. No. 09/001,363, filed Dec. 31, 1997, entitled "ISD Wireless Network", it was suggested to provide a wireless integrated service director for communicating with wireless subscriber apparatus. Also, from other U.S. Patent applications, for example, in "Circuit-Switched Switching System" U.S. Pat. No. 5,978,370, issued Nov. 2, 1999, it is known to provide satellite or other wireless connections directly to the local subscriber, thus bypassing the local network and the local telephone company.

Yet another opportunity for bypassing the local telephone company is the provision of telecommunications services over known coaxial cable or hybrid optical fiber coaxial cable television transmission systems utilizing cable television spectrum in the downstream (toward the subscriber) and upstream (toward the cable television headend) paths for such services. For example, Times Warner has been experimenting with the provision of telecommunications services to and among cable television service subscribers in various geographic regions of the country with marginal success.

As part of this system, there is a need for improved architectures, services and equipment utilized to distinguish the interexchange companies' products and services.

Additionally, the previous dependence on local telephone exchanges for communication connectivity is a hinderance to employees who work from home, or "telecommuter". Typically, an employee's telephone service is connected via a twisted pair connection, which offers limited bandwidth and places dependence upon the telephone companies. The telephone company "middleman" and limited bandwidth significantly reduce the amount of data that can be transmitted to the employee at any one time, and as such, it is impossible for the employee at home to function with the same efficiency as at work. Therefore, there is a need for connectivity between a user (i.e., an employee) and an external server (i.e., an office server) that can provide greater bandwidth for a more seamless connection between home and office. With the greater bandwidth, it would be possible to offer the employee numerous services that would allow the employee to function as if he or she were located at the office.

SUMMARY OF THE INVENTION

In order to provide an improved network, it is desirable for the interexchange companies to have access to at least one of the twisted-pair lines, coaxial cable, hybrid fiber facilities with either twisted pair or coaxial cable or alternate wireless facility connecting each of the individual users to the local cable television or toll telephone or hybrid network before the lines are routed through the conventional local telephone network equipment. It is preferable to have access to these lines in a manner such that the interexchange companies can offer customized services such that the companies may differentiate their services. For example, an interexchange company may provide higher bandwidth, improved capabilities of the customer premises equipment, and lowered overall system costs to the customer by providing competitive service alternatives.

In one embodiment of the present invention, the interexchange carrier may obtain access to the coaxial cable feeding subscribers to existing cable television services, for example, at a subscriber tap, in and/or after a fiber/coaxial cable hub or node in a hybrid fiber coaxial cable television distribution plant. Alternatively, the interexchange carrier may ultimately provide services via the optical fiber leaving the cable television headend. The cable television set top terminal may comprise a telecommunications apparatus plain old telephone services, high speed Internet services, video conference services, directory services, multimedia services or other digital services depending on subscriber requirements and capabilities. Alternatively, a separate cable modem connected intelligent terminal may provide these services and capabilities.

A new architecture for providing such services may utilize a video phone and/or other devices to provide new services to an end user; a residence gateway which may be an integrated residence gateway (IRG) disposed near the customer's premises for multiplexing and coordinating many digital services onto a single twisted-pair line or coaxial cable (or both); a cable facilities management platform (C-FMP) disposed remote from or in the local telephone network's central office, the subscriber loop or the coaxial cable distribution plant for routing data to an appropriate interexchange company network; and a network server platform (NSP) coupled to the C-FMP for providing new and innovative services to the customer and for distinguishing services provided by the interexchange companies from those services provided by the local telephone network.

Aspects of the invention is the greater array of features available to the employee who wishes to work from home. By using a cable network connection, it is possible for the employee to bypass the local telephone exchange in connecting to the office server, as well as take advantage of the greater bandwidth available on the cable network. Dynamic allocation of the bandwidth on the cable network provides greater flexibility in the range of services offered by the head end, and may allow corporate telecommuters to purchase guaranteed bandwidth to ensure a quality connection even during peak periods of use. The system used to implement and control this available bandwidth also allows for a new and exciting variety of services which will allow the telecommuters to more seamlessly work from home. Such services include individual addressability of pieces of equipment connected to the telecommuters's home, call and message forwarding to specific pieces of equipment, and automatic billing so that costs incurred while working from home are automatically billed to the employer.

While an exemplary cable architecture is shown, it will be understood, of course, that the invention is not limited to the embodiments disclosed in this application and the other applications herein incorporated by reference. Modifications may be made by those skilled in the art, particularly in light of the teachings contained herein. It is, therefore, intended that the appended claims cover any such modifications which incorporate the features of these invention or encompass the true spirit and scope of the invention. For example, each of the elements and/or steps of described in the aforementioned embodiments may be utilized alone or in combination with other elements and/or steps from other embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 1E illustrates an expanded view of a residence architecture for enhanced CATV/telephony services.

FIGS. 8–10 are various embodiments of the ISD/IRG.

FIGS. 17–18 show a remote control for use in the above systems.

FIG. 26 shows an example of a packet structure for use on a cable network.

FIG. 27 shows an example of a table of predefined categories of equipment connectable to the ISD/IRG.

FIGS. 28a–d show exemplary bandwidth allocations that may be used with the ISD/IRG.

FIG. 31 shows an exemplary database entry for billing features.

DETAILED DESCRIPTION OF PREFERRED EMBODIMENTS

Figure 1A:
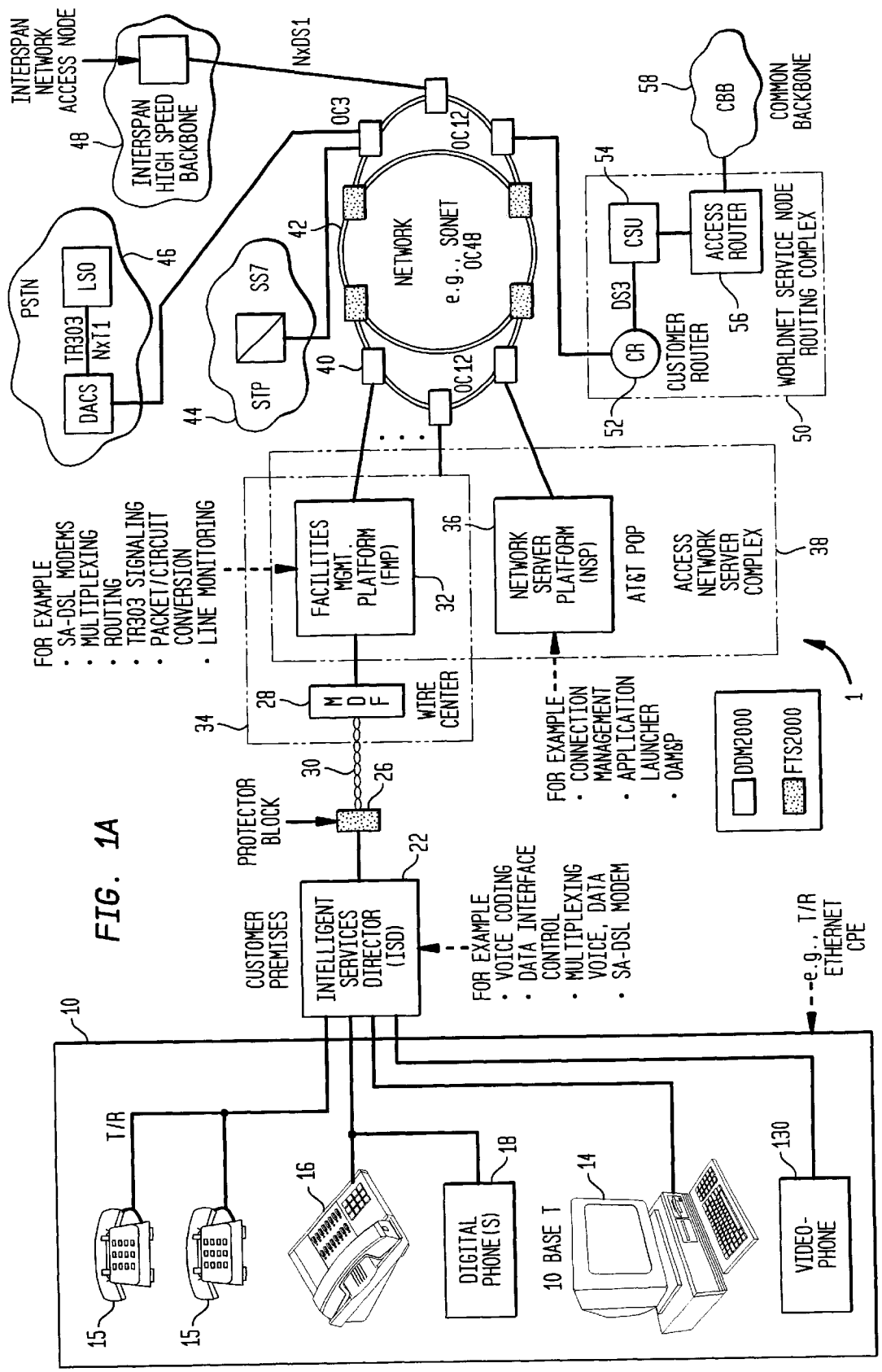
FIG. 1A illustrates an embodiment of a hybrid fiber twisted pair local loop architecture.

Referring to FIG. 1A, a first exemplary communication network architecture employing a hybrid fiber, twisted-pair (HFTP) local loop 1 architecture is shown. This network and an intelligent service director controlled set-top box are already described by U.S. patent application Ser. No. 09/001,424, entitled "ISD Controlled Set-Top Box" filed Dec. 31, 1997, other applications therein incorporated by reference, and portions of that description are repeated here by way of introduction to a related integrated architecture, which will be described with reference to FIGS. 1B–1E. Similar reference numerals are used throughout to denote similar elements.

Figure 1B:
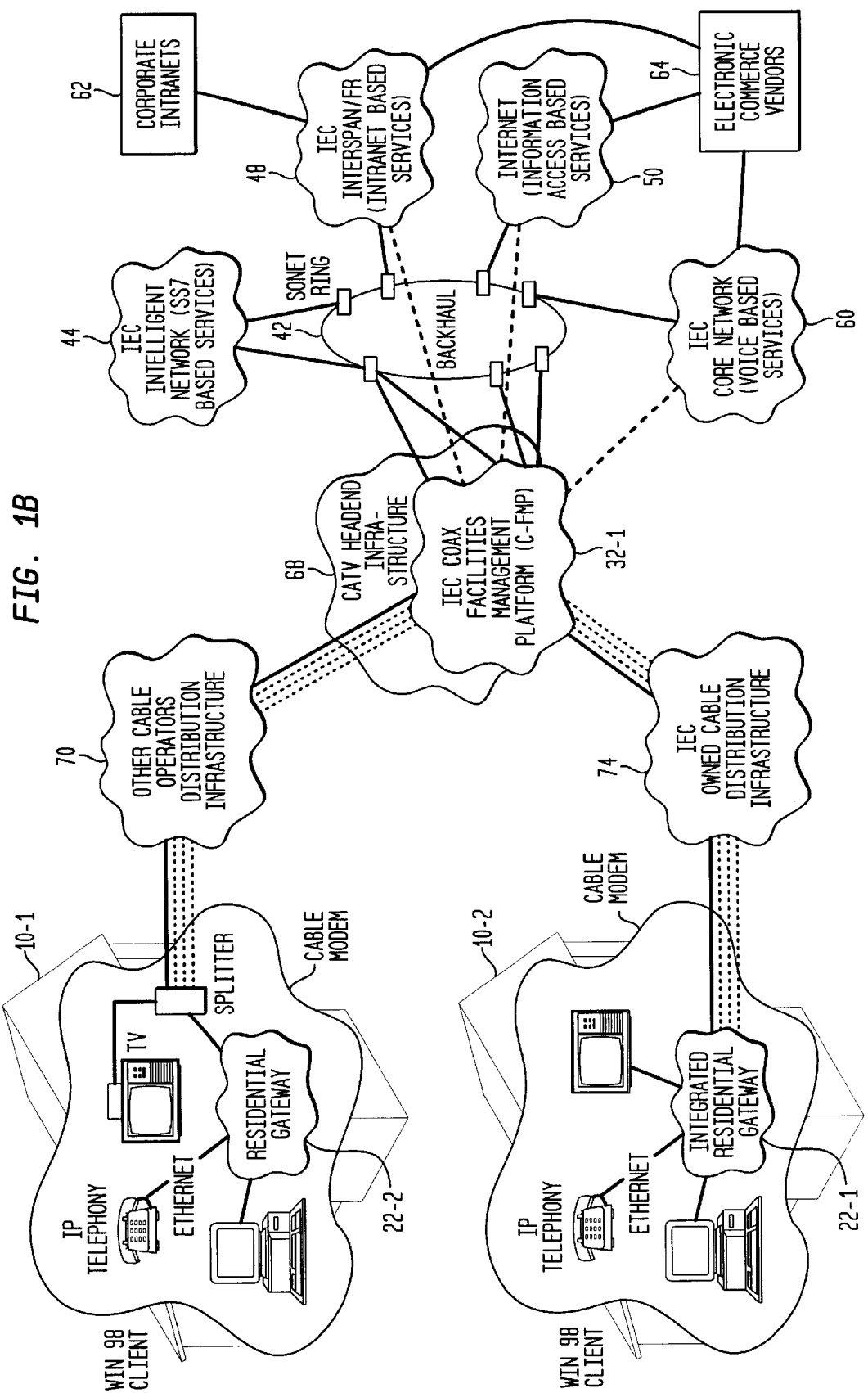
FIG. 1B illustrates alternative arrangements wherein an interexchange carrier may access a subscriber premises via an inter-exchange carrier owned or another cable television company.

According to FIG. 1A, an intelligent services director (ISD) 22 may be coupled to a telephone central office 34 via a twisted-pair wire, hybrid fiber interconnection, wireless and/or other customer connection 30, a protector block 26, a main distribution frame (MDF) 28, and/or a tap, node, hub, and/or headend. Referring briefly to FIG. 1B, and according to the present invention, the ISD 22 may be configured as an integrated residential gateway (IRG) 22, 22-1. The ISD/IRG may be alternatively configured in a first configuration, such as when an interexchange carrier partners with a cable television service provider, or in a second configuration, such as when an interexchange carrier is integrated with the cable television service provider. FIG. 1B shows exemplary embodiments of various cable operator's distribution infrastructure 70 or interexchange carrier (IXC) owned infrastructure 74 connected to a CATV headend infrastructure 68. In exemplary embodiments the CATV headend infrastructure may include an inter-exchange carrier coaxial Cable Facilities Management Platform 32-1. Per FIG. 1B, the CATV headend 68 may be alternatively configured such as by being connected to a backhaul high-speed optical network (e.g., a SONET ring 42) and/or to various alternative service networks including but not limited to IXC SS-7 based services 44, ATM, interspan, frame relay services 48 (to corporate intranets 62), frame relay 48, Internet service cloud 50 or IXC core network 60, electronic commerce vendors 64, and other suitable services.

Wireless communication in FIGS. 1A–1B may be via land-based intelligent base stations or by satellite. The ISD/IRG 22 and the telephone central or local office and/or cable head-end 34 may communicate with each other using, for example, framed, time division, frequency-division, synchronous, asynchronous and/or spread spectrum formats, but in exemplary embodiments uses DSL and/or QAM modem technology. In exemplary embodiments, the central office/cable head-end 34 may include a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A) and/or a cable modem such as a QAM based modem. The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46. The digitization of the POTS data may occur in the ISD/IRG and/or elsewhere in the network such as at the head-end. It may be preferable to digitize the data at the ISD/IRG 22, transmit the data over the connection 30 to the head-end, route the data to the appropriate port at the head-end, and then either directly or indirectly to a PSTN. In some configurations it may be desirable to convert the data back to analog form before outputting it to the PSTN. However, by properly encoding the data, it is possible to configure the digital data such that it may be input directly into the PSTN network such as when telephony over ATM is utilized.

As will be discussed in connection with FIGS. 1B–1E, alternate configurations of the above architectures are discussed particularly with regard to the applicability of the present architectures to hybrid fiber/twisted pair facilities is via hybrid fiber/coaxial cable facilities of a cable television service provider. Such an arrangement may bypass the local subscriber loop and the local telephone switching central office or wire center 34 altogether. There are several varieties of hybrid fiber coaxial cable distribution facilities. In one embodiment, optical fiber is provided to curb; that is, the optical fiber reaches the subscriber tap where from the tap, coaxial cable is "dropped" or provided via an underground pedestal to the customer premises. In another embodiment, fiber reaches an active amplifier chain for providing downstream services to several thousand subscribers, which may receive service via fiber, twisted pair, and/or fiber interconnections. In yet another embodiment, fiber reaches a plurality of microcells of customer premises which can be served by passive (rather than active) devices. Referring briefly to FIGS. 1-C and 1-D, a cable facilities management platform (C-FMP) e.g., 32-1, 32-2, 32-3, in such alternative embodiments, may be located at the telephone central office, a cable television headend (as per FIG. 1-B) or in the cable television signal distribution plant, for example, at a fiber/coax node, hub, or tap.

Referring again to FIG. 1A, the FMP/C-FMP 32 may process data and/or analog/digitized voice between customer premise equipment (CPE) 10 and any number of networks. For example, the FMP/C-FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks. Similarly, referring to FIG. 1C, remote C-FMP 32-2, C-FMP 32-1 and a network server platform 36 may be connected to SONET, for example, using an OC48 ring 42 with ports 40 for connection to telephony out-of-band signaling SS7 network 44, ATM cloud 76 or Internet network 78, frame relay networks, interworked networks and/or other networks (not shown).

Figure 1C:
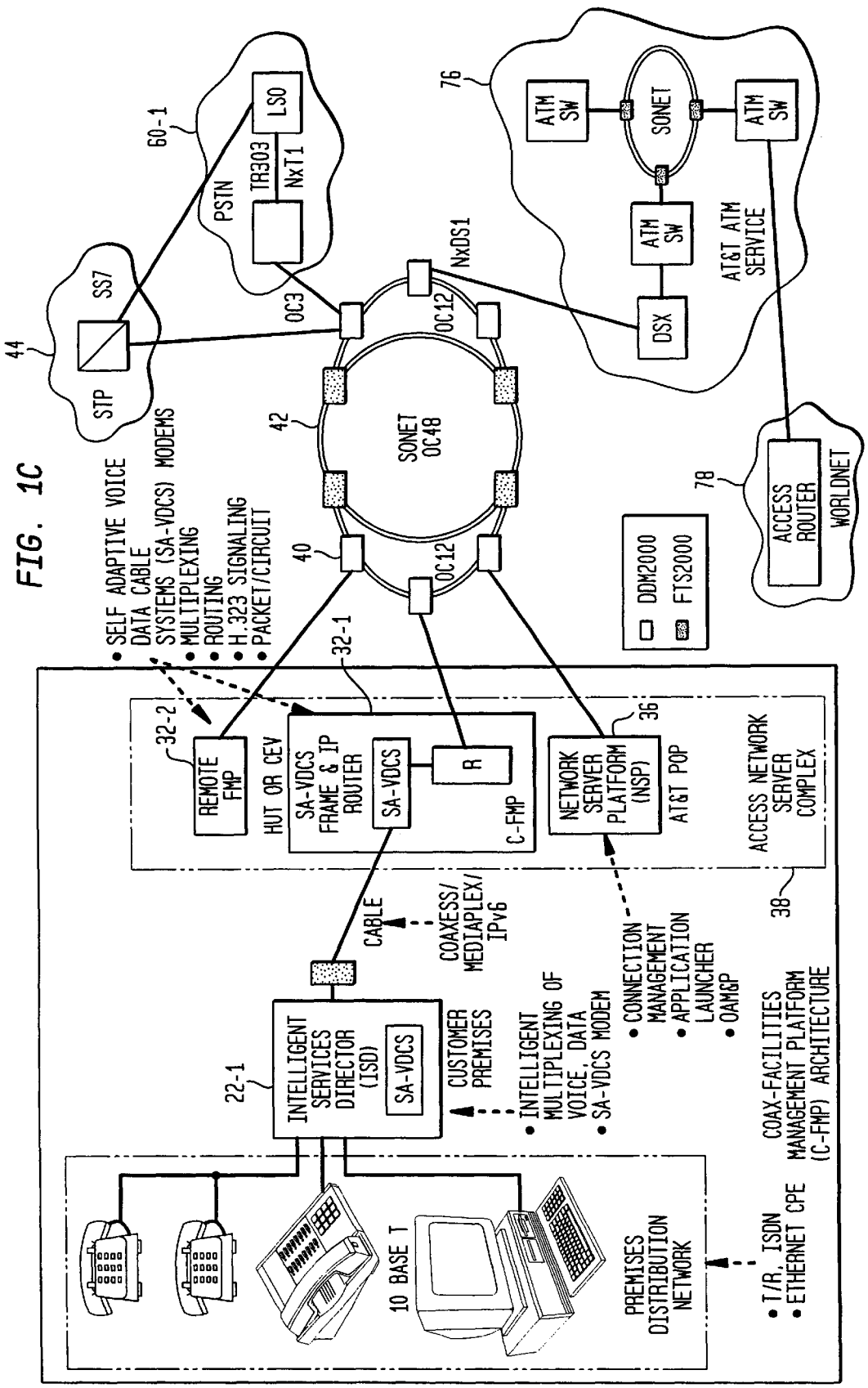
FIG. 1C illustrates an embodiment of FIG. 1B where an integrated residence gateway and coaxial cable facilities management platform (C-FMP) provide enhanced residence services via hybrid fiber coaxial cable distribution plant access.

In either FIG. 1A or FIG. 1C, the NSP 36 may provide a massive cache storage for various information that may be provided across the SONET net 42 to the FMP 32 of C-FMP 32-1 and out to the ISD/IRG 22 (FIG. 1A) or residential gateways 22-1 or 22-2 FIG. 1-B). The NSP 36 and the FMP/C-FMP 32 or C-FMP 32-1 may collectively define an access network server complex 38. The NSP 36 may be interconnected with multiple FMPs/C-FMP's 32. Furthermore, each FMP/C-FMP 32 may interconnect with one or more ISDs/IRGs 22. The NSP 36 may be located anywhere but is preferably located in a point-of-presence (POP) facility. The NSP 36 may further act as a gateway to, for example, any number of additional services.

The ISD/IRG 22, 22-1 (FIGS. 1C, 1E) may be interconnected to various devices such as a videophone 130, other digital phones 18 (including Ethernet phones), set-top devices (not shown), computers 14, and/or other devices 15, 16 comprising the customer premise equipment 10. Per FIG. 1E, the IRG 22-1 may be coupled with a plurality of analog lines 15-1 to 154. The IRG 22-1 may also be coupled to a business data services interface 17, for example, using one or more V. 35 interfaces and/or cable interfaces, for providing various digital bandwidth services such as an 56 Kbps service 17-1, Ethernet, 64 Kbps service 17-2, ISDN service 17-3 and T1 (1.544 Megabps service) 17-4. In exemplary embodiments, a separate Ethernet link may serve an Ethernet telephone 18-1 and the user's personal computer local area network including PC 14-1 provided, for example, via telephone house wiring. The user's television 19-1 and other coaxial cable fed devices may be connected to CATV and/or enhanced services via in-house coaxial cable.

The customer premise equipment 10 may individually or collectively serve as a local network computer at the customer site. application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 or C-FMP 32-1 and thereafter to the NSP 36 for reinitialization and downloading of new applets. Alternatively, the NSP 36 may automatically update any of the CPE 10 to install updated applets. To ensure widespread availability of the new features made possible by the present architecture, the customer premise equipment 10 may be provided to end users either at a subsidized cost or given away for free, with the cost of the equipment being amortized over the services sold to the user through the equipment.

Figure 1D:
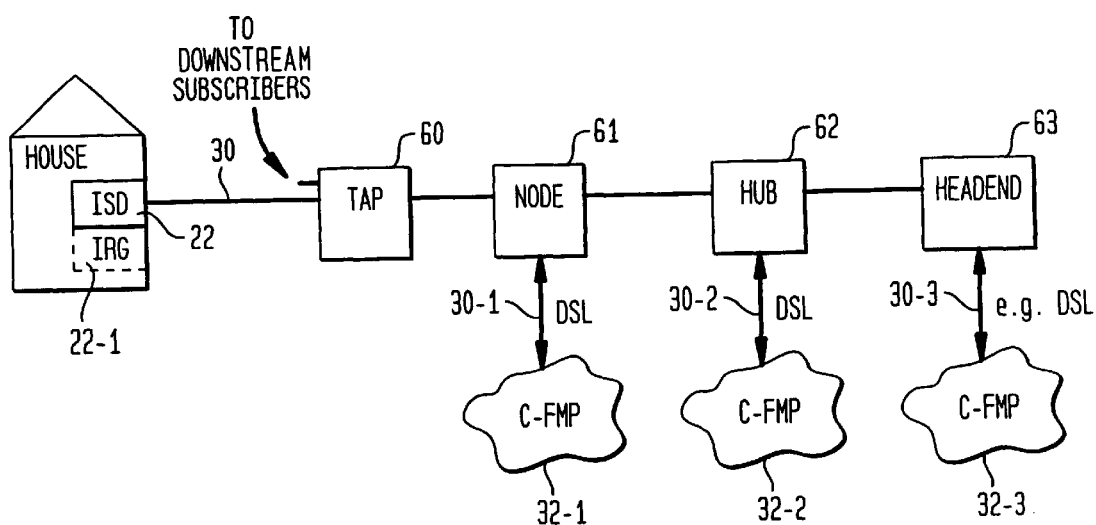
FIG. 1D illustrates an embodiment of a hybrid fiber coaxial cable local loop architecture that shows when the C-FMP may connect within the architecture of FIG. 1B or FIG. 1C.

Referring to FIG. 1D, as with the other figures, similar reference characters are utilized to denote similar elements. While a house is depicted, any customer premises, multi-dwelling unit, and/or other premise may be utilized, for example, a personal residence, a multiple dwelling unit or a small or large business premises. In many such situations, the intelligent services director (ISD) 22 or integrated residence gateway 22-1 introduced above may be mounted to the side of the premises, in an accessible wire closet inside the premises or in the basement among other places discussed herein. In a cable television arrangement, facility 30 coupling tap 60 to a premises is typically a coaxial cable or may comprise a CommScope or other cable manufacturer headend cable that comprises both coaxial cable and twisted pairs, for example, the CommScope 3-22 which provides three 22 gauge audio/twisted pair in addition to a coaxial cable television drop. Power also may be fed down the drop to power the ISD 22. Likewise the facility from node 61 to tap 60 may comprise such a coaxial cable facility or, in a fiber to the curb arrangement, may comprise optical fiber. Similarly, the facility linking hub 62 and node 61 may comprise an optical fiber or a coaxial cable. In a hybrid fiber coaxial cable arrangement the facility connecting headend 63 and hub 62 is typically an optical fiber and in a conventional cable television system comprises a coaxial cable. Architectures contained herein may be utilized in accordance with any of the configurations described with regard to FIG. 1D.

As shown in FIG. 1D, the C-FMP 32-1 may be connected to a node 61 of a hybrid fiber coaxial cable plant typically with coaxial cable in and out of the node and where active amplifier or passive devices are provided for providing service to downstream subscribers. A C-FMP 32-2 may be connected to a hub 62 of a hybrid fiber coaxial cable television plant where the fiber typically terminates and the coaxial cable link to a plurality of subscribers (not shown) begins. Also, a C-FMP 32-3 is shown coupled to the cable television headend 63 where cable television service for a geographic region over a hybrid fiber coaxial cable or pure coaxial cable facility originates. If the C-FMP 32 is not located at the headend, hub, or node, the facility between the C-FMP 32 and these may comprise an DSL twisted pair facility in one embodiment shown or a coaxial cable or optical fiber in other embodiments.

A known coaxial cable television tap 60 is shown where 1, 2, 4, 8 or, in some specialized environments, even more subscriber drop cables tie in to the coaxial cable serving downstream subscribers. Typically, these drop cables serve a single subscriber. Tap 60 comprises a directional coupler for permitting a subscriber to tap into the main downstream coaxial cable to receive service and transmit data back to the head-end and/or C-FMP 32-1. When a tap is being serviced or repaired, the downstream service is typically interrupted for the duration of the service or repair. An aspect of the invention includes designing the tap or the service so that "lifeline" support may be provided to a customer over a coaxial cable facility. In these configurations, both service and power for powering a subscriber telephone device may not be interrupted during normal power interruptions. The tap may be provided, for example, with a redundant switchable coupler such that when one of the couplers is taken out-of-service for repair or replacement, the other redundant coupler may remain in service to pass power and signal through to downstream subscribers.

Power in a cable television system is typically provided for powering active amplification devices in the cable distribution network. Set top terminals are typically powered from AC power lines within the premises. The downstream cable television power is typically 90 V AC. In telephony, the line power is typically 48 volts DC. Thus there is a difference between telephone and cable television power services. Furthermore, the tap and drop cable for television service may be over the same strand or a different strand and may enter the premises in a different entry way than the drop wire for telephone. House wiring systems of coaxial cable in cable television and twisted pair for telephony may be totally different and are completely within the control of the subscriber, the television service provider and/or the telephone service provider. These differences must be accounted for in design of a particular premises installation. For example, in embodiments of the invention, the tap includes a voltage conversion circuit which steps down the voltage sent to the individual homes to a lower voltage. In exemplary embodiments, the voltage is approximately 48 volts DC. In other embodiments, the voltage is set lower than 48 volts and may be either AC or DC. In still further embodiments, the cable set-top device includes a voltage converter which powers only a sub-set of the devices in the cable set-top necessary to receive power from the cable system, power the necessary circuits such as a processor, memory, and a phone/data interface such that lifeline power is provide to one phone line output from the settop while the remainder of the settop is not powered.

Figure 2:
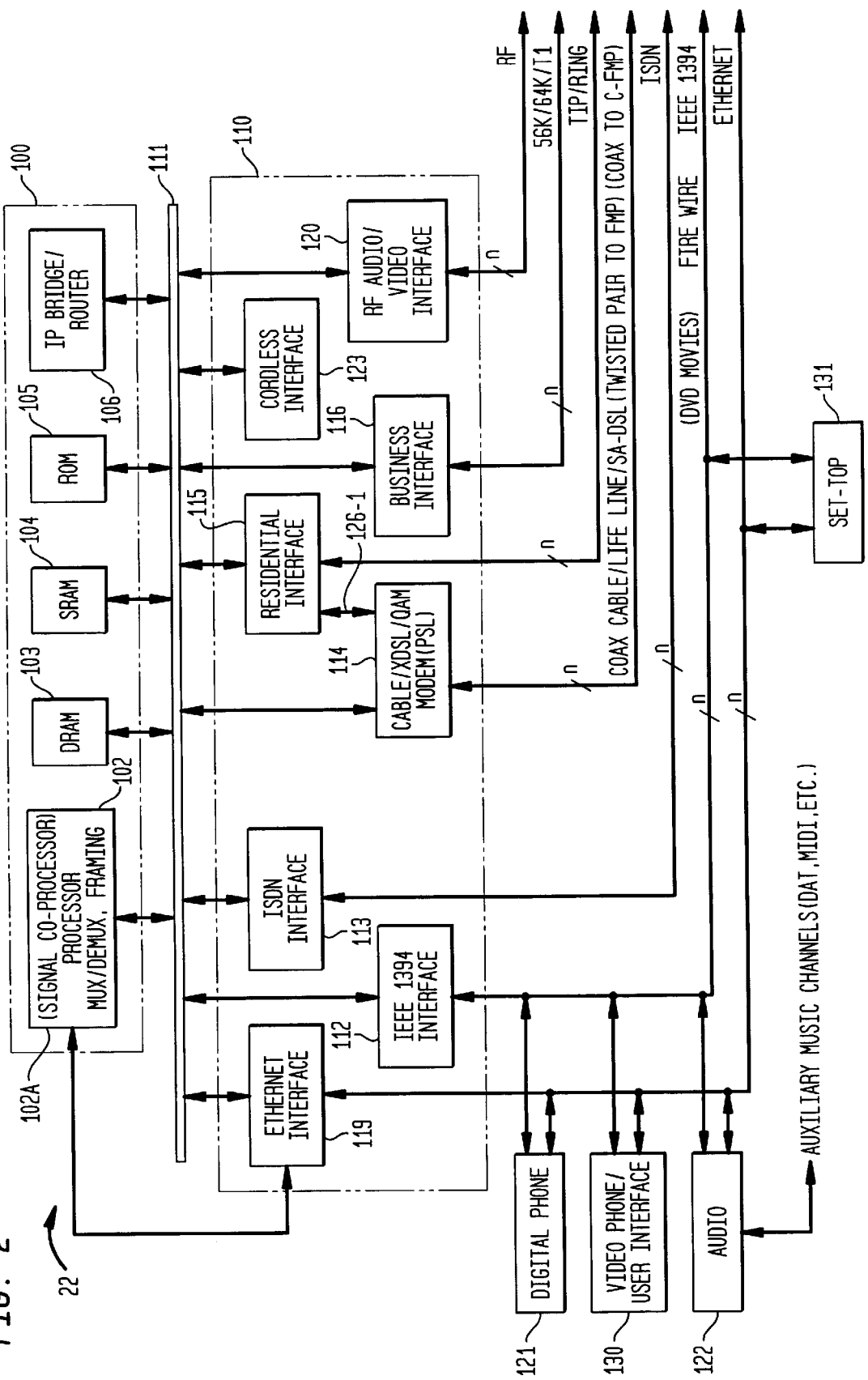
FIG. 2 is a block diagram of an embodiment of an integrated residence gateway consistent with the architecture shown in FIG.'s 1A through 1E.

Referring to FIG. 2, there is shown a first exemplary embodiment of an ISD/IRD 22.

The ISD/IRD 22 was described extensively in earlier U.S. application Serial No. 09/001,424, entitled "ISD Controlled Set-Top Box" filed Dec. 31, 1997. The ISD/IRG 22 may connect with a variety of devices including analog and digital voice telephones 15, 18; digital videophones 130, devices for monitoring home security, meter reading devices (not shown), utilities devices/energy management facilities (not shown), facsimile devices 16, digital audio devices via audio interface 122, personal computers 14, cable television set top devices 131 and/or other digital or analog devices. Some or all of these devices may be connected with the IRG 22 via any suitable mechanism such as a single and/or multiple twisted-pair wires, in-premises coaxial cable and/or a wireless connection. For example, a number of digital devices may be multi-dropped on a single twisted-pair (to FMP) or coaxial cable (to C-FMP) connection. Similarly, analog phones and other analog devices may be multi-dropped using conventional techniques. Set top cable television terminals 131 or personal computers utilizing cable modem bandwidth to provide, for example Internet services, are typically coupled to IRG 22 and/or coaxial cable lines run within the home. Alternatively, services are provided via an Ethernet interface 119 or other high bandwidth interface.

The ISD/IRG 22 may be located within the home/business, in a wire closet, in the basement or mounted exterior to the home/business. The IRG 22 may operate from electrical power supplied by the local or central office 34, by power supplied by the headend 63 and/or from the customer's power supplied by the customer's power company. Where the IRG 22 includes a xDSL or cable modem 114, it may be desirable to power the IRG 22 with supplemental power from the home in order to provide sufficient power to enable the optimal operation of the xDSL/cable modem.

As shown in FIG. 2, in some embodiments the ISD/IRG 22 may include a controller 100 which may have any of a variety of elements such as a central processing unit 102, a DRAM 103, an SRAM 104, a ROM 105 and/or an Internet protocol (IP) bridge router 106 connecting to a system bus 111. The system bus 111 may be connected with a variety of network interface devices 110. The network interface devices 110 may be variously configured to include an integrated services digital network (ISDN) interface 113, an Ethernet interface 119 (e.g., for 10 Base T, 100 Base T, etc.), an IEEE 1394 "fire wire" interface 112 (e.g., for a digital videodisc device (DVD)) and/or cable set-top QAM interface, an xDSL/cable modem interface 114 (e.g., for a digital subscriber line (DSL) and/or cable modem), a residential interface 115, (e.g., standard POTS phone systems such as tip ring), a business interface 116 (e.g., a TI line or slower data speed and/or PABX interface), a radio frequency (RF) audio/video interface 120 (e.g., a coaxial cable television connection to a set-top box/television or to a personal computer), and a cordless phone interface 123 (e.g., a 900 MHZ or other unlicensed frequency transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the IRG 22 to the local telecommunications company's central office 34 and, in particular, to the FMP 32 or C-FMP 32 located in the central office 34. Lifeline 126 may connect to Tip/Ring (conventional) and may be provided as lifeline 126-1 via DSL modem 114 to twisted pair or via integral or separate cable modem 114 to coaxial cable.

Either the ISD and/or the IRG may be configured to receive or transmit signals over a coaxial drop or a twisted pair drop or both. A TVRC modem and a cable modem operate according to different protocols. Typically, the twisted pair facility is terminated by a telephony modem (e.g., a TVRC modem) which provides available bandwidth services over a dedicated twisted pair subscriber loop while the cable modem provides an upstream band of frequencies of approximately 5–40 Megahertz (typically upstream) susceptible to noise ingress over the cable plant and as much as one giga Hertz of bandwidth in the downstream direction. Both upstream and downstream bandwidth is shared with other subscribers.

A typical cable modem, for example, one implementing a data over cable service interface specification (DOCSIS), comprises QPSK or 16-QAM modulation for upstream transmission and 64 or 256 point QAM for downstream transmission. Each 6 MHZ downstream or upstream channel can provide up to 38 Mbps data service in accordance with quality of service constraints since the bandwidth is shared with other downstream and upstream subscribers. Some studies suggest that up to 200 or more subscribers can share this bandwidth effectively. In the upstream direction due to various issues, a bandwidth of 10 Mbps may be provided. In contrast to Ethernet's CSMA/CD protocol, the DOCSIS access scheme provides cable/telephone operators the opportunity to fill their pipelines at 75% or greater of their theoretical capacity. Data encryption, for example, DES-based encryption/decryption, provides privacy to users of the shared upstream and downstream bandwidth. This data encryption may be carried forward through the WAN such that communications with corporate telecommuters may be secured from view or improper routing to an unauthorized user.

The ISD/IRG 22 may be variously configured to provide any number of suitable services. For example, the ISD/IRG 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. Similarly, in an alternate aspect of the invention, the set-top device may include a stereophonic and/or surround sound speaker system/interface which enables the user to select high fidelity sound to originate directly from the cable set-top box. The telephone may be preprogrammed to provide the digital audio channels at a particular time, such as a wake up call for bedroom mounted telephone, or utilized to other timer/alarm purposes elsewhere in the house. The user may select any number of services said to be available on the video phone using the user interface provided with cable set-top device 131. Instead of the touch screen, the user may manipulate a cursor using remote control 200 shown in FIG. 17. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/user interface 130, cable set-top-TV interface, digital phones, 121 and/or another suitable device.

In further embodiments, the ISD/IRG 22 may be configured as an IP proxy server such that each of the devices connected to the server utilizes transmission control protocol/Internet protocol (TCP/IP) protocol. This configuration allows any device associated with the ISD/IRG to access the Internet via an IP connection through the FMP/C-FMP 32. Where the ISD/IRG 22 is configured as an IP proxy server, it may accommodate additional devices that do not support the TCP/IP protocol. In this embodiment, the ISD/IRG 22 may have a proprietary or conventional interface connecting the ISD/IRG 22 to any associated device such as to the set top box 131, the personal computer 14, the video telephone 130, the digital telephone 18, and/or some other end user device.

In still further embodiments, the ISD/IRG 22 may be compatible with multicast broadcast services where multicast information is broadcast by a central location and/or other server on one of the networks connected to the FMP/C-FMP 32, e.g., an ATM-switched network. The ISD/IRG 22 may download the multicast information via the FMP/C-FMP 32 to any of the devices connected to the ISD/IRG 22. The ISD/IRG 22 and/or CPE 10 devices may selectively filter the information in accordance with a specific customer user's preferences. For example, one user may select all country music broadcasts on a particular day while another user may select financial information. The ISD/IRG 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
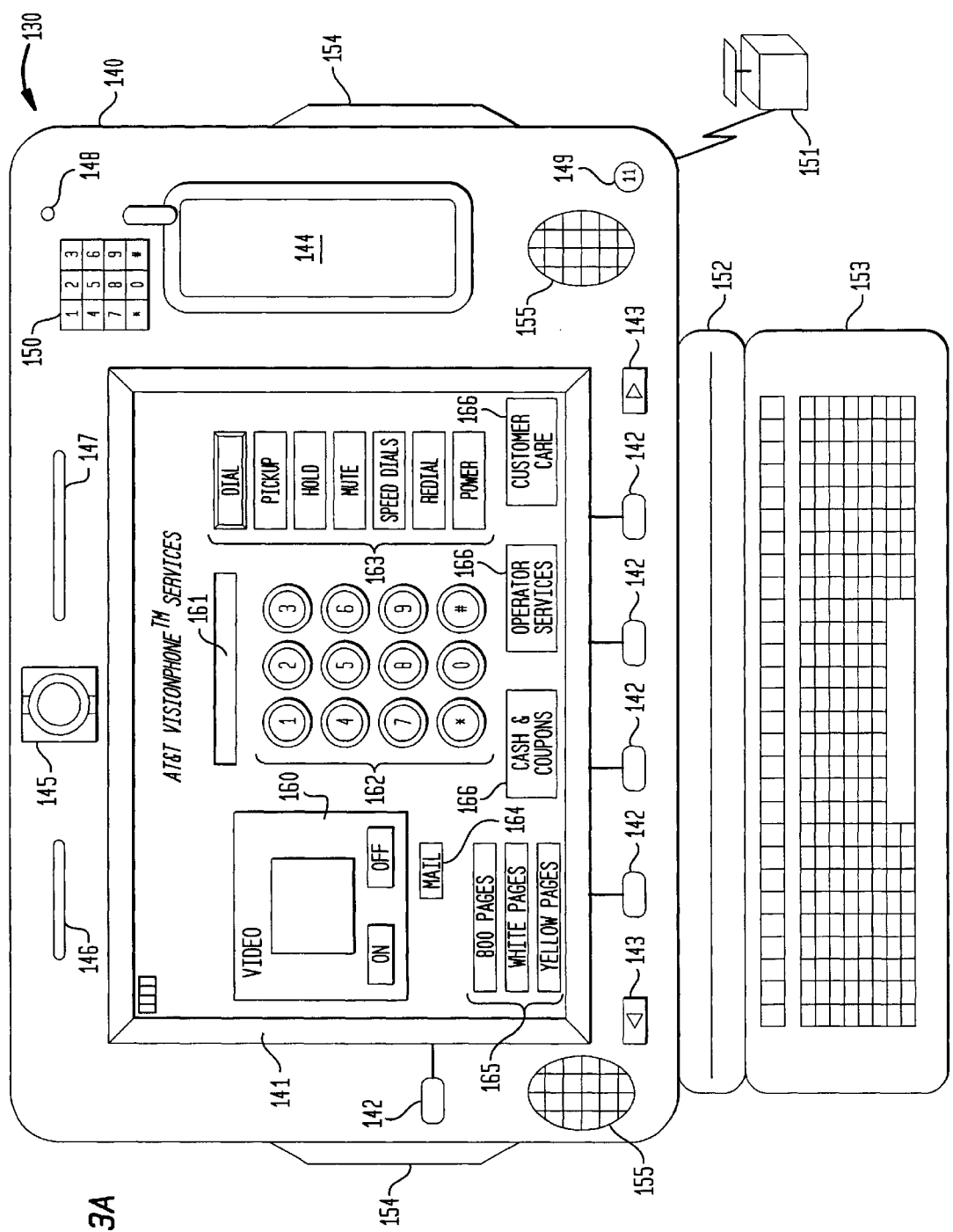
FIGS. 3A and 3B illustrate an embodiment of a video phone consistent with the architecture shown in FIG. 1A through 1E.

Referring to FIG. 3A, a videophone 130 may include a touch screen display 141 and soft keys 142 around the perimeter of the display 141. The display may be responsive to touch, pressure, and/or light input. In alternate embodiments of aspects of the invention, the video phone may be implemented in a set-top 131, with a television, such as a high-definition TV serving as the display 141. The user interface for the set-top implemented video phone being accomplished by moving a cursor around the display 141 using remote control 200 as discussed above. Each of the individual buttons and periphery devices 142–147 may be integrated into either the set-top device and/or remote control 200. Each of the other functions, design, and operation of the set-top implemented video phone remains the same as discussed herein for the conventional videophone.

Figure 3B:
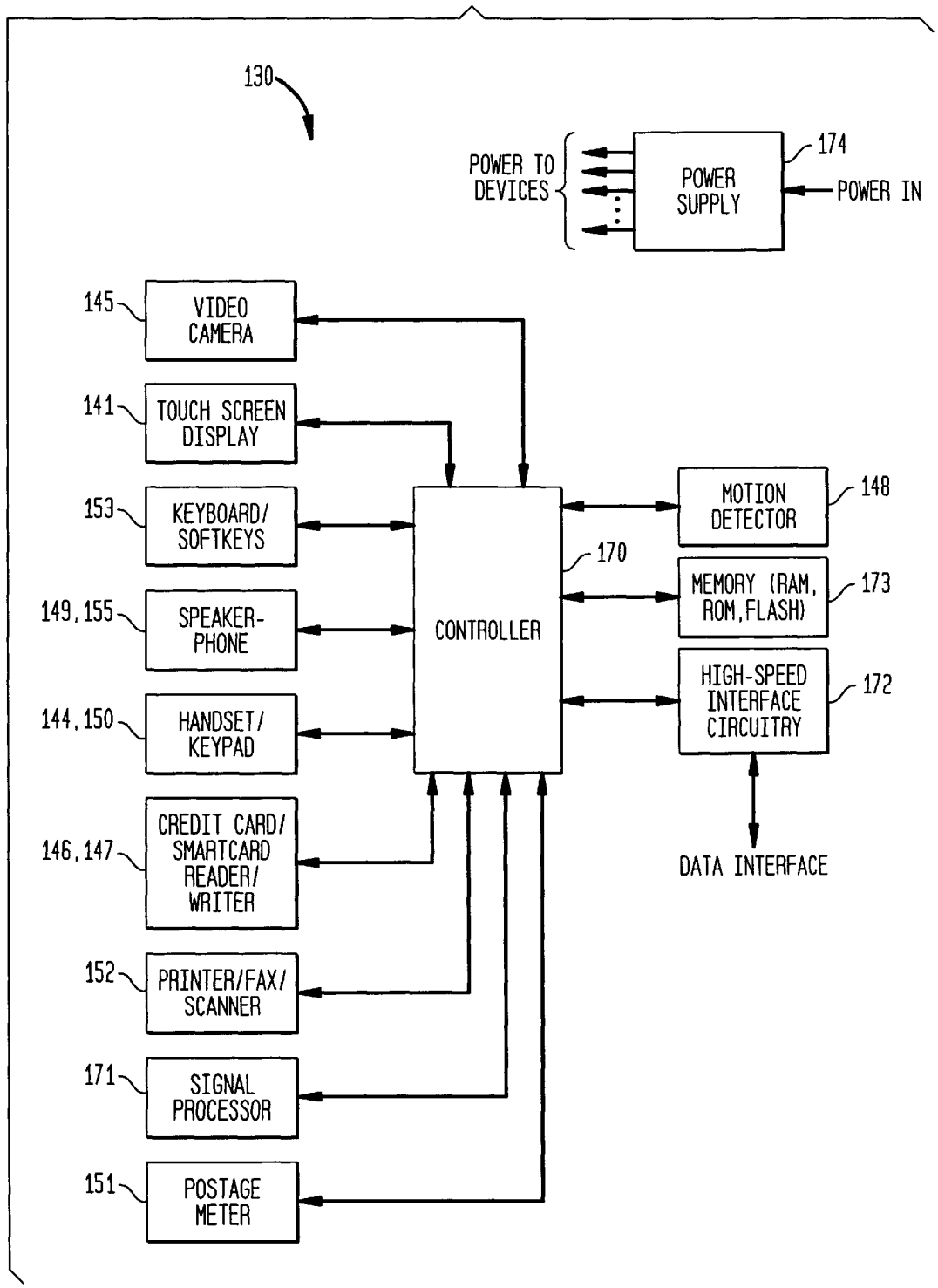

Some or all of the soft keys 142 may be programmable and may vary in function depending upon, for example, the applet being run by the videophone 130 and/or settop 131. The function of each soft key may be displayed next to the key on the display 141. The functions of the soft keys 142 may also be manually changed by the user by pressing scroll buttons 143 which may be on the video phone and/or the remote control. The videophone 140 and/or settop implemented video phone may also include a handset 144 (which may be connected via a cord or wireless connection to the rest of the videophone and/or directly to the ISD/IRG), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172 (to house wire or coaxial cable), memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the video phone. Where the video phone is a set-top implemented video phone, the pictures and/or user interface may appear in a window on the television screen in a picture-in-picture format. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone and/or set-top implemented video phone in accordance with the descriptions herein and/or one or more of the applications incorporated by reference below.

Figure 4A:
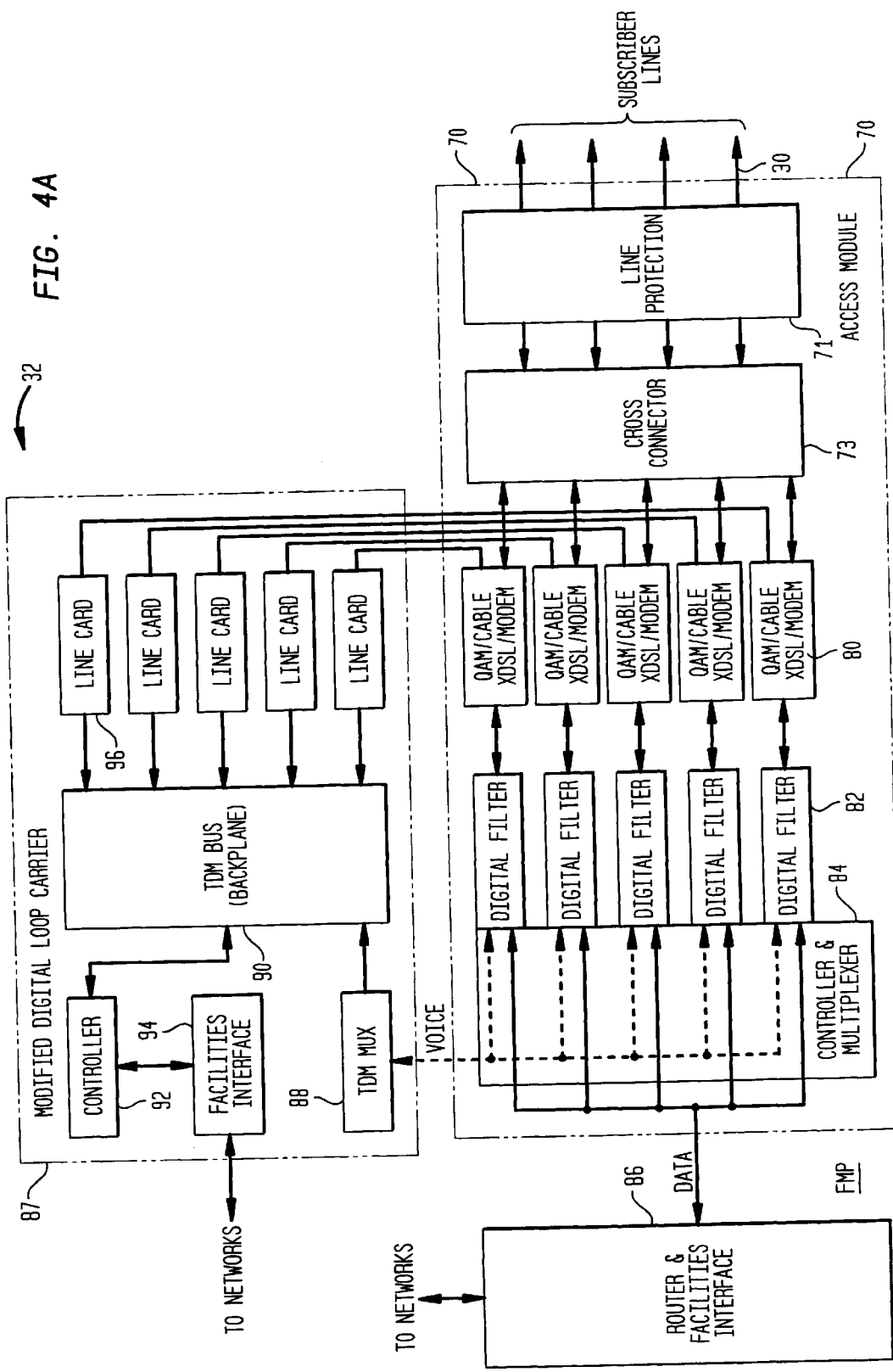
FIG. 4A is a block diagram of an embodiment of a facilities management platform consistent with the architecture shown in FIG. 1A through 1E.

Referring to FIG. 4A, the FMP/C-FMP 32 may coordinate the flow of data packets, separate voice signals from other signals, perform line monitoring and switching functions, and/or convert between analog and digital signals. The FMP/C-FMP 32 may process data sent from the CPE 10 to the central or local office 34 by separating and reconstructing analog voice signals, data, and control frames. The FMP/C-FMP 32 may process data sent from the central or local office 34 to the CPE 10 by separating control messages from user information, and configure this information into segments that for transport across the digital subscriber loop. The FMP/C-FMP 32 may also terminate the link layer associated with the digital subscriber loop.

Referring to FIG. 4A, in some embodiments, the FMP/C-FMP 32 may include an access module 70 and a digital loop carrier 87. The access module 70 may include a line protector 71, a cross-connector 73, a plurality of xDSL/Cable modems 80, a plurality of digital filters 82, a controller multiplexer 84, and/or a router and facilities interface 86. The digital loop carrier 87 may include a plurality of line cards 96, a time domain multiplexing (TDM) multiplexor (MUX 88, a TDM bus 90, a controller 92, and/or a facilities interface 94. In other implementations, the FMP/C-FMP may comprise a conventional head-end multiplexer/ demultiplexer arrangement with suitable data routing to various networks.

Again referring to FIG. 4A, during normal operations, digital signals on the customer connection 30 (e.g., twisted-pair lines, coaxial cable, or hybrid facility) containing both voice and data may be received by the xDSL/cable modems 80 via the line protector 71 and the cross-connector 73. Preferably, the line protector 71 includes lightning blocks for grounding power surges due to lightning or other stray voltage surges. The xDSL/Cable modems 80 may send the digital voice, picture and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the xDSL/cable modems 80 at the FMP/C-FMP 32 or the xDSL/cable modem 114 at the ISD/IRG 22), only analog voice signals might be sent over the subscriber lines 30 (twisted pair or coax). In such a case, the analog voice signals may be directly routed to the line cards 96, bypassing the xDSL/Cable modems 80, the digital filters 82, the controller multiplexor 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks. In alternate embodiments, digitized voice is received directly from the xDSL/cable modems in a digital format which is compatible with the TDM backplane and controller 92. This format may or may not require processing in the digital compatible line cards 96. Since the ISD/IRG 22 may be powered via the serving cable (telephone or coaxial cable television), lifeline service may be provided over the cable modem or the twisted pair tip and ring.

Figure 4B:
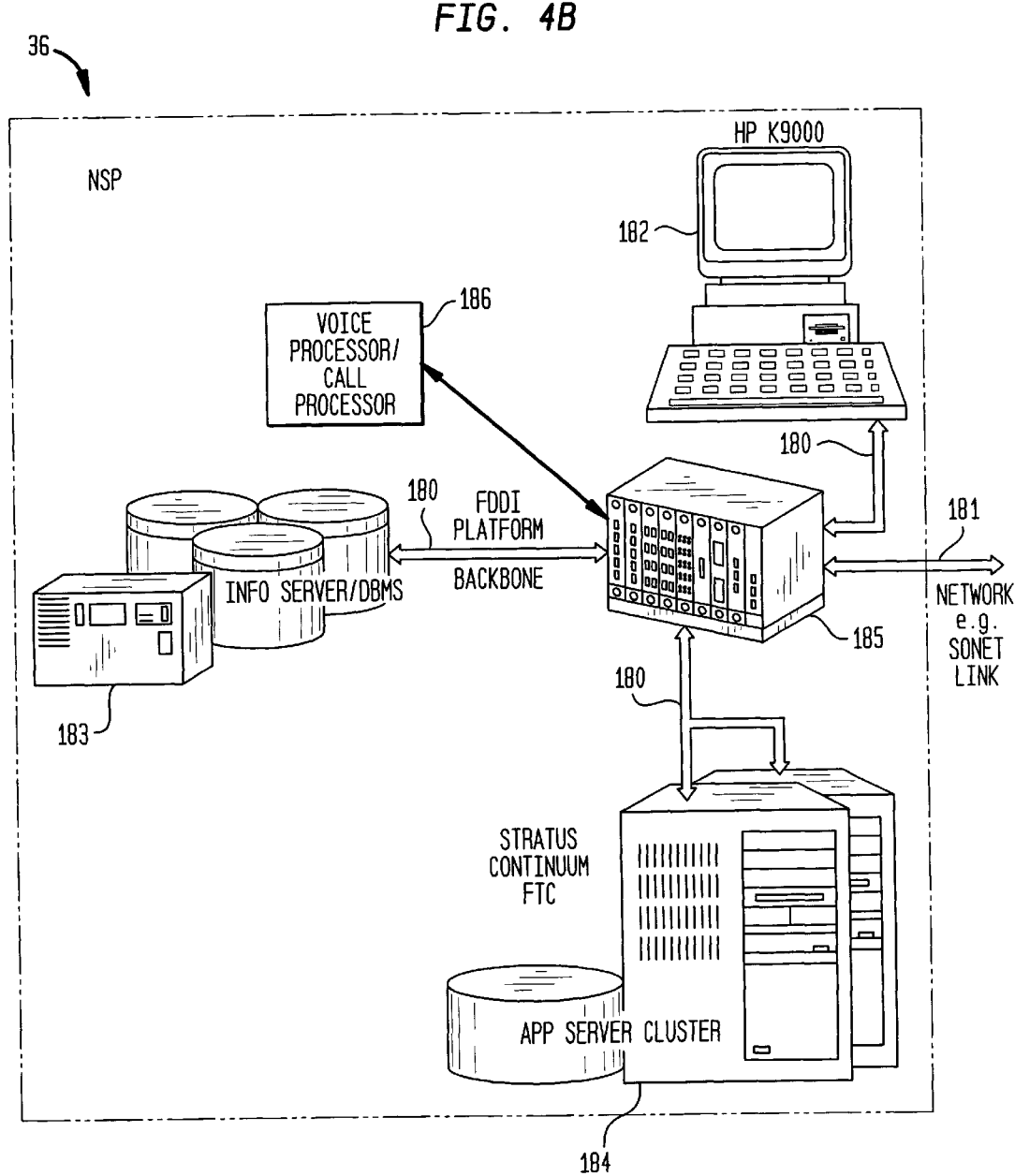
FIG. 4B illustrates a block diagram of an embodiment of a network server platform consistent with the architecture shown in FIG. 1A through 1E.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMP/C-FMPs 32. The information/data base server 183 may perform storage and/or database functions. The application server cluster 184 may maintain and control the downloading of applets to the ISD/IRG 22. The NSP 36 may also include a voice/call processor 186 configured to handle call and data routing functions, set-up functions, distributed operating system functions, voice recognition functions for spoken commands input from any of the ISD/IRG connected devices as well as other functions.

Again referring to FIG. 2, the ISD/IRG 22 will now be explained in more detail. The ISD/IRG enables the seamless integration of voice and data across the telephone network. The ISD/IRG 22 leverages interface and networking innovations originally developed to expedite information retrieval via the World Wide Web. When applied to telecommunications access, these advances enable a revolutionary change in service delivery, that makes the telephone companies network a much more valuable asset than ever before. Coupled with the introduction of low-cost premises devices (e.g., browser based touch-screen phones and/or a set-top implemented video phone, the technology enables a natural and compelling link to a rich new class of service offerings and features such as CD quality voice, far more friendly access to a wide range of telephony services (CLASS, conferencing, messaging, emergency services, etc.), new non-traditional services on an AT&T secure intranet such as Bill payment, Banking, Electronic shopping, Home-based smart card ATM transactions, Electronic coupons, Interactive advertising/Point-casting, Corporate LAN extensions for Work-at-Home, Interactive multimedia telephony, High-speed access to the Internet even without a PC, restaurant ordering, sports ticket ordering, catalogue ordering, mail metering machines, directory services, customer services, rate tables, calling plan options, distribution and updating of "smart pass" tokens for mass transit, toll roads, toll bridges, parking garages, as well as self provision new services, get credit for wrong number calls, vastly reducing the number of service representatives required.

The ISD/IRG 22 performs intelligent multiplexing, dynamic bandwidth allocation, and routing of voice and data and, in some aspects of the invention, also includes advance signal processing for enabling voice activated commands. Under certain configurations, the video phone of FIG. 3A is given away for free so that all house-holds regardless of income level or desire to purchase a personal computer will have access to the vast information resources of the Internet, an interexchange carrier's such as AT&T's networks, and/or third party networks including those providing pay per view (PPV) movie content and broadcast networks. The advertising on the video phone will be sufficient revenue to pay for the device similar to the way commercial TV or WEB search engines operates today. It is anticipated that the video phone concept together with the ISD/IRG, FMP/C-FMP, and NSP of the present invention will revolutionize the delivery of telephony services and provide a quantum leap in the paradigm of telecommunications, improving the quality of life of interexchange carrier customers while turning the copper loop or the coaxial cable drop into their homes into an increasing necessity for all users.

For high end residential consumers who want more convenience and simplicity in their daily lives and convenient access to more information devices coupled to the ISD/IRG provide, for example: easier delivery of a wider range of telephony services (e.g., customer care, marketing, operator services) with cost savings due to automation; new service opportunities such as interactive electronic catalog shopping from the home, and advertising; ability to offer ultra fast Internet access to every household, penetrating even those without a PC unlike traditional voice/touch tone telephony access; high fidelity voice and music; touch screen and/or voice activated customer interface; asymmetric high speed transport of data to the home with the asymmetric character of the link and apportionment of that bandwidth variable depending on the amount of traffic; new service opportunities such as 3rd party bill payment including paper-less bill payment, banking, obtaining smart card cash in an ATM transactions, electronic shopping from the home, electronic coupons, advertising, electronic review and payment of bills, calling plans, class of services, as well as other services and plans; Interactive video teleconferencing; state-of-the-art networking for Work-at-Home; private line services; Call Connection including the self scheduling of conference calls without the need for an operator as well as initiation of interactive calls with white board augmentation using an appropriate applet downloaded from the NSP; class services invoked, for example, via icons and prompts in a natural manner without requiring memorization of numerical codes; navigation & access for voice, e-mail, and fax messages; obtain operator services without an operator, credit for wrong number, rate table, etc.; define profile for pointcast services; purchase products advertised on TV via synchronized ordering screen with television or PPV shows; Multimedia Enhanced Voice Calls, interactive voice & data response applications & info- on-demand; Support for work-at-home via virtual WAN; Screen pops for message/call alerting; graphical call management using touch and/or a mouse interface, including, for example call setup/bridging capabilities and point-and-click/tap-and-drag conferencing graphical use interfaces to initiate POTS calls, personal registry, mobility manager, call scheduling, call me back standard messages, personal assistant; Universal Multimedia Mailbox including a common interface for fax, voice, text, audio, and/or audio/visual images; 7 kHz high fidelity voice; asymmetric high speed transport with dynamic bandwidth allocation; residential LAN interface and associated local area network within the home; interactive video teleconferencing, display of web pages for customers placed on-hold, and other applications as discussed herein.

The service in accordance with aspects of the present invention makes the phone or coaxial cable TV lines a conduit for a wide variety of high revenue service offerings, allows the differentiation of local telephone and long distance telephone services, significantly reduces operation costs, extracts additional performance benefits from the imbedded loop plant and/or cable head-end, makes maximum use of the existing network infrastructure, and uniquely leverages new technology. Aspects of the present invention will enable a revolutionary change in service delivery, which can greatly improve the quality of people's lives, and make the telephone network a much more valuable asset than ever before. When coupled with the introduction of low-cost premises devices (e.g., touch-screen phones and/or set-top enabled video phones), the technology enables a natural and compelling interface to rich new classes of service offerings for all telephone/TV users regardless of their ability or desire to afford a personal computer or learn how to use this device. Thus interexchange carriers such as AT&T and cable companies can reduce the cost of their own billing while making it easier for the customer to pay the bill. Additionally electronic billing services can be offered to other companies allowing all billing to be consolidated and automated.

The ISD/IRG 22 may be physically located on the premises side of the protector block. In exemplary embodiments as shown in FIG. 2, the ISD/IRG 22 terminates the twisted-pair loop or coaxial cable or both facilities either leased from the local exchange carrier or obtained from the cable television service provider on the network side and the premise equipment and associated networks on the premises side. The ISD/IRG 22 may operate to aggregate the diverse traffic from the customer premise equipment onto a single stream for transmission over the loop to the twisted pair or cable Facilities Management Platform (FMP) and to de-multiplex the traffic from the FMP/C-FMP.

Figure 5:
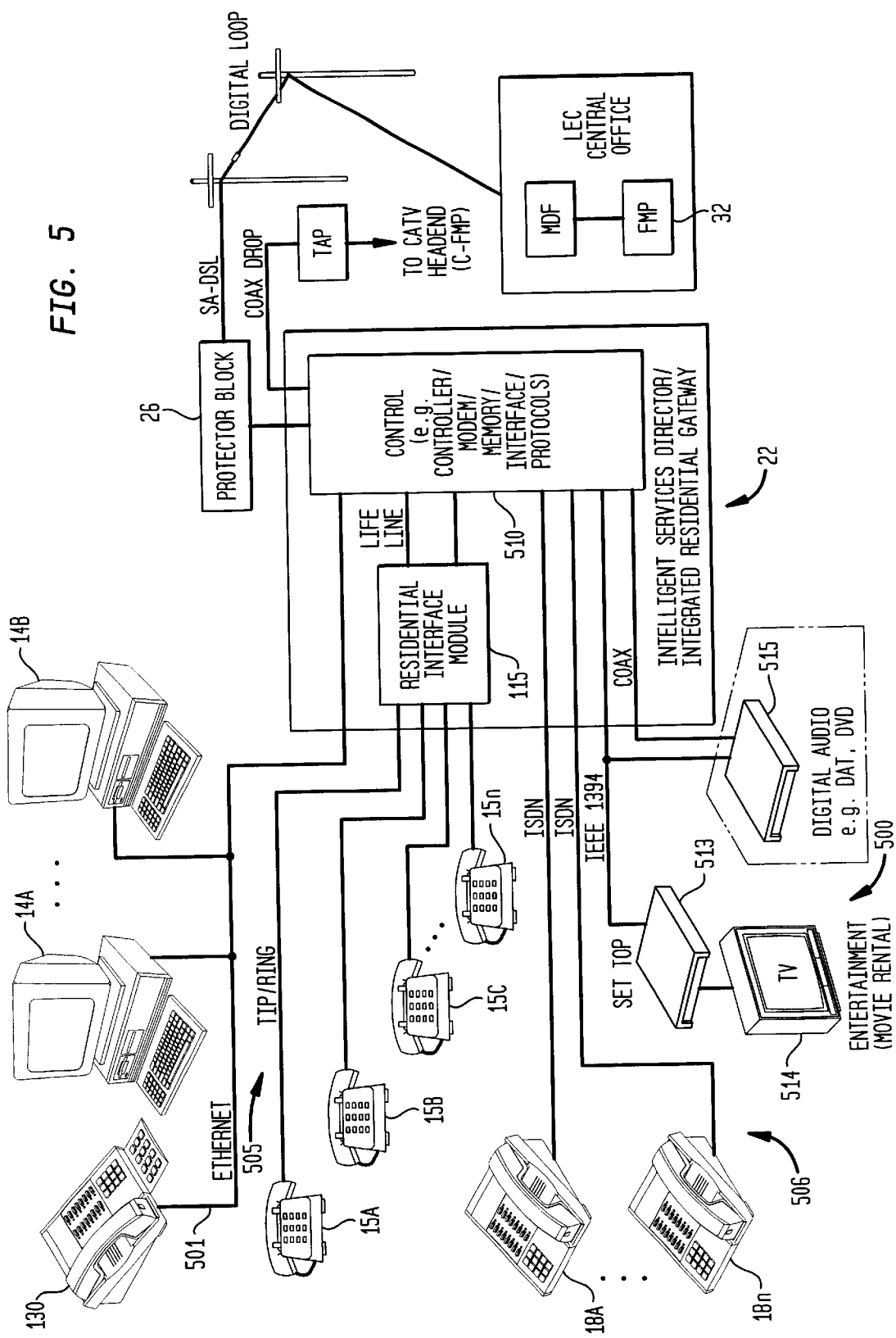
FIG. 5 is a block diagram of an embodiment of the ISD/IRG.

A basic Premises Distribution Network (PDN) 500 for one exemplary embodiment of a typical residential application of the ISD/IRG 22 is shown in FIG. 5. The premise distribution network 500 may include one or more Ethernet and/or coaxial cable connections 501 for connecting a plurality of devices such as a number of personal computers 14A, 14B, a vision phone, cable set top terminal vision phone enabled set-top devices, and/or other devices. Further, the premise distribution network 500 may include any number of conventional analog lines 505 (e.g., Tip/Ring (T/R) phone lines), each having one or more associated analog phones (e.g., 15A–15n), and/or associated PCs with modem and/or phone cards. Further, the premises distribution network 500 may include any number of ISDN lines 506, each having any number of digital appliances such as ISDN compliant devices, vision phone enabled set-top devices and/or video phones 130. The premises distribution network 500 may use existing twisted pair telephone line, a coaxial cable line and/or may utilize a special cable to facilitate CATV, Ethernet and/or other LAN connections. Where the video phone 130 may share the same LAN as a connected PC 14A, prioritization software in the LAN driver gives priority to video and/or audio transmissions to and from the video phone to reduce latency time and unpredictable delays. Alternatively, the video phone 130 may be coupled via a dedicated ISDN connection, a dedicated ethernet connection, and/or another dedicated connection or coaxial cable connection to the ISD/IRG 22. The video phone may have an integrated analog phone for life line support. Alternatively, one of the analog phones serves the function of providing lifeline support. Further, an internet telephony phone (not shown) may provide lifeline service via a coaxial drop to the home. Where the video phone 130 includes lifeline support, in some embodiments it is preferred to transmit data to the phone in a band above 7 kHz using ADSL like modem technology.

In exemplary embodiments, the ISD/IRG 22 multiplexes traffic from the various components of the PDN 500 (e.g., Ethernet, Screen Phone, Tip/Ring, ISDN, coaxial house cable) either between other devices on the PDN and/or onto DSL/cable modem 114 for transport over loop twisted pair to the Central Office or coax toward the cable television headend. The DSL/cable modem may be constructed using any of the techniques described in the applications incorporated by reference below. For example, there is some advantage in providing an integrated DSL/cable modem with either twisted pair or coaxial connectors where, for example, central controller capabilities may be shared.

Within the scope of the current document, the term xDSL, DSL, will be used to represent any member of the DSL family. This family comprises, High Speed Digital Subscriber Line (HDSL), Asymmetric Digital Subscriber Line (ADSL), Symmetrical Digital Subscriber Line (SDSL) and Very high data rate Digital Subscriber Line (VDSL). This list is not limited to the members described herein, since changing technology adds more DSL schemes. Further, within the scope of the present document the term cable modem will be used to represent any member of the cable modem technology including QAM and other modulation techniques.

The ISD/IRG 22 may execute any number of additional telephony functions using known techniques such as Packetization of voice for all telephone calls, Tip/Ring Borscht functions, default to Central Office Battery/Tip/Ring to provide lifeline service during power failure, overvoltage Protection, ringing, supervision, answer and incoming call/ringing supervision, generation of call progress tones (e.g., dial tone, busy, ringback, invalid number, etc.), various coding such as 7 KHz G.722 coding for Electra called parties, 3.3. KHz mu-law coding for non-ISD enabled parties, transmit messages reporting DTMF, on hook/off hook/flash hook events, support for voice dialing and enablement of special calling features (e.g., through the use of processor 102 which may include signal co-processor 102A and/or a high performance controller such as the 8960), provision of dial tone with time-out for voice dialing service, coding/forwarding voice commands (e.g., to a voice processor in the FMP/C-FMP and/or NSP.

The data link protocol of the DSL and/or cable modem may be variously configured to include incorporate Forward Error Correction for traffic unsuited to re-transmission such as voice traffic. Additionally, the data link protocol may organize the aggregate data stream created by multiplexing downstream channels, duplex channels, and maintenance channels together into blocks, attaching an error correction code to each block and/or a plurality of blocks. The receiver then can correct errors that occur during transmission up to the limits implied by the code and the block length. The data link protocol may also provide sufficient interleaving to correct errors due to impulsive noise but supporting low latency for voice traffic, create superblocks by interleaving data within subblocks to allow the receiver to correct any combination of errors within a specific span of bits. It may be desirable to tailor the interleaving interval to the latency budget for voice applications in DSL and/or cable modems utilized to carry voice as in one or more aspects of the present invention. The packet handling in the present system may be variously configured. For example, in the CPE or set-top Network direction, the processor 102 may be configured to act as a packet handling subsystem to processes frames from the FMP and to generate, e.g., DSL /QAM frames, going to the FMP. The ISD/IRG and the FMP/C-FMP include DSL/cable modems (e.g., TVRC/QAM/DOCSIS standard cable) modems to terminate the link layers associated with the DSL or coaxial segment of the connection. In a similar manner as the FMP/C-FMP, the processor in the ISD/IRG may be configured to reconstruct the IPv6 packets from DSL frames and then separates IP packets containing voice from those containing data and from those containing signaling. In the ISD/IRG, speech packets from the Packet Handling subsystem may be delivered to the residential interface for output to one or more analog lines to create virtual phone lines using the upper bandwidth of the DSL modem (e.g., 40 Khz to 1 Mhz) and/or data channel in the cable modem in a similar manner as the packet-to-circuit translation subsystem which may be utilized in the FMP/C-FMP. The processor 102 in the ISD/IRG 22 may also be configured to generate signaling packets which may be forwarded to the FMP/C-FMP for later utilization in either an in-band or out-of-band routing subsystem such as a conventional subscriber signaling subsystem (e.g., TR 303). Similarly, the processor 102 in the ISD/IRG 22 may include a subscriber signaling subsystem as part of an external routing subsystem. In this manner, packets received from the FMP/C-FMP in the network-CPE direction (including voice, data, video, and control packets) may be demultiplexed, reformatted with an appropriate protocol, and output to an attached peripheral device connected to the premise distribution network 500.

In the network to CPE/set-top direction, the processor 102 may be configured to re-construct IPv6 packets from DSL/cable modem frames, and separating IP packets containing voice from those containing data from those containing signaling. This process may involve, for example, multiplexing (at the IP packet level) voice, data and subscriber signaling packets bound for a single DSL/cable modem link with IP packets mapped onto DSL frames/cable modem packets.

The processor 102 may also include one or more signal processors 102A and/or voice processor to perform various MPEGII coding/decoding functions, codec functions, voice recognition functions, encryption/decryption, etc. The processor 102 may also be configured to perform various protocol conversion functions such that data having protocols used on a device connected to the premise distribution network may be efficiently transmitted to and from the FMP/C-FMP using an appropriate transmission protocol. Additionally, the processor 102 monitors the devices connected to the premise distribution network and stores information concerning which devices are currently in use. In this manner, where there is an incoming call, the ISD/IRG has the intelligence to know which CPE is in use and which CPE is not in use. As a result, if there is an incoming call, the ISD/IRG will not send a ringing tone to any CPE that is already in use, but will route the call to another device that is available and/or provide an alternate indication on the device in use that a secondary line is ringing. Further, where there is a choice of a plurality of phones and/or other devices to route the call, the ISD/IRG may review activity detected on the motion sensors on any attached motion sensing devices such as those which may be present in a video phone 130 and ring a phone which is most convenient to the user. As an alternative, all available phones will be rung, with the user given the option to switch between incoming lines.

In an exemplary embodiment shown in FIG. 5, where an incoming call arrives at the ISD/IRG 22, the control 510 rings one or all of the attached phones. Where a user answers a first phone (e.g., 15A), the utilization of this phone is recorded. Thereafter, the user may continue talking on this phone and an off-hook status is indicated. Where another call comes in, the user may choose to answer this call via a conventional method such as "call waiting" and/or using multiple lines. Further, the answering machine (described in an attached application) may be configured to indicate that the user is receiving an incoming call at the moment and provide an on-hold menu as discussed in the applications incorporated by reference below. The control 510 may be configured to have a plurality of calls on-hold and toggle between these calls by depressing a DTMF key and/or the hang-up actuator. Alternatively, a digital phone and/or video phone 130 may have any number of lines with a name, address, and phone number associated with each of the incoming callers. Thus, the residential interface module allows multiple virtual analog phone lines to be multiplexed on a single twisted pair phone line and/or coaxial connection. Further, one or more of the phone lines may be provided with life line support as discussed herein.

Interconnected to the ISD/IRG may be a protector block 26 (for lightning and overvoltage protection) which can be used for impedance matching. The protector block 26 may also act as a demarcation of the customer premise and the local loop/coaxial cable transmission network. Copper twisted pair and/or coaxial cable may be utilized to connect the protector block and a CATV headend or a telephone Main Distribution Frame (MDF) as the main transmission medium in the local loop.

The DSL/cable modems shown as 114 may be implemented using a Tethered Virtual Radio Channel (TVRC)/

DOCSIS specification cable modem as discussed in the applications incorporated herein by reference. The TVRC (Tethered Virtual Radio Channel) and/or cable modem engine may be implemented using a simultaneous voice-data modem which may be a full-duplex Variable Rate—Adaptive Digital Subscriber Line (VR-ADSL) modem and/or QAM modem. The modem may transmit and receive the modulated voice+data bit stream via the twisted pair or coaxial connection. The modem uses discrete multi-tone (DMT) modulation to achieve at least 1.5 Mbps data rate in both directions. Some of the TVRC/cable modem engine functions include forward error control (Reed Solomon), channel coding (Turbo or Wei Convolution), TVRC spreading/spread spectrum, echo cancellation and analog transmit/receive line interfacing. The TVRC/cable modem may be implemented using one or more programmable DSPs which may be utilized to provide the modem transmit FFT and/or receive IFFT engine. However, the embodiments of aspects of the instant invention are not limited to the use of TVRC and/or QAM modulation technology. However, TVRC and/or QAM modulation technology may be desirable in order to overcome impairments such as noise and interference and which results in unacceptable delays. Other aspects of the DSL/TVRC/Cable/QAM modem technology is described elsewhere herein.

The processor 102 in the ISD/IRG 22 may be configured to discriminate between the various forms of traffic and to route this traffic to an appropriate device. Where high priority voice and/or video is distributed across the interface, the ISD/IRG may include one or more priority queues disposed in the SRAM and/or DRAM 103, 104. There may be different priority queues for each connected device on the premise distribution network (including any attached device described with regard to FIG. 2 or discussed herein). Additionally, there may be different queues for each device in both the transmit and receive direction. Further, control and signaling information may be assigned various levels of priority. A similar queue structure may also be implemented in the FMP/C-FMP. In one exemplary embodiment, the queues give priority to signaling information, and voice information for the various attached telephones. If a queue is in danger of overflow, flow control mechanisms may be utilized by the ISD/IRG and/or FMP/C-FMP. Voice data is accessed first using an appropriate queuing scheme such as priority fair weighted queuing or another suitable scheme. In addition to queuing, bandwidth may be varied so that more DSL/MPEG frames are assigned to voice and/or video than data. Further, asymmetric DSL/QAM protocols may be dynamically implemented such that more bandwidth may be allocated to one direction or the other as necessary. Where one ISD/IRG 22 is serving as the node for, for example, a seven way conference call, the outgoing bandwidth for the node may need to be increased relative to the incoming bandwidth. However, where a PPV movie and/or Internet file is being downloaded, the bandwidth may be reversed such that more bandwidth is available from the network to the CPE equipment. Thus, asymmetric high speed transport of data to the home with the asymmetric character of the link and apportionment of that bandwidth variable depending on the amount of traffic results in a substantially more flexible platform to implement advanced services to the user. Multiple modem protocols may be downloaded into the DSL modem/cable modem dynamically to chose the best protocol for a particular dynamic bandwidth allocation to maximize the amount of through put.

Figure 6A:
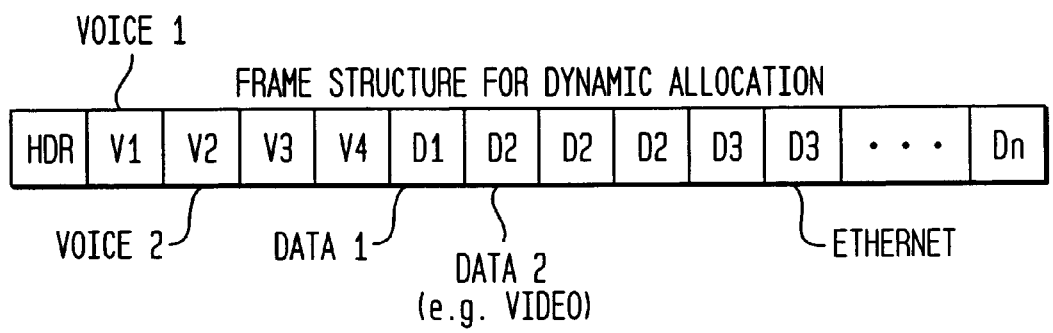
FIGS. 6A and 6B are block diagrams of various frame structures which may be used to communicate between the ISD/IRG and the FMP/C-FMP.
Figure 6B:
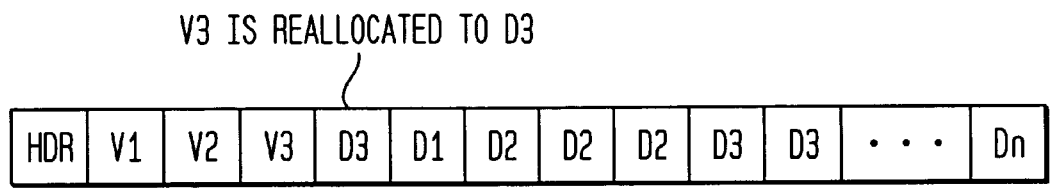

For example, with reference to FIGS. 6A and 6B, information may be multiplexed into one or more DSL frames/cable modem packets in order to dynamically allocate bandwidth. In one exemplary embodiment, where data is being input to one of the connected data devices (e.g., a PC), and a voice call comes in, a dynamic allocation of bandwidth may occur. Assume that 1 Mbps is available for information transfer. Prior to the incoming call, all 1 Mbps may be completely used for the data transmission. However, as soon as a voice call comes in, since voice has a higher priority than data, a 64 Kbps channel is deallocated from data usage and is allocated for voice. If a second voice call comes in, then another data channel will be deallocated from data usage and allocated for voice. As a voice call gets terminated, then the allocated voice slots will be reallocated to use by data and/or another voice channel. For example, as shown in FIG. 6B, voice call 4 V4 is terminated and the bandwidth is reallocated to D3. Accordingly, as the bandwidth is reallocated, the header may be updated to reflect the new bandwidth allocation. This allocation may occur in both the CPE to network traffic and network to CPE traffic. Additionally, as slots are added to CPE to network traffic, slots may be deallocated to network to CPE traffic implementing a dynamic asymmetric bandwidth allocation. Hence, the system dynamically allocates bandwidth in real time to maximize information transfer. Where individual packets are used to transport voice and data between the ISD/IRG 22 and the FMP/C-FMP 32, an individual channel does not need to be allocated. Voice packets are simply given priority over data packets in the transfer. Therefore, silence periods may be used to the advantage and a higher overall bandwidth occurs. Data is simply stored in the buffer and/or slowed in its transfer using standard flow control where voice has priority. In aspects of the present invention, bandwidth may be allocated on a per-frame/per-packet basis. By contrast, conventional systems only allocated bandwidth at the time a secession is initiated—and once initiation has been completed, bandwidth allocation cannot be changed without tearing down the call. However, in aspects of the present invention, bursty data may be accommodated more efficiently since the burst data rate may be accommodated via dynamic bandwidth allocation.

The DSL/cable modem 114 may be variously configured to supporting transport over 18000 foot loops at following rates exceeding 1 Mbits/second, or coaxial cable or hybrid facilities of any length and may include adapting duplex and downstream bit-rates to the needs of the current traffic such that more bandwidth is provided to the upstream and/or downstream and/or between various devices based on an intelligent bandwidth allocation algorithm. The DSL/cable modem may provide a single-tone DMT mode for low power operation during idle periods to avoid re-synchronization at next service request and enable "always on" functionality. The always on and/or virtually always on functionality allows voice/data calls to be established virtually instantaneously without long delays. The virtually always on functionality allows the channel bandwidth to adapt to the current needs of the system to minimize power consumption, reduce thermal dissipation, and generate less interference. For example, if no device is currently being utilized, only a very low bandwidth channel is required. Accordingly, by reducing the bandwidth available across the loop or coaxial cable, it is possible to improve overall performance for other lines.

The DSL/cable modem must share upstream and downstream bandwidth over coaxial or hybrid fiber/coaxial facilities but has the advantage of being able to allocate upstream and downstream demand for services in priority with other coaxial cable/twisted pair subscribers or, if both twisted pair and coaxial facilities are provided, to allocate to one or the other depending on priority.

The present invention discloses a local loop/coaxial cable architecture that can overcome many of the problems associated with either a twisted pair or coaxial cable architecture alone. Amongst the advantages is the ability to have multiple appearances of a call on a single twisted pair or coaxial cable channel. The architecture also allows data and voice to be mixed and bandwidth can be dynamically allocated in real time.

To illustrate the interaction between the various components of the instant invention, a voice dialing scenario will be described. When a subscriber picks up the telephone and if no digits have been dialed after a specified period of time has elapsed, the ISD/IRG may start digitizing the voice information into 64 Kbps $\mu$-law PCM data. The samples may be interpreted locally using processor 102 and converted into commands, and/or stored in a wave file for later transmission. For example, where the voice commands are saved, they may be subsequently transmitted to the FMP/C-FMP over a signaling channel. On receipt by the FMP/C-FMP, the FMP/C-FMP may either interpret the commands (e.g., using a controller in the controller and multiplexer 84), and/or forward the information to the NSP for further processing. In the NSP, the commands may be interpreted using known voice recognition technology. The NSP may attempt to authenticate the request by ensuring that the subscriber does indeed have a subscription to the voice dialing service. The NSP may then determine the identity of the subscriber by looking at the address in the IP field of the packet. The NSP can therefore interpret the information in the wave files and take the appropriate action.

Figure 7A:
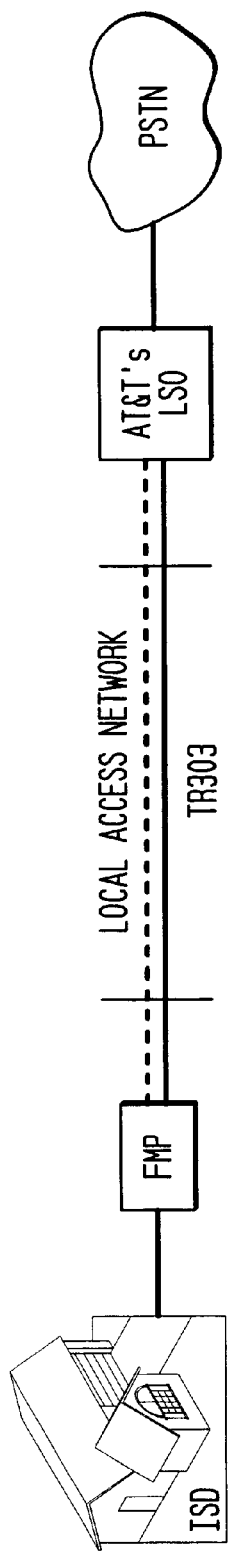
FIGS. 7A and 7B are examples of one signaling structure which may be used to initiate a call.
Figure 7B:
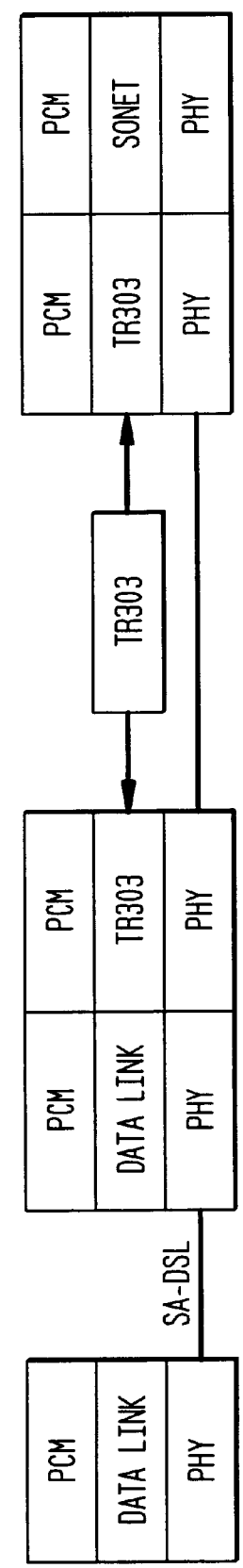

In one illustrative example, assume that subscriber John wanted to call another subscriber Paul. The NSP may attempt to determine who is Paul as defined by John. Once the telephone number for John has been determined, the NSP may inform the FMP/C-FMP to set up a call to John's number. In some configurations, this my be done by the FMP/C-FMP using the TR303 interface (as shown in FIG. 7A and FIG. 7B), for example, by sending a signal to a SLC and/or cable head-end call manager to request the local Serving Office to tell the latter the appropriate ports to use for setting up the call. The FMP/C-FMP may also include its own DTMF and tone generator for signaling. The inclusion of a DTMF tone generator in the FMP/C-FMP and/or ISD/IRG has significant advantages in that a voice dialing service may be provided by the interexchange companies and there is no need to pay for the Local Exchange Carrier (LEC) for providing such a service. Similar services, such as speed dialing, that the LEC provides can now be made available locally using the ISD/IRG and/or FMP/C-FMP. Thus, the local cable company or interexchange company may provide sophisticated service features.

In the case where there is an incoming call, say from the PSTN, the FMP/C-FMP may obtain signaling information from the SLC. The information may be dispatched over the signaling channel to the NSP. The NSP may instruct the FMP/C-FMP with information on how the call should be terminated. On receiving this message, the FMP/C-FMP may send the appropriate signaling message to the ISD/IRG. The ISD/IRG may be configured to know which phones are in use and which ones are not. As a result, the ISD/IRG may apply ringing voltage to a phone that is not in use and/or take other remedial action as discussed above, e.g., using a call waiting signal.

The ISD/IRG may be configured to facilitate multiple appearances of calls on a single twisted pair or within a coaxial cable television channel to integrate voice and data traffic. The ISD/IRG is unlike conventional system that uses bandpass filters or splitter to separate voice and data. The ISD/IRG provides a local smart hub interface for all lines in the home as well as providing digital communication coordination among different devices in the home. The ISD/IRG may be configured for various functions including an alarm system, utility meter monitoring, standard POTS phone systems such as tip ring, or multiple tip rings, or multiple tip rings assigned to a single number, and/or multiple tip rings assigned to unique numbers, detection generation and conversion of DTMF tones, ring generation, off hook generation, and other call progress indication, and/or a business interface such as a T1 line, and/or other analog and/or digital lines.

Figure 10:
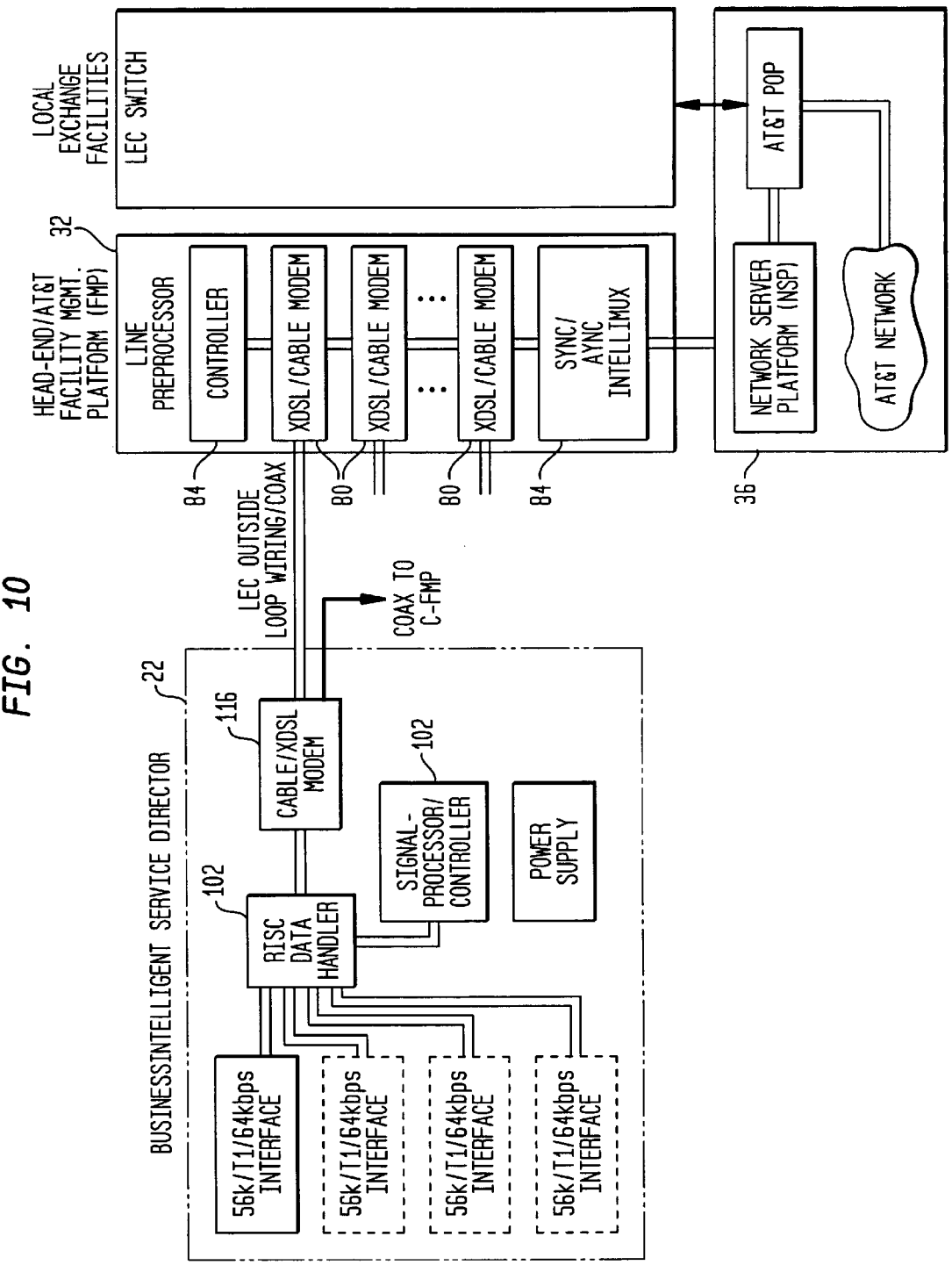

Of course, other embodiments of the ISD/IRG will be apparent to those skilled in the art. For example, as shown in FIGS. 8–10, a second exemplary example of the ISD/IRG is shown.

Further, various implementations of the ISD/IRG may be utilized in different implementations. For example, settop 513 may be coupled to any suitable interface such as the IEEE 1394, RF audio/video interface 120, Ethernet interface 119, coaxial interface, etc. A TV may be coupled to the settop. Additionally, a DAT, DVD and/or other audio device 515 may be coupled to the ISD/IRG using a suitable interface.

A typical digital set top device comprises a controller, QPSK or QAM transmitters and receivers and MPEG encoding/decoding . The settop device may communicate with a high resolution HDTV television or an NTSC low resolution television or a personal computer or web-TV type device. The set-top may be coupled to high speed Ethernet or to coaxial cable according to the present invention and include features of the ISD/IRG as appropriate.

Figure 11:
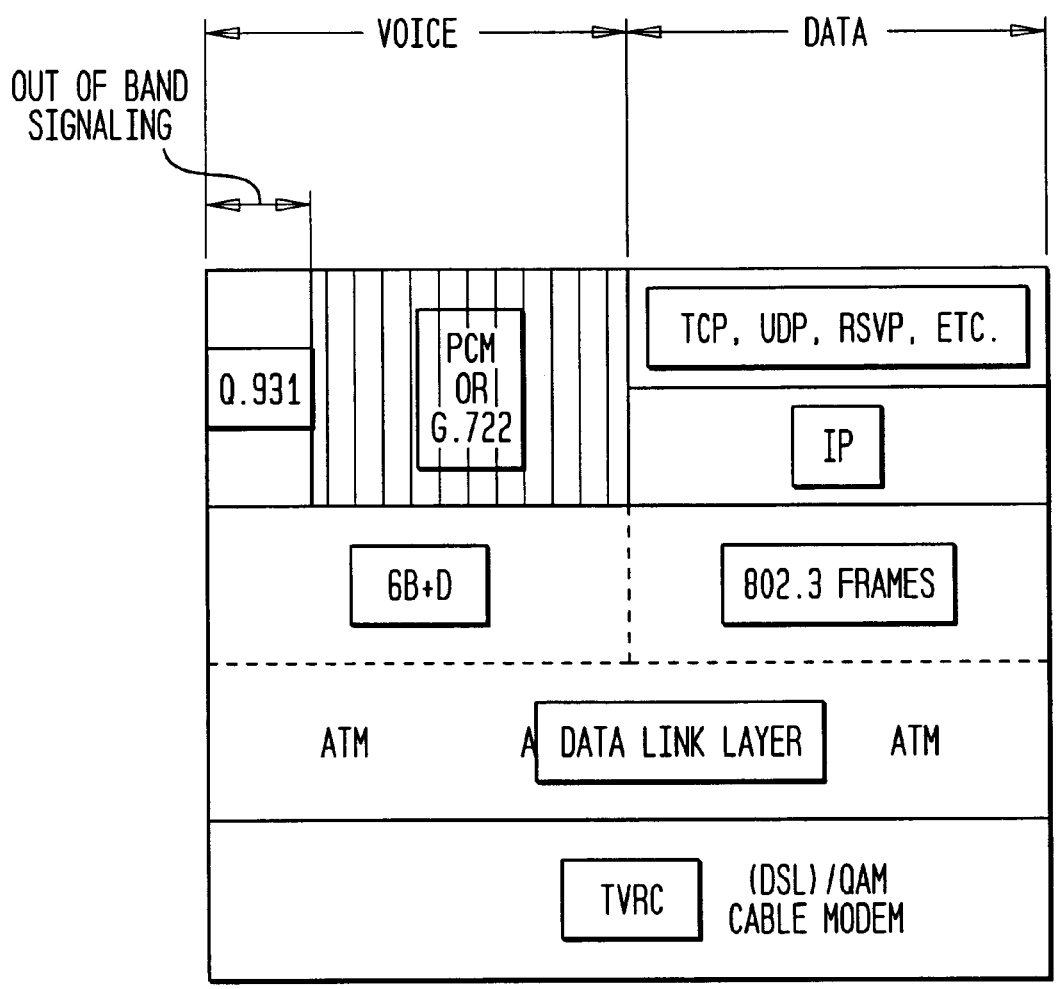
FIG. 11 is an example of one protocol stack for use with the ISD/IRD.

Referring to FIG. 11, various protocol stacks may be utilized to transmit the voice and data. For example, a voice signaling stack such as in-band voice over ATM and/or other voice signaling stack may be used. Additionally, a ethernet and/or other IP stack may be utilized.

Figure 12:
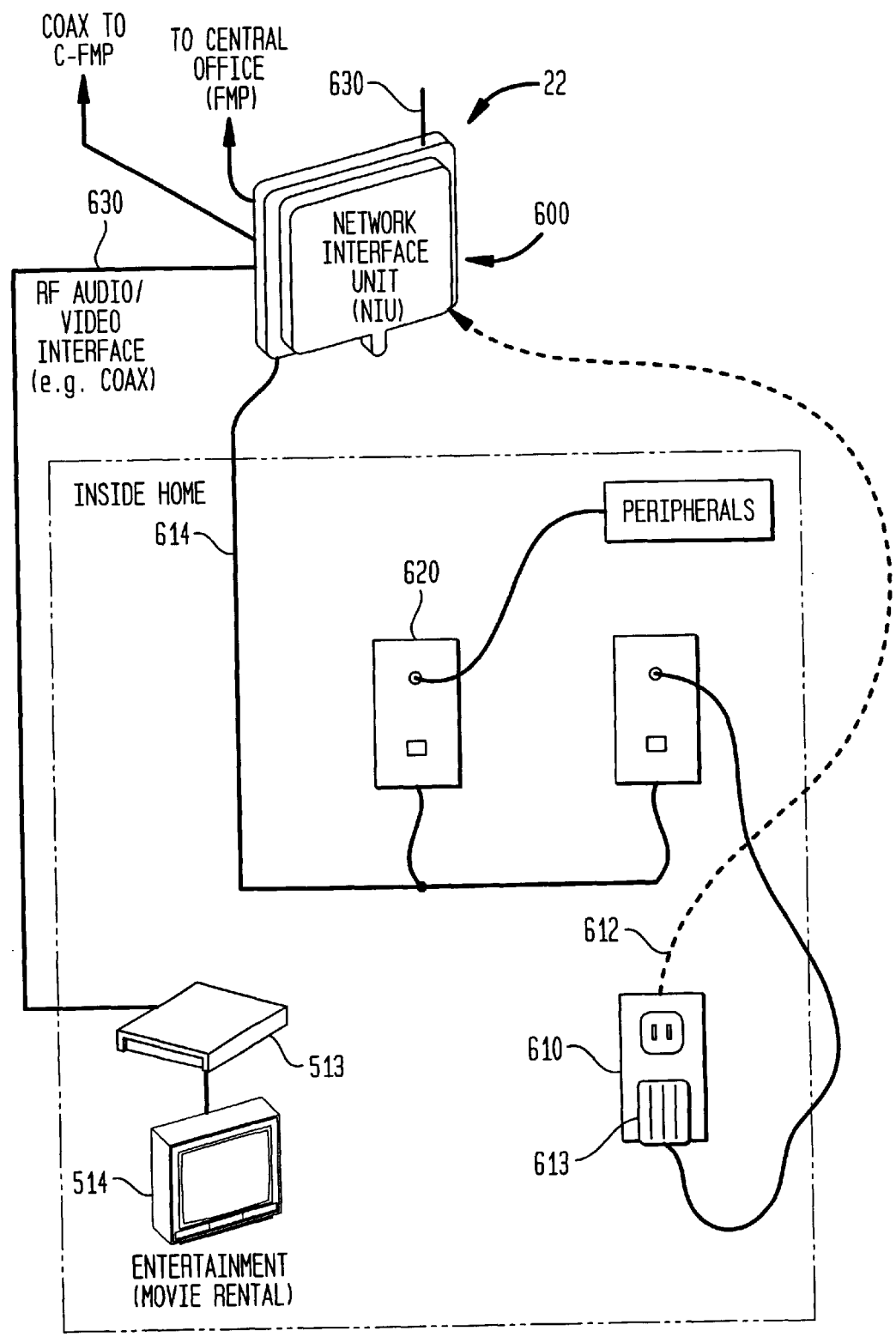
FIG. 12 is a one exemplary embodiment of a form factor for the ISD/IRG.

Referring to FIG. 12, the ISD/IRG may be included in a network interface unit. The network interface unit may be variously mounted either inside and/or outside of the house and/or incorporated into the set top device. Where a DSL/cable modem and/or ISD/IRG is incorporated in the NIU 600, it may be desirable to mount the unit external to the home to allow access for service and to upgrade the ISD/IRG without entering the user's home. Alternatively, the NIU 600 may be provided within the home where power is more readily available and where temperature is more stable. Auxiliary power may be provided via an outlet within the house via a direct power link 612 and/or via a step-down transformer 613 connected to the ISD/IRG 22 via one or more twisted pair phone lines from within the house to outside of the house to the NIU via a spare twisted pair 614. The auxiliary link allows easy retrofit of existing NIUs 600. Where the NIU is incorporated into the settop device, the NIU may be powered from the power supply of the settop device. Phone lines and/or other interface lines may be provided from the ISD/IRG 22 to the house via lines 620 (e.g., twisted pair cabling). The cordless interface 123 of the ISD/IRG 22 may include an antenna 630, e.g., a 900 MHZ or other licensed or unlicensed frequency antenna mounted to the exterior of the NIU 600 including cellular frequencies. The antenna 630 may be used as a cellular base station for other wireless devices associated with other customer premises. Further, a cable 630 may be associated with RF audio/video interface 120 in the ISD/IRG 22. The cable 630 may be coupled to a set-top and/or a TV 514.

Figure 13:
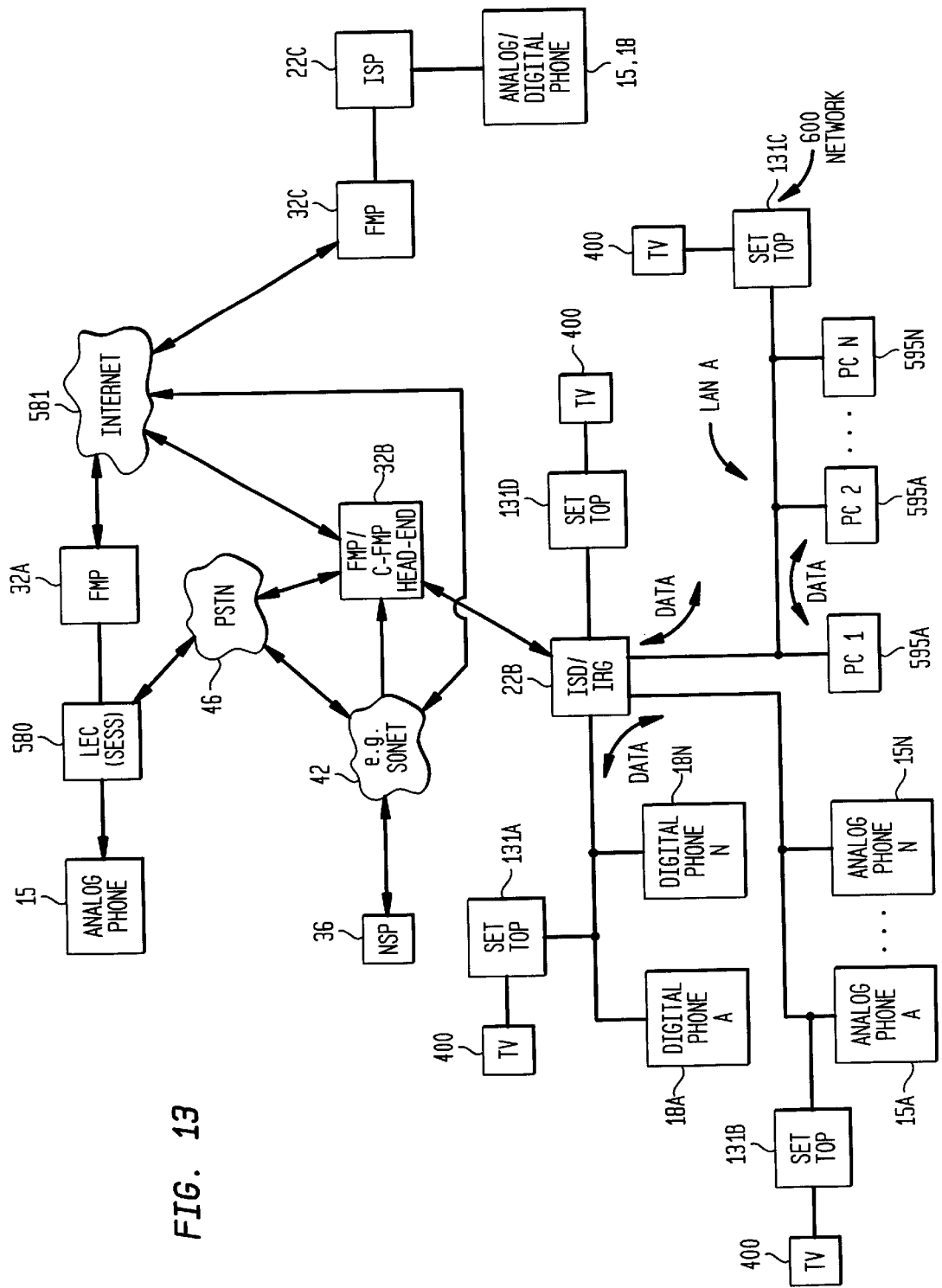
FIG. 13 is an exemplary embodiment of a local house network using the ISD/IRG.

In operation, the ISD/IRG may be variously configured. For example, the ISD/IRG 22 may be utilized as a local house network. For example, referring to FIG. 13, an overall network 600 showing the ISD/IRG functioning in one embodiment of an overall house network. For example, a first ISD/IRG 22B may have associated digital phones 18A–18N, analog phones 15A–15N, and computers (e.g., personal computers) PC 1–PC N. The ISD/IRG 22B may be coupled to a FMP/C-FMP 32B. The FMP/C-FMP 32B may in turn be coupled to a plurality of FMPs 32A, 32C, and one or more networks such as the Internet 581, the PSTN 46, and/or a private network such as a SONET network 42. The FMP/C-FMP 32B may also be interconnected with a NSP 36 as discussed in detail above. The FMP 32A may be connected to a local equipment company's network 580, which may in turn be coupled to the PSTN 46. The LEC network may, for example, comprise a 5ESS switch. The LEC 580 may have a plurality of associated analog 15 and/or digital phones (not shown). Similarly, the FMP 32c may have an associated ISD 22C, coupled to one or more analog and/or digital phones 15, 18.

In operation, the network 600 may include a local area network formed using ISD/IRG 22B as a server. ISD/IRG 22B may act as a server/network controller for local area network LAN A having a plurality of attached PCS. For example, many homes today have a plurality of PCS disposed in different rooms of the house, but not interconnected. By using the ISD/IRG and standard Ethernet software protocol drivers and associated Ethernet cards, the ISD/IRG 22 may function as a network server and/or controller. In this manner, by simply plugging into an existing phone connection, PCS in the house may share date among themselves, among one or more PCS and the Internet 581, between one or more PCS and one of the digital phones 18A–18N (including a video phone). In this manner, the common household problem of how to share information among computers is solved. In one embodiment of this invention, the cable set-top box serves as a Ethernet hub and a plurality of network devices (including Ethernet phones) are plugged directly into the back of the set top.

Figure 14:
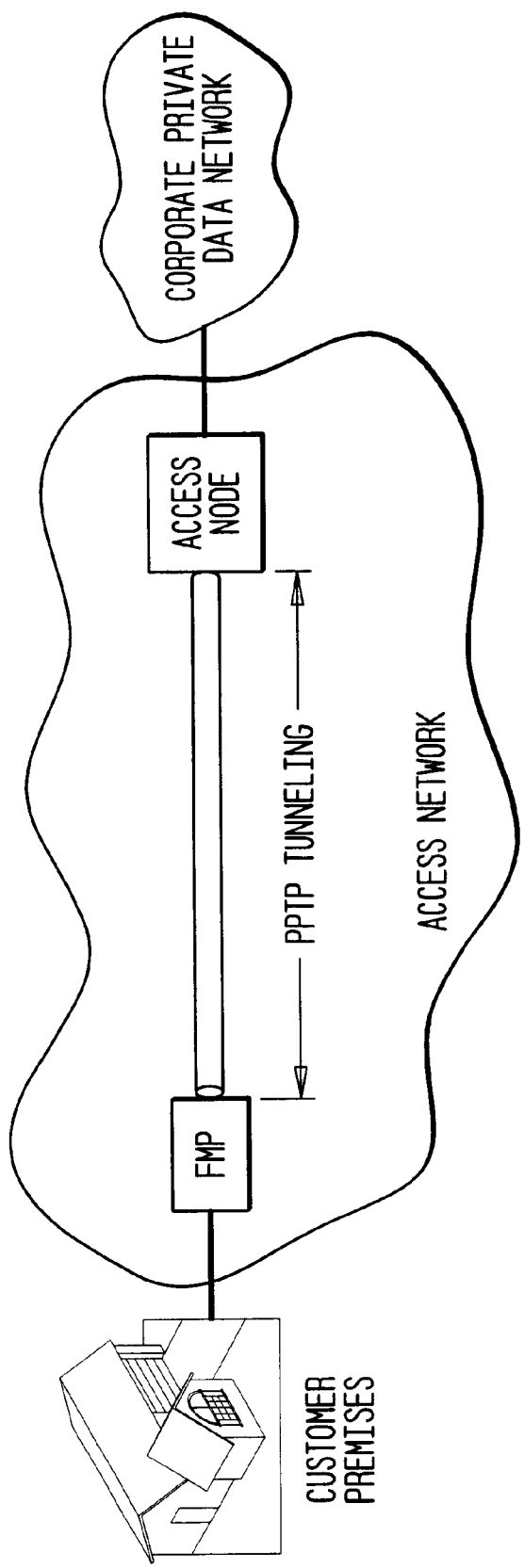
FIGS. 14, 15A, 15B show various implementations of tunneling for use with the ISD/IRG.
Figure 15A:
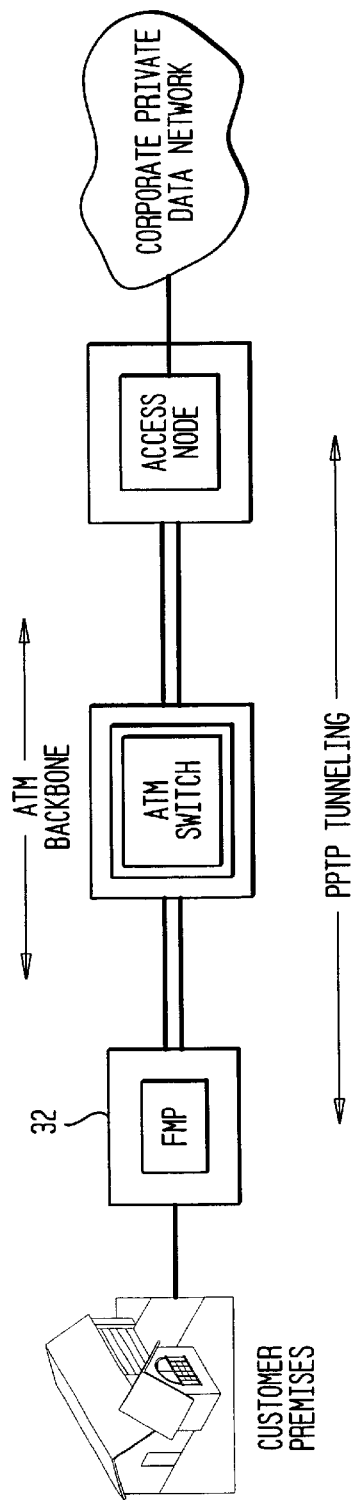
Figure 15B:
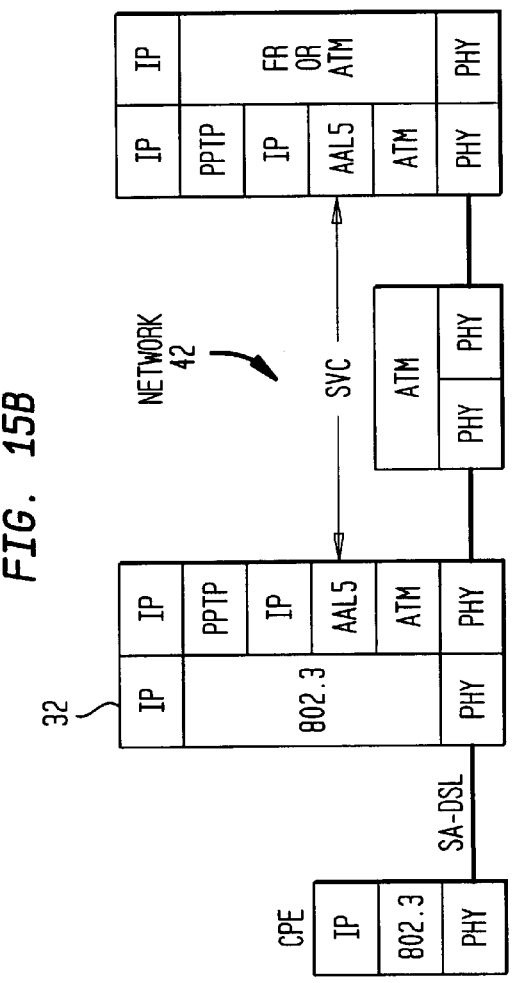

Additionally, the problem of obsolete software is also solved. For example, the ISD/IRG may be configured to download data from the NSP via any suitable protocol such as the use of a proprietary protocol and/or a tunneling protocol (e.g., PPTP) to have direct access to information on the NSP. The head-end operator and/or interexchange operator controlling the NSP may negotiate a bulk rate for the software and then offer this software to his subscribers at a discounted rate. If tunneling is utilized, tunneling may be implemented using any suitable protocol such as point-to-point protocol shown in FIG. 14, 15A, and 15B. Point-to-point tunneling was developed by Microsoft and may include tunnels wrapping PPP packets in IP layers. PPTP tunneling may be either client initiated or client transparent. As alternative, tunneling may be implemented using layer two forwarding developed by CISCO. Layer two forwarding uses layer two protocols such as frame relay and ATM tunneling to provide a point-to-point connection between a remote caching server such as the NSP 36 and the ISD/IRG 22.

For example, the NSP could host a kids game section which has thousands of different children's programs. The NSP supplied programs may appear as one of a plurality of attached devices to the local home network. A user in the home may execute one of these programs by simply accessing an appropriate icon and/or by installing a driver for the program.

Further, because the ISD/IRG has high bandwidth access to external networks, the ISD/IRG may serve as an Internet gateway. For example, by configuring the ISD/IRG as an Internet gateway server, the ISD/IRG allows every computer in the home high-speed access and E-mail capabilities with the Internet. The LAN may also include inexpensive network computers without expensive disk drives and peripherals allowing the average home owner to purchase many inexpensive network computers, e.g, one for each member of the family. Similarly, WEB TV boxes could use the same LAN network LAN A to obtain high speed access to the Internet. The ISD/IRG may be variously configured as a proxy server, such that each of the devices connected to the IP proxy server may utilize TCP/IP protocol and hence access a single IP connection from the IP server located in the ISD/IRG across the connection to the central office. Where the ISD/IRG is configured as an IP proxy server, the ISD may accommodate any number of additional devices that are not TCP/IP devices or Internet literate. In this manner, the ISD/IRG may have a proprietary interface out to the device, such as the set top box, the personal computer, the digital telephones, the VisionPhone, the vision phone enabled set top or other end user devices and yet access the power of the Internet through the ISD/IRG services. So the protocol between the ISD/IRG and the end user devices may be conventional protocols, such as CEBus for meter reading, ISDN for digital telephones and VisionPhones, coaxial cable, fire wire, IEEE 1394 for consumer electronic devices such as video DVD players and/or other similar devices.

In addition to the forgoing, the ISD/IRG as a proxy server may be configured to allow an alternate long distance communication path to remote users, bypassing long distance companies networks. For example, where a reduce quality service is acceptable, telephony over Internet and/or an alternate ATM network may be utilized allowing, for example, analog phone A 15 to communicate with analog phone 15 over the Internet and/or ATM network. Additionally, the ISD/IRD, NSP, and/or FMP may have intelligent processing to dynamically determine the lowest cost provider and route an individual call automatically to the lowest cost provider to that particular location at that particular time. This may be accomplished by configuring the ISD/IRG to establish certain connections over the Internet and/or an interexchange carrier's network either on a continuous basis and/or on a manually enabled basis, for example, using PC 1 and/or vision phone 130, and/or a control device located at the headend, NSP, and/or FMP. Thus, the user and/or service provider would have the option of communicating with other phone customers without long-distance tolls using telephony over the Internet or over a low cost provider. Where the tolls are the same or similar, the system could be programmed to route the calls over a preferred provider's network such as AT&Ts.

Figure 16:
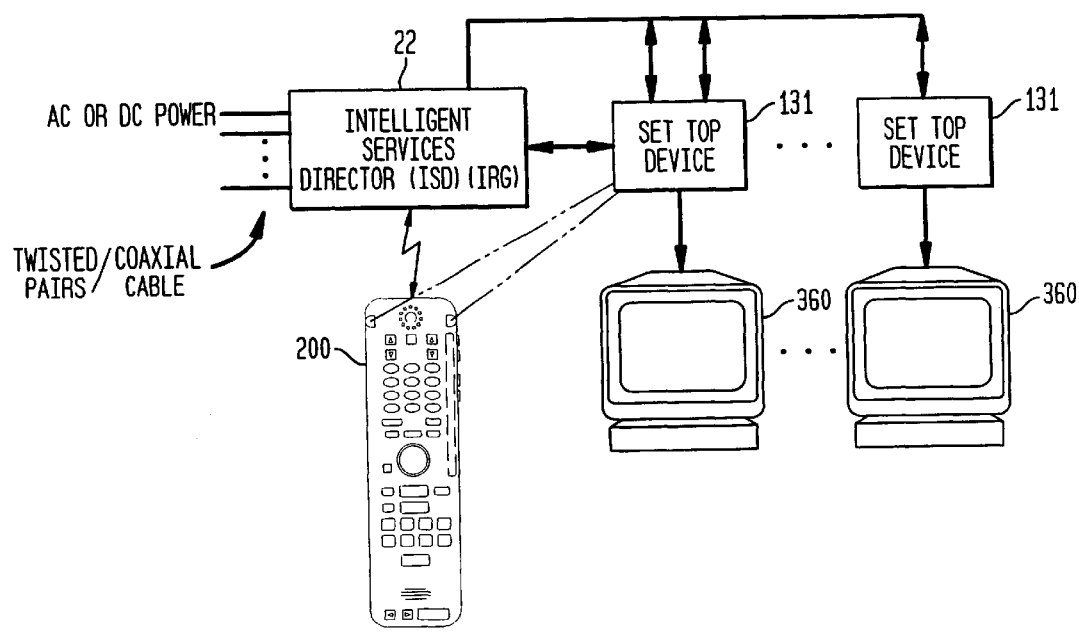
FIG. 16 shows a plurality of ISD/IRG connected settops in a network 500, the ISD/IRG being connected to either or both of a twisted pair or coaxial cable facility.

FIGS. 16–20 depict an integrated remote control and phone according to an embodiment of aspects of the present invention. Referring to FIG. 16, the ISD/IRG 22 interfaces with a set-top device 131, which typically is a controller for a television set 360 on which it sits. The ISD/IRG 22 may be powered at 90 V AC fed via the coaxial cable television drop or via 48 V DC power from the twisted pair and/or a stepped down voltage from the coaxial cable. The coaxial cable drop and/twisted pairs are shown entering ISD/IRG 22 at the left. The ISD/IRG 22 may be coupled to the set top devices 131 using any suitable interface such as Ethernet interface 119 (FIG. 2), IEEE 1394 interface 112, ISDN interface 113, coaxial interface, Business Interface 116, and/or RF audio/video coaxial Interface 120. The ISD/IRG 22 may or may not include an MPEG decoder. In exemplary embodiments, the MPEG decoder may be disposed in set-top 131 to minimize the bandwidth of the ISD/IRG interfaces. Where the MPEG decoder is disposed in the set-top device 131, MPEG packets may be downloaded from the NSP 36, via the network 42, through the FMP/C-FMP 32, through the ISD/IRG 22 and into the settop 131. In exemplary embodiments, video programming is being continuously multicast across network 42 and selectively directed to one or more ISD/IRG devices 22 responsive to a profile input by a viewer and/or responsive to commands by a viewer.

Packets broadcast across a network typically include a program identifier PID. The program identifier, in conjunction with one or more program guide applets may be utilized to select a particular program content from one of a plurality of programs being multicast. For example, the NSP may download an applet (e.g. a JAVA based applet) for enabling a program guide such as a proprietary program guide or a standard program guide such as that provided by Starsight. The program guide application runs on the set-top(s) 131 and allows the user to select particular programs on which to view. The request is then forwarded to the NSP 36 where it may be logged with any appropriate billing information. The NSP 36 may be configured to include a plurality of program tables mapping PID values and/or values output by the program guide from the settop 131 with identifying information to match the program requested with programs PIDs being broadcast. Thereafter the program is downloaded via the FMP/C-FMP 32 to the ISD/IRG 22 to the settop 131. In this manner a log of requests can be recorded and billing records maintained.

Where a plurality of set-tops 131 are located in the home, each set-top may request different data. Where the CPE is a very long distance from the central office/headend, it may be desirable to have more than one twisted pair connecting the ISD/IRG to the FMP/C-FMP in order to ensure that a plurality of programs will be simultaneously available. Alternatively, where coaxial cable is utilized, one coaxial drop may be provided for downstream services. In still further embodiments, coaxial may be utilized for downstream services and a twisted pair and/or twisted pair/cable may be used for upstream services. In still further embodiments, different spectrum may be allocated in a coaxial facility for downstream and upstream as is known in the art.

As a further embodiment, a user may select a particular program stored on the NSP. Since the output to each home may be configuration with the FMP/C-FMP connected to many users, the user may select from a multitude of movies (thousands to unlimited). The movie may either be downloaded in real time to the settop 131 and/or downloaded and stored on a DVD device or other DAT.

In addition to the forgoing, any of the video phone functions and/or set-top functions described herein may operate on the TV under control of the settop and/or ISD/IRG in a similar manner as with the video phone 130. Accordingly, even absent a video phone 130, the settop 131 may be operated in conjunction with the track ball 311 and select key 312 on remote control 200. Thus, the user may select restaurant information, pay bills, select ads, order tickets (e.g., via pop-up windows during commercials for a local sports team which enable the viewer to purchase tickets for a subsequent home game), and/or perform any of the other functions associated with the video phone 130 described herein via remote control.

In addition to the forgoing, where the ISD/IRG 22 is configured as a proxy server, the settop 131 may operate as a WEB TV enabled device. Web pages may be accessed at extremely high rates over the DSL or coaxial cable modem connection giving users a pleasant and easy to use WEB browsing experience.

Referring to FIGS. 17 and 18, remote control handset 200 communicates with a television set-top device 131 in a manner that will be described below. It will be recognized that set-top device 131 can be a modified cable television tuner/descrambler and can be located next to the television set 360. It will also be recognized that set-top device 131 can control other video appliances, such as a VCR, DVD, DAT and/or be incorporated into the video appliance which it controls. The set-top device may also be very inexpensive since a tuner is not necessary, only a MPEG decoder and a controller. Accordingly, since the set-top receives ethernet data, the settop may comprise an Ethernet card built into controller 402 as well as an MPEG decoder built into controller 402. Additionally, the RF receiver 410 and/or RF antenna 132 is not necessary where all programming is received via the ISD/IRG. Additionally, where the RF transmitter in the ISD/IRG 22 is utilized, the RF transmitter in the settop is not necessary. Further, it should be understood that the camera in set-top 420 may be optional.

Referring to FIGS. 17 and 18, handset 200 has a case 202 which houses the electronics (FIG. 20) that enable handset 200 to communicate with set-top device 131 via infrared (IR) and/or radio frequency (RF) in a manner that will be described herein. Case 202 has a front face 204, a rear face 206, a top end 208, a bottom end 210, a left side 212, and a right side 214.

Front face 204 may have a user interface comprising control keys for activating various functions. For example, front face 204 may have a standard alphanumeric telephone keypad 216 and ancillary cordless telephone function keys, such as REDIAL, AUTO DIAL, FLASH, HOLD and telephone ON/OFF keys. The alphanumeric keypad 216 may also control video/audio functions in conjunction with ancillary video/audio function keys, such as POWER, volume (VOL ↕), channel (CH↕), last channel swap (LAST CH), and TV MUTE. Other keys may select the device to be controlled, such as TV, VCR, and/or DVD. Additional keys (MENU, ENTER/RECALL, REMOTE VIDEO, AUDIO, LOCAL VIDEO, PIP, OFF) activate certain on-screen programming, adjustment and control functions for telephone usage, video viewing, etc. Further, any of the hot/control buttons, soft keys, and/or touch screens referred to herein may be utilized in conjunction with the TV/remote combination. Also front face 204 may include one or more openings for a microphone 218 and/or a loudspeaker 220 which enable the handset to function as a telephone with the loudspeaker held to the user's ear and the microphone adjacent the user's mouth. The weight of the handset preferably is more or less evenly distributed so that it feels balanced and is comfortable to hold when used as a telephone or as a remote control.

Several of the keys on the handset provide, in conjunction with appropriate software, for example, running in set-top controller 402, and/or controller 102 in the ISD/IRG 22, unique control of the incoming and outgoing (local) video and/or audio components of a telephone call. For example, the VIDEOPHONE MENU key 310 may display on the handset 200 may display any of the videophone menus described in the applications incorporated by reference herein. In place of the disclosed touch screen, the present invention contemplates the use of a track ball 311 or other screen navigation device in conjunction with SELECT key 312 to point to and activate various virtual "buttons" that are displayed on the screen to form a graphical user interface. Phone services accessed by the phone menus may include caller ID, speed dials, etc. The REMOTE VIDEO key 300 displays/removes the remote caller's video image on the television screen, while the LOCAL VIDEO key 301 displays/removes the local caller's video image on the television screen. Further, picture-in-picture or PIP keys 302, 303 for the remote and local video images enable the local caller to view the video phone menus, view himself, the remote caller or both, or even display one or both callers along with video programming from another source such as the set-top device 131. An OFF key 304 electronically disables and/or mechanically shutters the local caller's video camera (which may be located, e.g., on top of the television set) so that the local caller can decide whether he should be seen by the remote caller. A DIAL ON-SCREEN NUMBER button is provided for expeditiously dialing a number displayed during an advertisement or through an on-screen directory service. In accordance with the invention, a HANDSET SPEAKER ON/OFF button 350 is provided for quick deactivation and activation of the handset speaker and overlay of the voice call audio signal on the video signal sent to the video appliance via set-top device 131.

In accordance with one aspect of the power-saving features of the invention, the AUDIO key 305 is associated with the remote caller and allows the local caller to direct the audio portion of the remote caller's signal either to the handset loudspeaker 220 or to the speaker system of the video appliance 360 for amplification and broadcast over the television speaker or remote speakers. Where the audio is broadcast over the television speaker, the phone audio volume may be controlled via phone volume controls 306. Thus, the phone audio may be overlaid over the TV audio output with the relative volume or muting of each controlled separately. By using the TV loudspeakers instead of the speaker in the remote control, the battery life in the remote control is conserved. For enhanced ergonomic function, the TV volume control 307 and the phone volume control 306 may be located on the side of the phone (FIG. 8) to allow adjustment of the relative volume of the TV and/or phone audio while talking on the phone. Where surround sound is available, the audio from the phone could be made to come from a different location such as behind the viewer whereas video sound is in front of viewer. Alternatively, the handset may be provided with a controller which will automatically mute or lower the volume of the TV when an incoming call is received or answered.

During use as a telephone, voice and DTMF tone communication through set-top device 131 and/or ISD/IRG 22 may be accomplished via a radio frequency link preferably at a frequency of 900 MHZ or other licensed or unlicensed frequency, by means of an antenna 132 on set-top device 131 and/or cordless interface 123 on the ISD/IRG 22, and an antenna 222 which may be completely concealed within case 202. Antenna 222 is located along one side of case 202, and the electronic components within the case are appropriately shielded by a metal clam-shell structure (not shown) to prevent unwanted interference from the radio frequency transmissions. Although it is preferred to completely conceal antenna 222 within case 202, a partially concealed antenna, or an external antenna, could be used instead. Where an external antenna is used, it is desirable to have multiple infrared diode (IRD) ports to prevent the external antenna from interfering with a single IRD port.

While all communication functions could be effected via the radio frequency link or an infrared link it is preferred that audio/video control and commands be communicated through the infrared link while audio communications and/or commands are carried out via the antenna. Set-top device 131 has an infrared detector 133 on the front of its base which receives infrared signals from any of four infrared emitting diodes 224, 226, 228 on handset 200. These diodes preferably have broad beams and together afford maximum infrared coverage for a hand-held remote control device. The diodes may be located on one, two, three, or four faces at and near the top end of case 202 so they will not be rendered inoperative by being covered by the user's hand, which normally engages the lower half of the handset, or as the user turns.

Conventionally located on the top end 208 of case 202 is an infrared emitting diode 224. When the top of handset 200 is aimed generally at set-top device 131, infrared signals emitted by diode 224 are received by detector 133.

For added versatility and convenience, an infrared emitting diode 226 is located on each side of case 202. Signals emitted by one of these side-mounted diodes are received by detector 133 when the user holds the handset with one side generally facing the set-top device 131, such as when the user is holding the handset to his ear during a telephone conversation, generally facing the television set where the remote caller's video signal may be displayed, and wishes to adjust a video function. Having a diode on each side of the handset insures infrared communication regardless of which ear is placed adjacent loudspeaker 220. Thus, volume may be adjusted while the user speaks on the phone. One of the side-mounted diodes 226 also may come into play when the handset is held more or less horizontal but the user turns away from the television set while depressing a command key.

Further, an additional infrared emitting diode 228 is located on the rear face 206 of case 202. Signals from this rear-mounted diode are received when the rear of the handset is held generally facing the set-top device 131. This would occur when the user turns his head away from the television set while holding the handset to his ear. It also allows the handset to function when it is held up by the user for easy viewing of the controls on the front face 204.

Handset 200 preferably is powered by a rechargeable battery or power supply 404 (FIG. 8). The battery may be recharged when the handset is not in use by placing it in a mating recharging cradle in set-top device 131 and including a pair of hot contacts which mate with contacts on case 202. Conventional circuitry in set-top device 131 prevents overcharging of the battery. If the set-top device is integrated into the video appliance which it controls, such as a video receiver, a similar recharging cradle could be provided on the top or the side of the appliance housing. Alternatively, or in addition, a remote recharging cradle powered by line current could provide a more convenient charging location for the handset when not in use.

Although handset 200 is illustrated as generally flat and rectangular in shape, it may take any form as long as it is convenient and comfortable to use as described. The handset could, for example, be ergonomically contoured to more closely fit the hand and the side of the head, e.g. with a curved dumbbell face.

Figure 19:
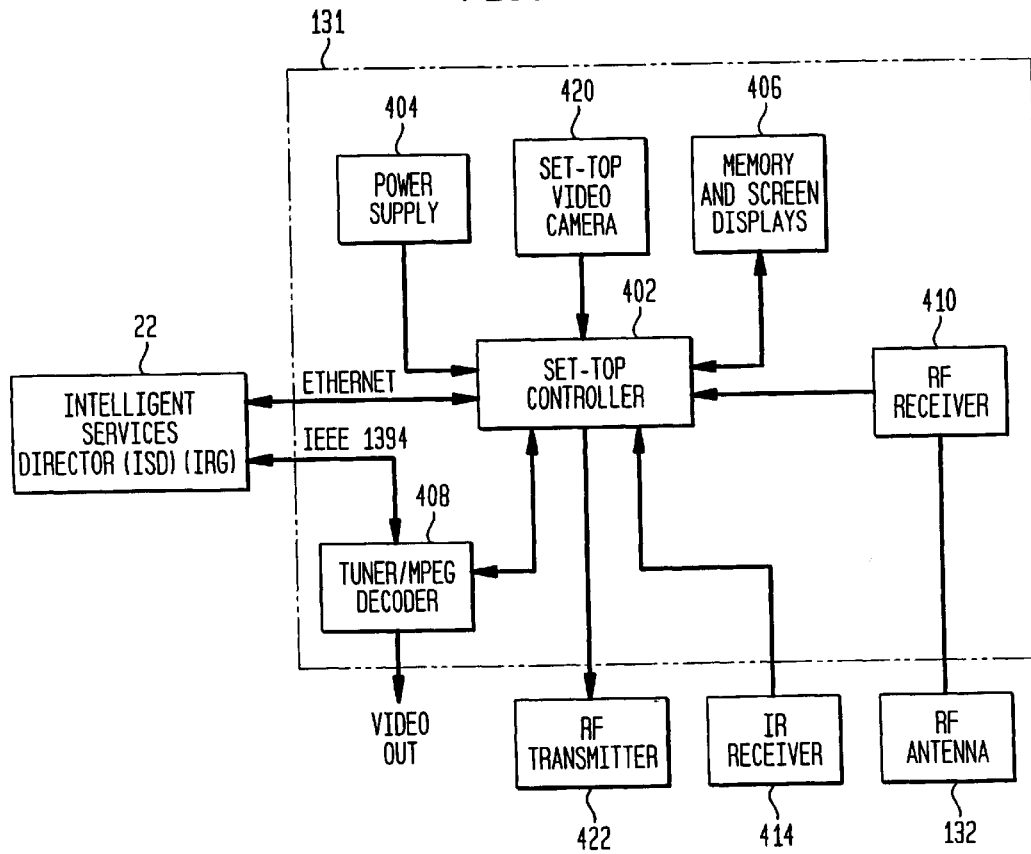
FIG. 19 shows an exemplary architecture of a settop.
Figure 20:
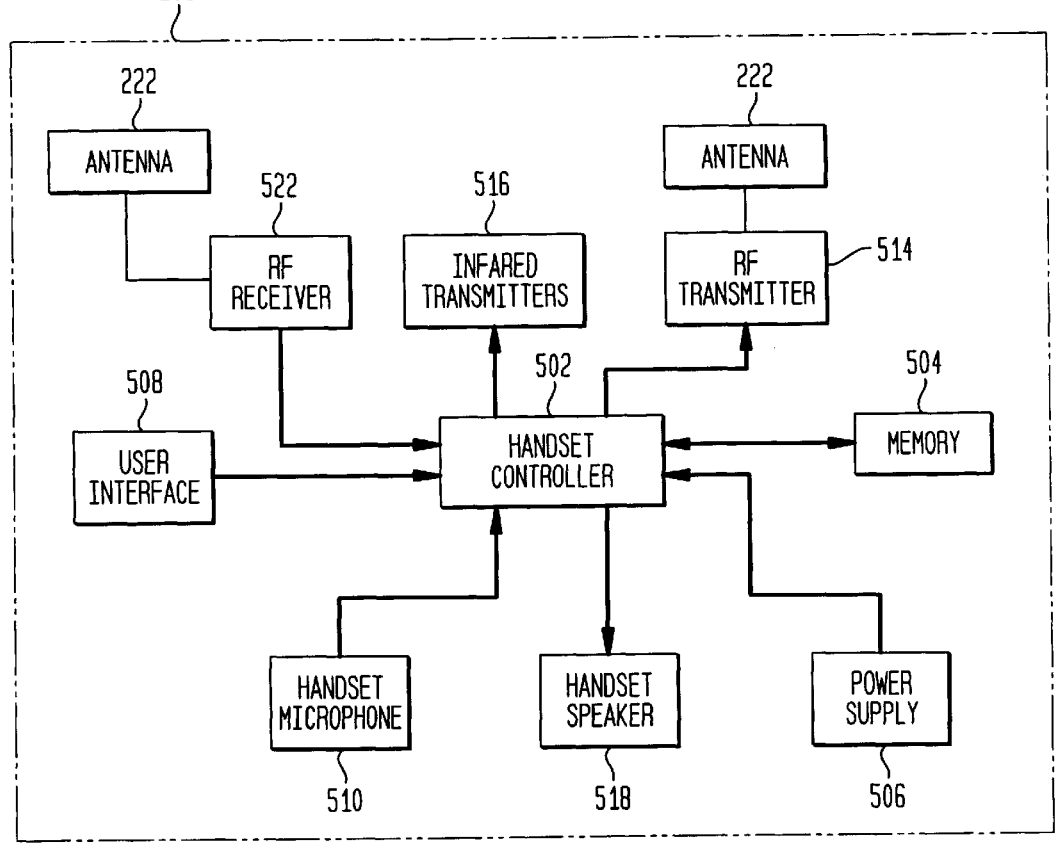
FIG. 20 shows an exemplary architecture of a remote control.
Figure 21:
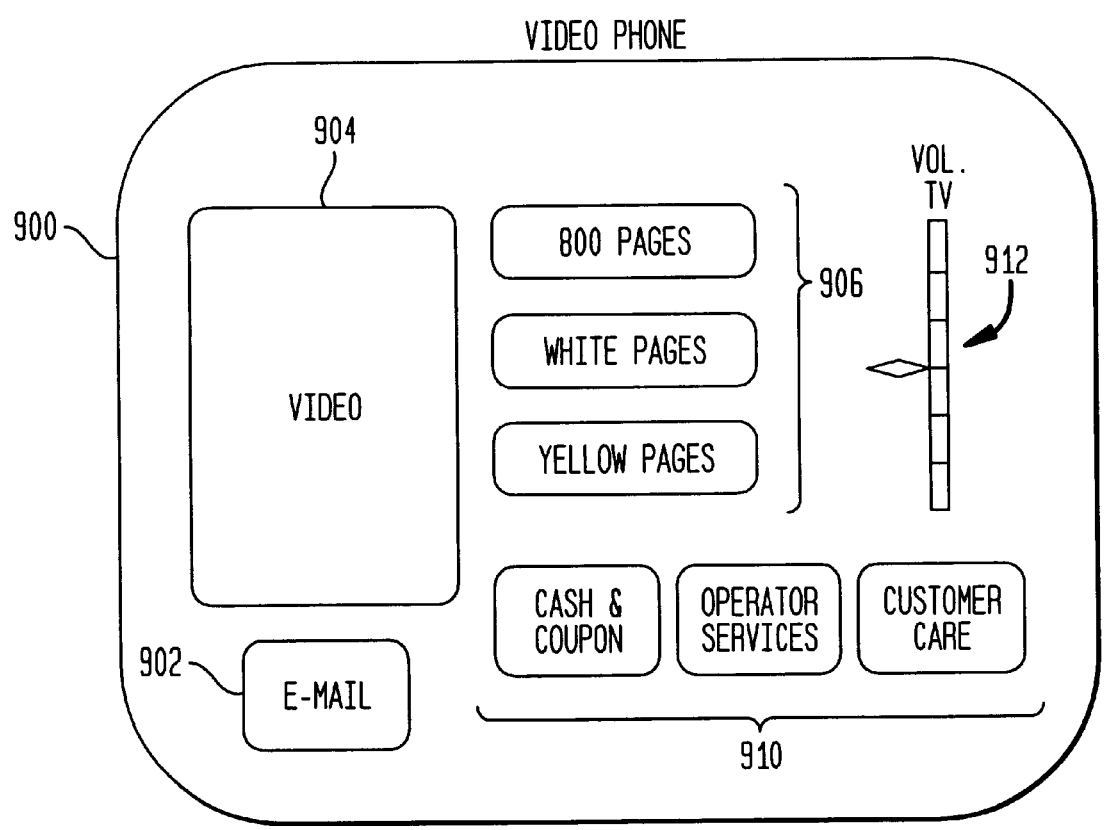
FIGS. 21–24 show exemplary architectures of video screens output by a settop.
Figure 22:
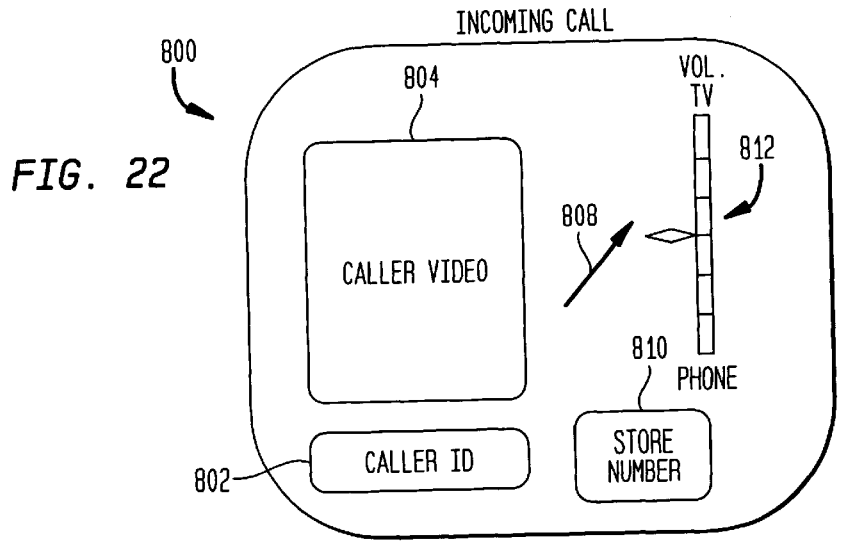
Figure 23:
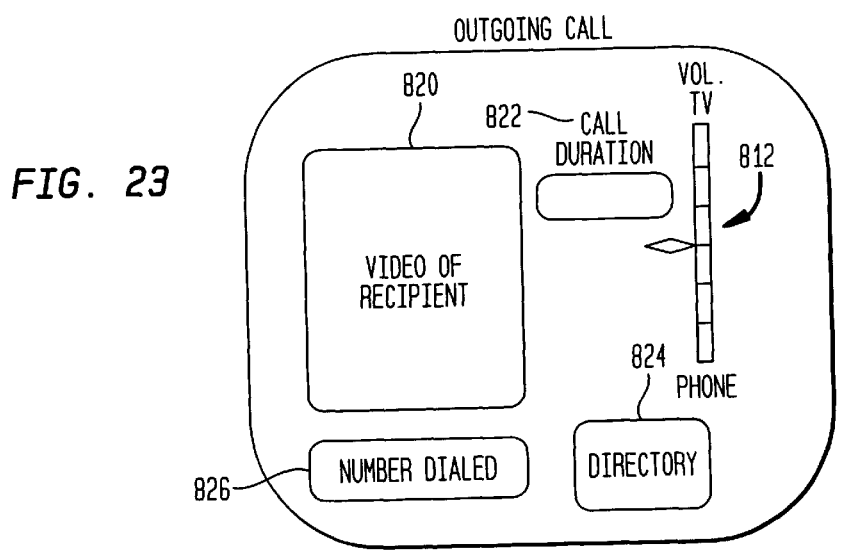
Figure 24:
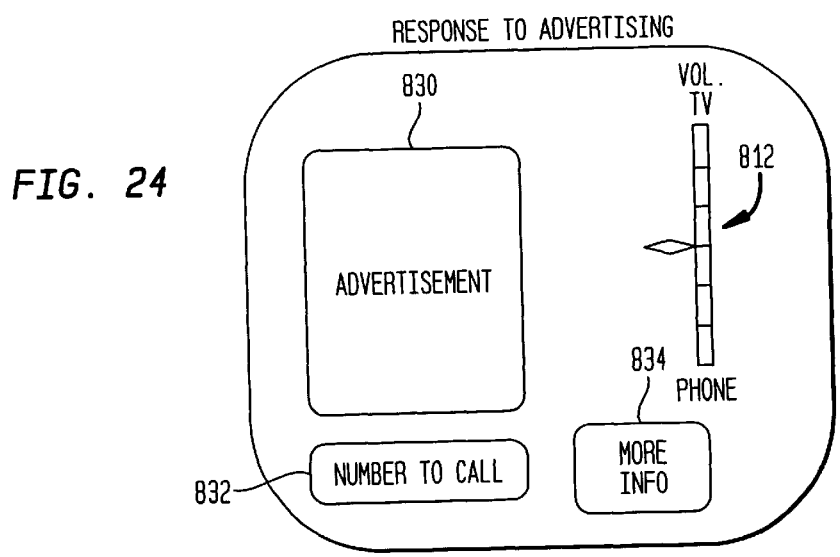

Referring now to FIGS. 19–20, the architecture of the integrated remote control and telephone and the set-top device 131 are schematically depicted. Set-top device 131 includes a set-top controller 402, which may be a microprocessor-based control unit for executing a series of instructions stored in memory unit 406. Information corresponding to various screen displays associated with the video phone interface may also be stored in memory unit 406. Controller 402 is powered by power supply 404 which is preferably a transformer for providing the voltages necessary to operate controller 402 from standard household current.

RF receiver 410 receives a signal, which corresponds to the voice and DTMF tone communication transmitted from handset 200 and provides a corresponding signal to set-top controller 402. RF antenna enhances signal reception of RF receiver 410. Local video is provided via video camera 420 which may be housed within set-top device 131 or, alternatively, installed as a separate device with a video feed to a port (not shown) in set-top box 131. IR receiver 414 receives an IR signal, which corresponds to audio/video control and commands, from handset 200 and provides a corresponding signal to controller 402. Controller interprets the corresponding signal and executes appropriate instructions according to a predetermined instruction set stored in memory 406.

Video broadcast signals may be directed via a cable and/or IEEE 1394 link from the ISD/IRG to tuner 408 which is controlled by controller 402 and generates a VIDEO OUT signal usable by the video appliance. In accordance with the invention, the VIDEO OUT signal may include an audio signal overlay which corresponds to a caller's voice. The ISD/IRG Ethernet link also communicates with controller 402 in order to provide various interactive services described in the applications incorporated herein by reference herein. These services may include the processing of incoming voice and data communications. Incoming voice signals are sent to set-top controller 402 via the ISD/IRD Ethernet link. Controller 402 generates a signal to RF transmitter 422 which sends the incoming voice call signal via RF link to the handset. RF receiver 410 and RF transmitter 422 may be appropriately duplexed to prevent the reception by RF receiver 410 of the signals transmitted by RF transmitter 422.

Referring to FIG. 20, the architecture of the handset 200 includes handset controller 502 which is capable of executing instructions stored in memory 504 and writing thereto. A rechargeable power supply 306 provides power to operate controller and all circuitry associated with handset 200. As described above, handset 200 is equipped with at least three infrared transmitters 516 which generate IR signals corresponding to signals or instructions sent from handset controller 502 for reception by infrared receiver 414 on set-top device 131. Similarly, an RF transmitter is provided for generating RF signals corresponding to the instructions or signals sent by handset controller 502 to RF receiver 410 on set-top device 131.

Telephone signals corresponding to incoming voice calls are received by handset via RE receiver 522 and broadcast to the listener via handset speaker 518. In accordance with the present invention, however, the handset speaker 518 may be deactivated via user interface 508, which, as explained above, includes an AUDIO on/off button 305. Handset controller 502 may be provided with appropriate instructions such that, when AUDIO button 305 is set to deactivate handset speaker 318, or when telephone volume buttons 307 are depressed to reduce the handset speaker volume to zero, the incoming voice call audio signal is no longer broadcast from the set-top device 131 to the handset, but instead is merely overlaid on the video signal sent from set-top device controller 402 to tuner 408. This feature of the invention results in significant energy savings and prolonged life of the handset power supply 506.

The caller's voice signal may originate from the set-top device or from a separate wireless phone base unit, or even from a cellular network. It will be recognized that the invention finds application to each of these wireless telephonic systems. For example, as described in the applications incorporated herein by reference, the caller's voice signal may originate from the same network as the video broadcasts, in which case the caller's voice signal originates from the set-top device 131. In that case, the handset 200 would not require electronic circuitry for relaying the caller's voice signal back to the set-top device when the handset speaker is deactivated. Instead, the handset controller 502 would be adapted merely to transmit a control signal via transmitters 516 to the set-top device 131 such that set-top controller 402 overlays the voice signal. Since the caller's voice signal is already being processed through set-top controller 402, there is no need to relay the caller's voice signal from the handset to the set top device 402. On the other hand, the voice signal may originate from a source other than set-top device 131, such as a separate wireless phone base unit (not shown). In such a case, for the audio signal to ultimately be overlaid on the video signal to the video appliance 360, the handset controller 502 would be adapted to operate handset transmitters 516, or an RF transmitter (not shown), to convey signals recognized as a telephone audio overlay commands by the set-top device controller 402. The controller 502 would also be adapted to subsequently forward the caller's voice signal from the handset 200 to the set-top box 131 via transmitters 516 . Thus, the caller's voice signal would be transmitted from the base station to handset 200 via RF or IR link, processed by handset controller 502, and, in response to a user selecting the appropriate control keys on the user interface 508, be relayed to the set-top box using an IR or RF link in response to the user selecting a predetermined volume level for the handset speaker 518. In this manner, the invention may be utilized to conserve energy stored in the handset power supply 506 when it is desired to deactivate the handset speaker 518 and utilize the video appliance speaker to broadcast the caller's voice. It will be recognized that this aspect of the invention is applicable to wireless phone handsets which may or may not incorporate set-top device remote control features.

One telephony/cable television problem being addressed by the present application is the provision of lifeline support for telephoning over a cable distribution system. Referring again to FIG. 1D, the lifeline support may be divided into several sections including a head end section, a distribution network section and the home/customer premises section. Where a lifeline support is provided to a cable system, the power necessary to drive the lifeline devices needs to be provided, for example, through the coaxial cable to the home. One option for providing this power and lifeline support is to connect the telephony into a hub 62 of the cable network and only provide lifeline support from the hub 62 downstream through the nodes 61 to the house network, excluding support for non-essential services such as video. The average power requirement for a two line telephone is 3.1 watts, accordingly, the lifeline power distribution network will require at least 3 watts per household distributed throughout the network. In a typical network there are 20 nodes or less per hub 62 and 500–1000 houses per node 61. In the current system there can be many as 500–1000 houses per node 61 or 3,000 watts per node 61. In some embodiments, 3,000 watts per node may be excessive given the current size, weight, and heat dissipation qualities of the node 61. Accordingly, it may desirable to drop the number of houses per node 61 to 200 or less making the power requirements to support lifeline at about less than 1000 watts, and preferably around 600 watts per node. The cable system currently uses as a standard component a two-drawer file cabinet size box which is positioned at the base of a pole and has batteries in the bottom of the box and a power supply for converting either 110 or 220 V AC into 90 volts AC for supply out onto the cable network. One solution for lifeline is to use the existing distributed battery backup systems as described above distributed throughout the cable network to provide lifeline power into the home from the batteries in the file cabinet size batteries backup supplies. In this manner, by placing the battery backup supplies either in and/or downstream from the node and the hub, the node and the hub no longer need to be powered from the head end, but may receive local power. As an alternative solution, lifeline support can be provided into the node or the hub with a fixed number of twisted pair of lines which go directly to a local exchange and provide lifeline support on a selected statistical basis. In this manner, the existing lifeline support infastructure and battery back-up developed for traditional telephones local exchanges can be utilized by directly connecting into a node or hub of a cable network. For example, a mini-PBX or other switching arrangement may be distributed throughout the cable system such that telephony is split-off prior to the head-end. This allows the various distributed nodes/hubs throughout the cable network to provide local services. These mini-distributed-PBXs may be located in the standard component a two-drawer file cabinet size boxes described above and co-located with the node or hub. A high-speed DSL, fiber, or other link may connect the mini-distributed PBX with the local exchange and/or PSTN.

With regard to FIG. 1D, there are several alternatives for providing lifeline support into the cable system. In a first alternative, the lifeline support is provided to the node 61 where the node is coupled to the FMP/C-FMP through, for example, a DSL twisted pair of connection. The DSL twisted pair connection need not provide power but only a continuously active connection with the PSTN which may support numerous lines, e.g., up to 600 or more subscribers. In alternative embodiments, the DSL twisted pair of lifeline connection may be interconnected through a hub 62 or through the head end 63. Where higher bandwidth is required, e.g., as with in a head-end 63, fiber may be substituted for the DSL twisted pair connection.

The different alternative embodiments between connecting the lifeline support through either the node, the hub or the head end may be influenced by the particular type of distribution facilities that the cable network employs. For example, where a node is employed on a telephone pole it may be a simple matter to connect the twisted pair of DSL lifeline support directly into the node on the telephone pole. However, where the node is buried underground, it may be more difficult to provide lifeline DSL support into each of the individual nodes. In these embodiments, it may be useful to provide the DSL lifeline support into the hub as opposed to into the node. Where the DSL lifeline support is provided into the hub there may also be additional room to provide circuitry within the hub whereas the space requirements within the node are often extremely limited because these are often pole-mounted. In yet alternate embodiments, the DSL lifeline support may be provided into the head end. However, providing the lifeline support into the head end often requires that the entire cable distribution network remain powered in the event of a power failure. In yet alternate embodiments in some cities the cables are provided underground in manholes. In this embodiment, either the node, hub or head end connected DSL may be appropriate because the telephone cables are typically co-located with the cables in the manholes and may be interconnected to provide lifeline support. Although the foregoing discussion is centered primarily on how to interconnect the phone system lifeline support with the cable network, it should be noted that these embodiments are exemplary and may each encompass one or more aspects of the invention.

The following discussion describes how power is passed through each of the different components on the cable network. The first discussion will center on the individual tap modules and how to pass power from the node through the individual tap modules to the homes. In each of the individual taps the cable system has power in the cable at 90 volt 60 cycle power which is distributed through the center of the coaxial cable whereas the signal is distributed along the outer edge of the center coaxial cable in a skin effect since the high frequencies are distributed towards the outer edge of the cable. In passing the power through each of the taps, the cable is actually severed at each tap and a circuit board is interconnected between the input and output of the tap allowing for the power to be filtered as well as isolation of each of the individual houses coming off the tap providing the high frequency cable system into the house. In the most preferred embodiments, the face plate may be removed without affecting power for all downstream homes from the tap. In this manner, highly reliable power systems may be utilized to provide continuous power downstream of the tap while the individual components on the tap are being serviced. As an alternative, the tap may be configured to step-down the voltage to a lower voltage and/or convert the voltage to a DC voltage. In some embodiments, the power passing tap may include a voltage regulation circuit (which may be integrated into a single integrated circuit having a power sink coupled to the body of the tap) to regulate the voltage to a DC voltage, e.g., about 48 volts DC.

The tap may comprise of a series of splitters which split the power into each of the individual tap sections. In these embodiments, the tap may be configured to such that the tap continually passes power to the house over the tap drop regardless of whether the faceplate is removed as the tap is being serviced. In this manner, the tap may include first and second circuit boards with the first circuit board providing nothing more than a power takeoff and signal takeoff of the main board. Today there exists cable with coax and twisted pair and power leads all within a single cable, some of which also include fiber. Accordingly, in one aspect of the invention, coming out of each of the taps is a specialized cable that includes not only a coaxial connection but also a power connection and/or a twisted pair connection. Commscope is a supplier of customized cable that will allow twisted pair, fiber, and coax cables to coexist. The options with the tap housing for cable or pedestal mounting include: in a first embodiment the tap housing would simply have a single printed circuit board having a plurality of connectors on the circuit board and an EMI and hermetic seal, e.g., a circular seal, around each of the connectors so that when the top of the tap housing was secured onto the bottom of the tap housing (e.g., using screws), the hermetic seal would seal each of the coaxial connectors and thus, the top could be removed from the tap housing without affecting the printed circuit board disposed therein. In alternate embodiments, the coaxial cable outputs or taps could be located in the back, top or side of the tap housing and thus not need to be removed when the faceplate was removed. Thus, the face plate can be removed giving access to either a primary/main and/or secondary printed circuit board. One advantage of the IP telephony is that the telephone call circuit is not broken just because you removed and replaced the plate or a tap circuit board in a cable distribution network. For example, it is possible to unplug the Ethernet interface in an IP phone, plug the phone back-in, while continuing the phone call. This can be used to service the taps by temporarily bypassing the individual tap without losing the IP telephony call. The IP telephony call will often allow you to break for several seconds to several minutes without actually losing the call.

As an alternate embodiment, a GFI or other ground fault interrupt connector may be located in a tap housing or the ISD/IRG to prevent injury to small children or maintenance worker who is unplugging and disconnecting the cable system where power is provided to the home through the tap. If you do get a ground fault interrupt, the next question is how do you reset it. In one embodiment you may have it automatically reset after a period of 5 or 10 minutes. In alternate embodiments you may have to have a technician come out and open the tap or ISD/IRG box and manually reset the ground fault interrupt. In still alternate embodiments the ground fault interrupt could be reset by the user with a selection panel at the ISD/IRG. As an alternate embodiment, it is possible to locate the ISD/IRG device directly in the tap where power is already located. Or the cable may be passed through the ISD/IRG and the tap located where the ISD/IRG would be located. If the ISD/IRG is combined into the tap 60, a single ISD/IRG device can be shared with 3 or 4 houses thus drastically reducing the cost of the ISD/IRG per house. Further, the cable running to each of the individual houses who want to be ISD/IRG enabled, can be a hybrid coaxial/twisted pair cable such as an F59 HEC/3-22 made by Commscope of Hickory, N.C.

In an alternative embodiment, it may be appropriate to migrate the ISD/IRG in the direction of the cable set top terminal 131. This has advantages of providing the services and control of television services in the vicinity of the control of telephony services. This is particularly usefull where there exists a commonality of facilities (twisted pair and coaxial cable) in the vicinity of the set top terminal. Further, where the ISD/IRG is integrated into the settop terminal the costs may be minimized since many of the circuits of the ISD/IRG are already located in the settop terminal.

One of the major problems currently with the return path is that the signal from each of the homes is at vastly different levels. The different levels on the return path signal is due to a number of factors such as differences in the in-home wiring schemes between each of the individual houses, differences in the distance from the tap to the house and differences in the distance from the particular tap the house is connected to the node. Normally, the return path is consolidated at the node and not at each of the individual tap locations. Additionally, where the return path for each of the individual homes is returned at a different frequency, the different frequencies will also have different delays. One manner of alleviating many of these problems is to place the ISD/IRG within the tap. In this manner, when return path signals are sent back to the ISD/IRG, the ISD/IRG has an opportunity to adjust the signal strength and frequency of the return signal such that when the signals arrives at the node they are all approximately the same level and therefore can be multiplexed and returned to the head end in a more efficient manner. The invention also has the advantage in that no power is required to be supplied to each of the individual houses to power the ISD/IRGs. In this configuration, the power is provided only to the tap and downstream of the taps to the houses is provided simply lifeline support on a twisted pair and the cable is not powered. Thus, there is no need to provide 90 volts or step down 90 volts downstream to the house, thus safety is increased as well as the overall efficiency of the system. Additionally, by having an active tap device, it is possible to packetize all telephone traffic at that point and thus the additional amount of bandwidth is substantially conserved since the IP packets and the voice can be compressed and simply put on the return path with all of the other IP packets from any other house utilizing the return path as well as data. In these embodiments, the voice may be packetized in IP packets just like data. Thus, the return path may be indistinguishable between voice and data. Alternatively, the data packets may be marked separately from voice such that during a power outage, only the voice packets are forwarded. Placing the ISD/IRG in the tap also may provide additional efficiency in that the downstream data may be packaged for a single tap location and have the tap thereafter make the distribution between each of the individual houses associated with the tap. In this manner, a greater level of efficiency can be provided over the overall cable network in both the upstream and downstream transmission directions. Another option is to include with the ISD/IRG and/or individually a separate amplifier in each tap so that the signal is amplified and filtered at each tap on the high frequency cable system. In this way, it is possible to avoid a lot of amplifiers distributed throughout the system.

For multi-dwelling units, it is also possible to use similar concepts. In a multi-dwelling unit, a line is run either from a node or from a tap with a splitter into a multi-dwelling unit then within the multi-dwelling unit there are a plurality of taps located in a patch board in the basement for supplying each of the individual dwelling units. For example, a particular apartment may have an apartment amplifier which brings the signal in off of one tap or a node and amplifies that signal and then redistributes the signal to each of the individual apartments. In this manner, the amplifier may also include a high performance ISD/IRG for supplying PBX and other user services to each of the multi-dwelling units. The high performance ISD/IRG and integrated apartment amplifier, provides the following functionality: cable television service, high speed Internet access, telephony, data services, alarm and monitoring and all of the other services disclosed in the other applications herein incorporated by reference. The ISD/IRG in the multi-dwelling unit also provides lifeline support and may include a battery backup. In exemplary embodiments, the apartment house may be wired with the hybrid coax/twisted pair cable such that each of the individual dwelling units gets not only cable television but also its telephony services directly from the high performance integrated ISD/IRG apartment complex amplifier. In either the tap or in the home environment, the ISD/IRG will be substantially the same as in the prior applications filed Dec. 31, 1997 with the exception that the ADSL modem/lifeline will be replaced by a new cable modem/lifeline configuration. Accordingly, as with the prior applications, the cable modem includes a bypass mechanism whereby a lifeline support can bypass the cable modem and power the critical phone devices within the home. This can be configured substantially the same way as the lifeline bypassing the ADSL modem in the prior applications.

As an alternative embodiment, tap encapsulation of the cable modem will allow a single cable modem to support a plurality of different users such that it may be desirable to include in a cable television tap a cable TV based modem which supports multiple users. In this manner, a single ethernet interface/controller can control the ethernet connection up to as many as 8 different homes. Thereafter, each of the users in each of the different homes may utilize the ethernet connection to couple a cable modem to the home. In still further embodiments, where each of the individual users telephony and/or data is distributed over the cable network, it is desirable to encrypt this data to prevent each of the different users from having access to all other users' telephony and data. Thus, it may be desirable to also include an encrypter in the tap.

Currently, a cable modem requires approximately 10 watts of power consumption. This power consumption is extremely high for lifeline support and does not include the additional power consumption required by a IP telephony. Thus, in many embodiments lifeline support may require bypassing of the cable modem. In one embodiment which implements this aspect of the invention, the lowest 4 megahertz of the bandwidth from the tap to the home is allocated for lifeline support for the telephone. If the lowest 4 megahertz is allocated to lifeline support for the telephone with an associated voltage implied on this cable, it may be possible not to power the cable modem or to power only the portion of the cable modem such as the QAM modulator A to D converter down converter and television tuner necessary to modulate the 4 kilohertz bandwidth onto the upstream cable transmission path. One issue is that the splitters in the home or located proximate to the home need to be configured to pass the lower 4 kilohertz for lifeline telephony. Alternatively, the splitters may be configured as wide bandwidth splitters to include the lower 4 kilohertz for lifeline support. If we are running a lifeline POTS line in the lower 4 kilohertz, the tap may also be required to include a voltage converter to have about 48 volt power to the coax cable connection to the home. In one embodiment of the invention, in the low power mode, all of the NITUs, ISD/IRGs, nodes, taps, and/or hubs, go into a sleep cycle 50% of the time and only look for ringing or data on a periodic basis. Thus, they may either reduce the clock frequency to conserve power and/or operate only half the time. This is normally sufficient to process only voice data where the bandwidth is lower. In this manner, all of the power requirements on the entire system are substantially reduced in that the NIU/ISD/IRD is only wakened up when it is addressed. So it can be statistically managed such that if a highly unusual number of people on a particular node try and pick up the phone, the system can provide a warning to one or more users that the system is currently overloaded and all the circuits are busy and please try back later. In one aspect of the invention, if the user pushes 911 or another emergency number, this call will be given priority. A similar bandwidth allocation is also appropriate for those premises using IP telephony such that these services may also be handled on a statistical basis and if the bandwidth is exceeded, it could ask the user to try back later.

For lifeline support an alternative embodiment is to power a low bandwidth amplifier and provide a reduced operational mode whereby lifeline support is sent back at a low bandwidth 4 kilohertz provided over a cable system. One way for implementing this is for the taps, nodes and/or the hubs to detect when power has failed on a particular drop line and to implement a lifeline capability for that drop line whereby each telephone will be allocated a 4 kilohertz segment until power on that drop line came back online. In this manner, lifeline could be supported with minimal voltage provided to each of the telephones and power consumption. The power supply at the tap, node, hub and/or network interface unit may detect when power is eliminated or goes down and put itself into a power-down mode with reduced capabilities. The system is designed such that when power is restored, each of the calls are maintained by the individual ISDs/IRDs/head-end and then migrated over to the fill power protocol if the power returns.

In an alternate embodiment, one amplifier may be utilized to cover a smaller bandwidth than a broadband amplifier. Thus, the taps, nodes, and/or hubs may include a broadband amplifier and a narrow band amplifier. When a power failure occurs, life line is maintained by powering the low bandwidth amplifier. When power is returned, the system switches to the high bandwidth amplifier. Aspects of the invention include having the ISD/IRD and a call set-up server in the headend maintain the call as the system is switched from full power to low power operation and vice versa. Additionally, the ISD/IRD may all operate in a low power mode as discussed above.

The safety issue is currently solved by limiting the 90 volts to 20 milliamps downstream to the house. However, this may be undesirable where life line support is required. Alternatively, the tap may provide about 48 volts power to the home. This may be DC or AC power. Where AC power is provided, the ISD may also include a power supply for regulating the power to about 48 volts DC.

Figure 25:
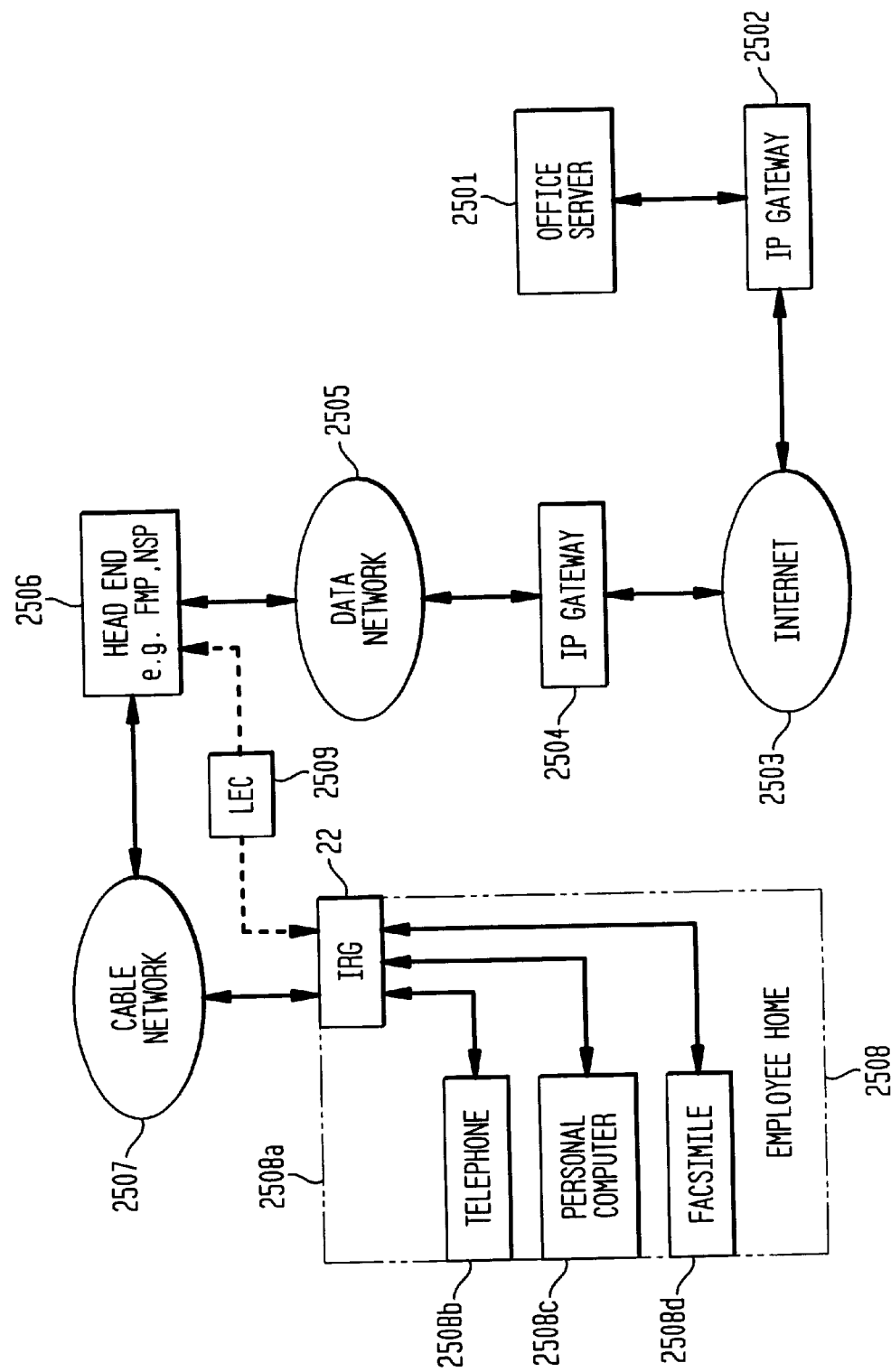
FIG. 25 shows an exemplary overall architecture on which corporate telecommuter features may be implemented.

The features available to telecommuters with the present invention will be described with reference to the illustrative embodiment shown in FIG. 25. FIG. 25 shows a simplified, overall architecture used with the illustrative embodiment. In this illustrative architecture, the employee's office server (2501) is connected to the Internet (2503) through an Internet Protocol (IP) gateway (2502). It will be understood that alternative connections are possible, and that the Internet may simply be any data network.

The Internet (2503) is also connected, through another IP gateway (2504), to a data network (2505). This data network (2505) is further connected to the service head end (2506). The service head end (2506) directs the use of the cable network (2507) that is used in the illustrative embodiment to provide various services and features to customers who are connected to the cable network. As described above, the cable network includes coaxial and/or fiber lines, taps, hubs, and nodes that to carry cable television signals to subscribers. As also previously described, this cable network has an amount of upstream bandwidth and a great amount of downstream bandwidth, and the present invention utilizes this bandwidth to carry out the various services herein described.

An employee's home 2508 is shown connected to the cable network (2507) through an integrated residence gateway ISD/IRG 22,2508a, which is also shown in FIG. 2 and described above. The ISD/IRG 22, 2508a is essentially responsible for coordinating the communication between various pieces of customer premises equipment (CPE) and the cable network 2507. In a further embodiment, the ISD/IRG 22,2508a can also be connected to the head end 2506 through a local exchange carrier LEC 2509. While not shown in FIG. 25, it is understood that the ISD/IRG (2508a) may also have other independent connections, such as twisted pair wire, to the cable network (2507), another data network and/or a telephone exchange. FIG. 25 shows three pieces of customer premises equipment, a telephone 2508b, a personal computer 2508c, and a facsimile machine 2508d. Additional pieces of CPE (such as extra telephones, televisions and videophones) are also possible, and the pieces of CPE need not all be located on the employee's property.

As a basic level of security when the employee is working at home, tunneling and encryption of data transmission can be used as discussed above. At the employee end, this tunneling and/or encryption can be performed at the ISD/IRG 2508*a* or within the specific piece of CPE that is transmitting/receiving the data. Where the ISD/IRG is located in the settop, the standard encryption engines disposed in this device can provide the secure tunneling to enable the user to communicate securely with his work place. The encrypted data is transmitted across the cable network 2507, head end 2506, data network 2505, IP gateways 2502 and 2504, and Internet 2503 in encrypted form, while the office server (2501) encrypts and decrypts at the other end.

As an additional level of security, data transmissions can be specifically addressed to the office server, the employee CPE, and/or the employee home ISD/IRG, denying access to any other address. Each ISD/IRG is individually addressable via the cable network (2507) by, for example, including packet header identification. FIG. 26 shows an exemplary overall packet structure which may be used on the cable network in the present invention. In the present embodiment, the head end 2506 and each ISD/IRG 2508*a* are each assigned a unique address on the cable network 2507. This unique address appears in the packet header and is used to route information on the cable network to a particular ISD/IRG or the head end. In addition to the cable network address, the packet structure also supports a local address which can be used by the addressed ISD/IRG 2508*a* to determine a specific CPE being addressed by the packet, as well as addressing and/or identification information for the sender of the packet. The sender addressing and/or identification can include the sender's cable network address, IP address, telephone number, name, or any other sequence of digits and/or characters that can identify the sender to the recipient of the packet.

This addressing information may also be recorded in the head end 2506, so that the head end is aware of the various pieces of CPE that are connected to each ISD/IRG 2508*a*. To keep this information up-to-date, the ISD/IRG 2508*a* may be programmed to send a message to the head end 2506 whenever a new CPE is connected to the ISD/IRG 2508*a*, or when a CPE is disconnected from the ISD/IRG 2508*a*.

In an alternate embodiment, the ISD/IRG 2508*a* and head end (2506) may assign codes to certain predefined categories of CPEs, such as "work phone" or "personal computer". This interface for assigning each piece of equipment a designation of either a work or home phone may be managed on the video phone. Thus once set, charges for a particular piece of equipment may be automatically reversed or charged to a third number such as a work number. FIG. 27 shows an exemplary table matching codes to equipment types. In FIG. 27, "work phone" is assigned code "10", and all incoming packets that are directed to a work phone will be locally addressed to "10". Thus, an incoming call to a work phone will be addressed to that phone and the actual phone number may be translated in the call set-up server in the head-end to a cable set-top address and associated device code as shown in FIG. 27. When the ISD/IRG 2508*a* receives this packet, it already knows if and where a "work phone" or "personal computer" is connected. In this manner, the sender of the packet (the head end) may not care whether such a CPE is actually connected. It simply sends the packet, which may be handled by the ISD/IRG using an error routine if no piece of equipment in the category is connected. The error routine may return an error to the originating equipment and inform the user via a suitable interface such as the vision phone of the attempted contact and the contents of the message, and the sender. Thus, where there is no up-to-date information as to the specific employee's work phone, e.g., where it is disconnected, the message may still go through. Additionally, the ISD/IRG may send a message back to the head end indicating that no such equipment is connected.

In addition to these security features, other features are also available. For example, telephone calls to the employee's office may be transparently, and with security, forwarded by the office server 2501 to a particular telephone 2508*b* within the employee's home so that the home phone is rung along with, or instead of, the office phone. Also, a voice (or data) messaging system, such as voicemail (or email) may reside on, or be accessed by, the office server 2501. The messages handled by the messaging system would automatically be forwarded to and from the employee's ISD/IRG and/or CPE (such as telephone or computer).

As a further embodiment, the employee may have several phones in the home, but may only wish to receive work related phone calls on one of these phones. In this situation, the employee may designate one (or more) phones within the home as "work" phones. When an incoming call arrives at the ISD/IRG 2508*a*, the ISD/IRG is able to discern whether the call is from the office server 2501 (for example, by inspecting packet header information) and if so, the ISD/IRG will only ring the "work" phones. As an even further embodiment, the office server 2501 may be configured to forward telephone call signals to the specific address of the employee's work phone, or to the predefined "work phone" code. In this manner, the employee will know if the call is originating from one of his colleagues at work or from an outside line. Where caller 1D is available, this information will be forwarded with the call.

Other features stem from the ability of the head end (2506) and ISD/IRG (2508*a*) to dynamically allocate the upstream and downstream bandwidth that is available on the cable network (2507). The bandwidth available on the cable network (2507) is far greater than the bandwidth available on a single twisted pair wire, and with this greater bandwidth, it is possible for the employee's CPE/ISD/IRG to communicate with the office as if the employee's CPE/ISD/IRG were located within the office. Billing, conferencing, accounting, directories, voice mail, make busy, status, autodial, and other features are duplicated and integrated on the home phone via sharing of information.

The dynamic bandwidth allocation allows a number of service alternatives. As traffic increases on the cable network, so does demand for network bandwidth, resulting in delay in data transmission. FIGS. 28*a–d* show an example of how the cable network bandwidth may be dynamically reallocated. In FIG. 28*a*, five ISD/IRGs share a certain range of available bandwidth. As more and more users access the cable network through their ISD/IRGs, the bandwidth becomes more crowded, as shown in FIG. 28*b*, and each ISD/IRG is allowed less bandwidth for transmissions. An additional feature will allow corporate telecommuters to purchase "dedicated bandwidth", in which a certain amount of bandwidth is guaranteed to be available for the corporate telecommuter. Thus, during peak leisure periods (when the cable network may be heavily loaded by casual movie watchers, game players, and "web surfers", for example), the employee's connection to the office would remain unaffected. Thus, for corporate telecommuters, the present system uses the dynamic bandwidth allocation discussed herein to guarantee a minimum bandwidth to the telecommuters.

One exemplary embodiment of this scheme is shown in FIGS. 28c–d. In FIG. 28c, four ISD/IRGs share a range of available bandwidth, with the employee represented as "ISD/IRG 1". As additional users access the cable network ("ISD/IRG 5" and "ISD/IRG 6"), the bandwidth previously used by ISD/IRG 2, ISD/IRG 3, and ISD/IRG 4 is scaled back. The employee at ISD/IRG 1, however, has purchased dedicated bandwidth and as such, his or her bandwidth allocation remains unchanged.

As a further embodiment, other options (or tiers) of bandwidth service are also available. For example, customers who purchase the lower, "casual", tier of service may have a lower priority in bandwidth usage. Thus, when traffic begins to increase, the head end 2506 may send instructions to the ISD/IRGs who subscribe to the casual tier of service, instructing these ISD/IRGs to modify or temporarily cease their usage of certain bandwidth frequencies. An example of such a modification would be to require two or more "casual" subscribers to share certain frequencies through multiplexing during peak periods. These "lower class" users are the first to sacrifice bandwidth when traffic increases. When usage settles down, the head end 2506 may send another message reallocating bandwidth to the ISD/IRGs. A wide range of services and priorities is thus possible by using the dynamic allocation of the available bandwidth.

As yet a further embodiment, advanced billing options are implemented for the telecommuter. For example, a telecommuter working from home will typically begin the day by placing a call to the office and/or office server 2501. Under normal circumstances, the cost of outgoing calls are billed to the caller. However, many employers choose to reimburse employees for such expenses. The reimbursement process may involve extra paperwork and/or a time delay in reimbursement, and is generally inconvenient. The advanced billing options mentioned above and described below would directly bill the employer for the costs incurred by the employee while working from home.

Figure 29:
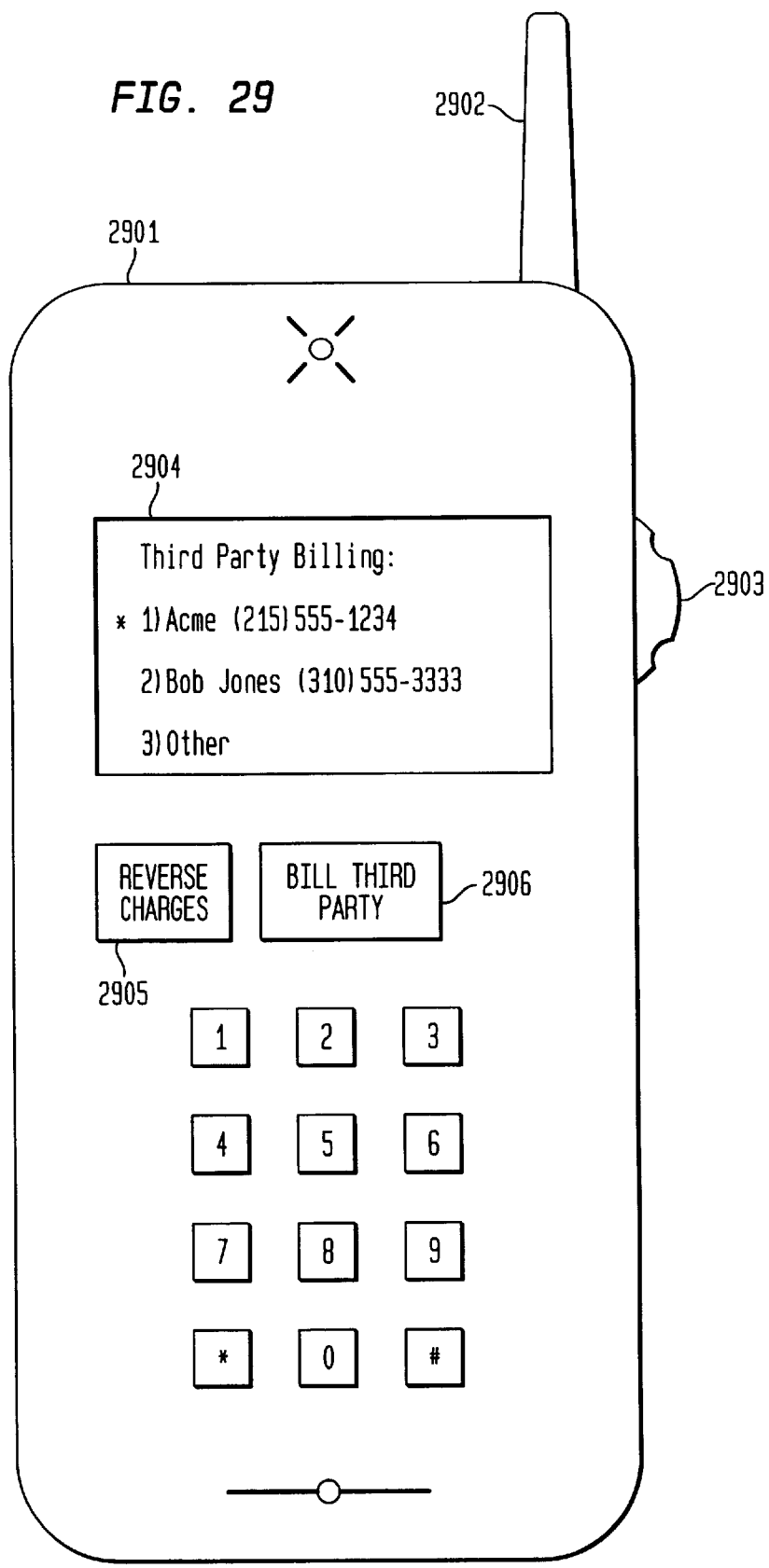
FIG. 29 shows an exemplary telephone of the present invention.
Figure 30:
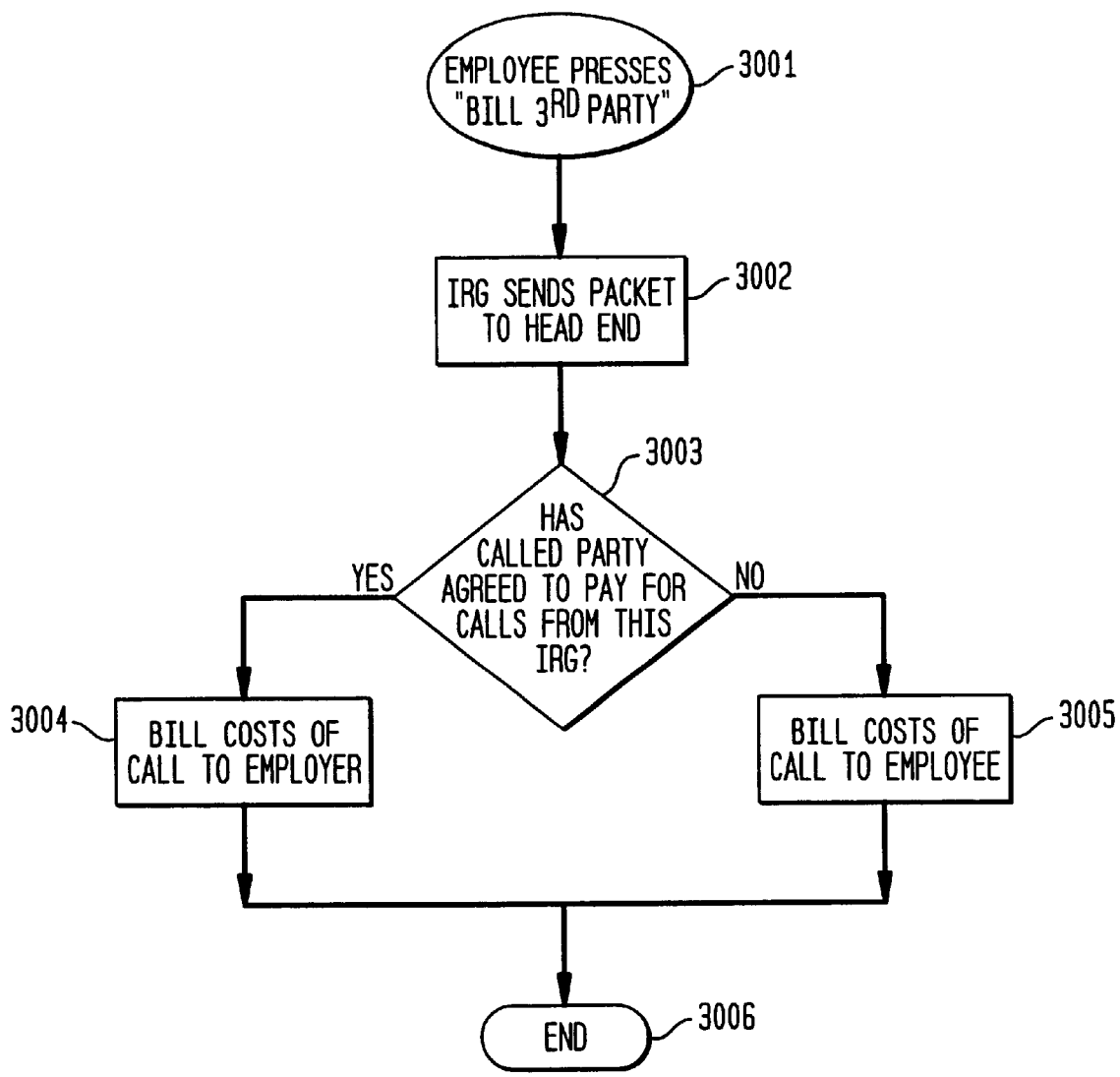
FIG. 30 is a flow diagram illustrating an exemplary process that occurs when the "Reverse Charges" button on the telephone in FIG. 29 is pressed.

In an exemplary embodiment, the telephone pictured in FIG. 29 is used by the employee. While the telephone in FIG. 29 is cordless, and includes an antenna 2902, the telephone does not need to be cordless. When the employee places a telephone call for work-related purposes, he or she can simply press the "bill 3$^{rd}$ party" button 2906 to have the cost of the call billed to another party, e.g., an employer. FIG. 30 shows a flowchart for what occurs next.

In step 3001, the ISD/IRG 2508a that handles the telephone 2901 receives an indication from the telephone 2901 that the "Bill third party" button (2906) has been pressed. In step 3002, the ISD/IRG prepares a packet containing the address of employee's ISD/IRG and/or the address of the particular third party proposed to be billed. In step 3003, the head end consults a transfer billing database to determine whether the employer (or any other party) has agreed to pay for calls from the employee's ISD/IRG and/or particular CPE to the employer. An exemplary embodiment of the database is shown in FIG. 31. This third party billing database may simply contain a list of persons or entities (such as businesses) who have agreed to pay for certain incoming calls, as well as a list for each such person or entity of the particular ISD/IRGs and/or CPEs for which reverse billing is authorized. This database may also contain additional restrictions regarding the calls for which the employer will pay. For example, the database may indicate that the employer will only pay for calls made during certain periods of the day, or on certain days of the week and exclude certain long distance calls (perhaps overseas) and 900 calls. The employer might also only agree to pay for calls that are of a certain duration.

In the exemplary reverse billing database shown in FIG. 31, the employer's database entry has two listings. First, the employer (at number 301 555-1223) has agreed to pay the charges for calls placed from (301) 555-4444 to the employer's number, between 9 am and 5 pm Monday through Friday, and will only pay for the first 15 minutes of such calls. Cable network and/or CPE addresses may also be used in the database to, for example, only allow calls from the employee's work phone. The second entry shown in FIG. 31 indicates that all calls placed to the employer from (301) 555-3774 will be billed to the third party, whose number is (202) 555-9933.

In alternative embodiments, the employee is required to enter a password or personal identification number (PIN) that is transmitted to the head end, and the head end may authenticate the password or PIN entered by the employee or transmit this information to the employer for verification. This password or PIN could be used to verify the identity of the person placing the call. Alternatively, the PIN could be include and/or replaced by an accounting number. For example, the employee may be given the option to enter additional digits and/or characters to identify, to the employer, the purpose of the call. These additional digits may be client numbers, matter numbers, file numbers, etc. This additional information may be included in the bill to help the employer when paying the bill. As a further embodiment, the additional information can be used by the employer and/or the head end to verify the reversed charge. For example, the database may include a list of client numbers for which the employee may call the employer.

If the employer has agreed to pay for the incoming call, then the process moves to step 3004, where the call is billed to the employer. On the other hand, if the employer has not agreed to pay (no entry in database, wrong time, wrong ISD/IRG, wrong CPE, etc.), then the cost of the call will be billed, in step 3005, to the maker of the call, in this case, the employee. The process then concludes in step 3006.

The description above relates to an employee calling an employer, but the present invention is not limited to such situations. Any called party may agree to pay for incoming calls from certain individuals, ISD/IRGs, and/or CPEs and thus the reverse calling button on the phone may be utilized for this purpose. Thus, there is no need for 800 number service if the reverse calling button is included on the phone. In non-vision phone environments, the  key or other key may be used for a reverse calling (toll free) number as a universal number. This feature helps create further "vanity numbers" which are toll free rather than just 800 numbers. For example, the add may say call toll free "GoForIt-Now". In this manner, the user may automatically reverse the call charges by using a universal preamble to the normal number. This opens up the realm of toll free numbers to a vast selection of vanity numbers. As discussed above, as an alternative to the **, the reverse charges button may be used.

In a further embodiment, third parties may agree to pay for calls from a calling party to a called party. In this situation, and as shown by the second entry in FIG. 31, the database entry for the called party would simply identify the third party as the party to be billed for the call.

While the description above describes the database as being resident at the head end, it is also possible that the database will reside at the employee's ISD/IRG. In such a situation, the emloyee's ISD/IRG would perform step 3003 to determine whether the called party, or any other third party, has agreed to pay for the call. In this situation, it is preferred for the ISD/IRG to have security features (such as encryption, physical security, or other security features employed in conventional set-top boxes) to prevent alteration and fraud by the end user.

Figure 33:
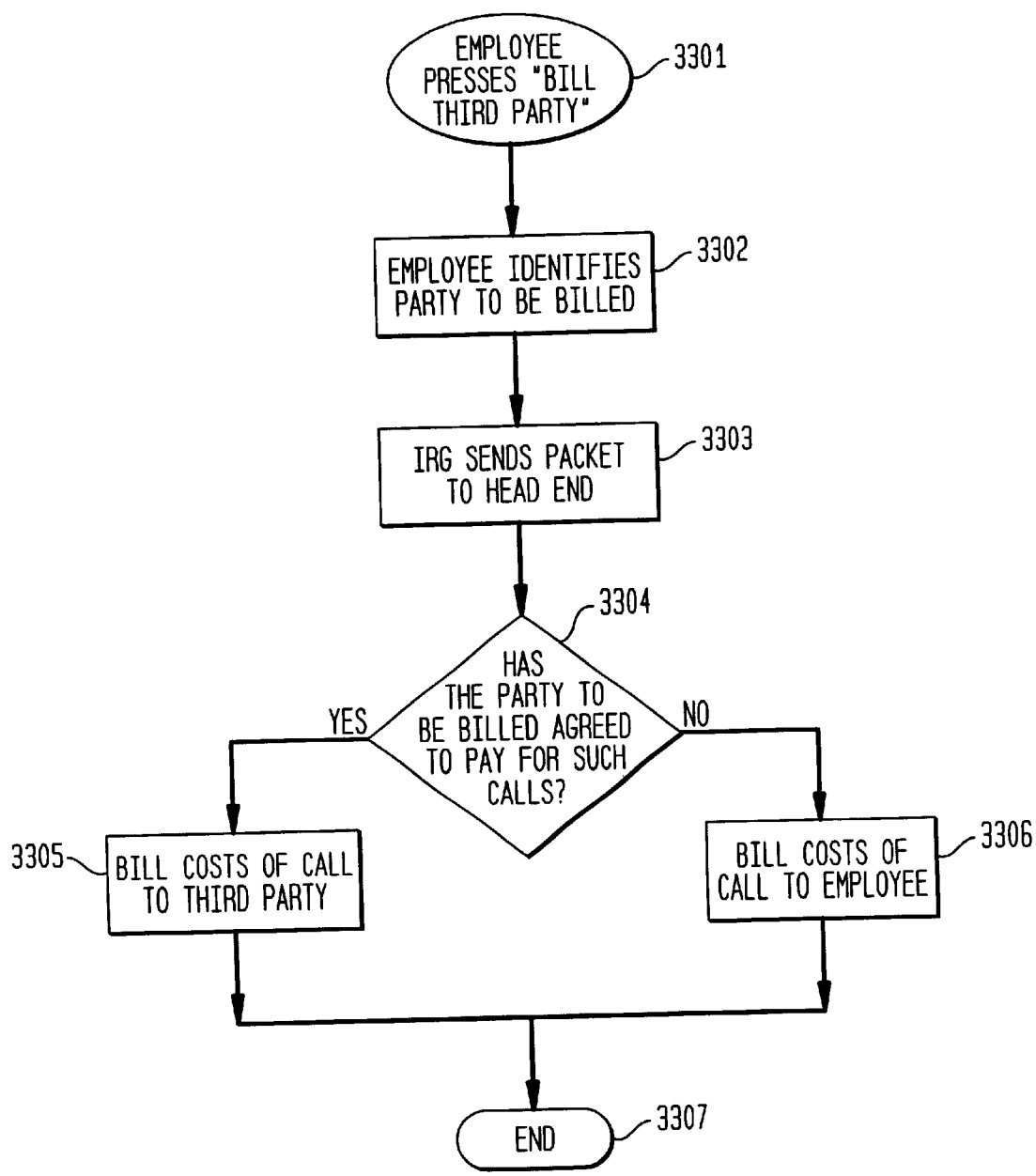
FIG. 33 is a flow diagram illustrating an exemplary process that occurs when the "Bill 3rd Party" button on the telephone in FIG. 29 is pressed.

As a second embodiment of the third party billing, the employee may press the "bill $3^{rd}$ party" button 2905 on the telephone 2901. When this button is pressed, the process shown in FIG. 33 occurs. In step 3302, the employee needs to identify the third party to be billed. The telephone screen 2904 may present the employee with a predefined list of third parties who pay for calls, as shown in FIG. 29. The employee uses the thumbwheel switch 2903 to scroll through the list, and pressing the "Bill 3rd Party" button 2906 again will select the highlighted party. If the employee highlights the "Other" option in the list, the employee will be required to enter a series of digits and/or characters to identify the third party that the employee would like to bill for the call. When a third party is identified, information regarding the call and the third party is sent to the head end in step 3303. Then, in step 3304, a second database is consulted to determine whether the third party has agreed to pay for calls such as the current one. This second database contains a listing of third parties who have agreed to pay for calls, along with information identifying the types of calls for which they have agreed to pay. The second database is similar to the reverse billing database, contains some overlapping information, and may be stored in the same location as the reverse billing database. Alternatively, the two databases may be stored together as a single database.

If the second database indicates that the third party will pay for the call, then the cost of the call will be billed to the third party in step 3305. As with the reverse billing database, the third party may have indicated certain conditions and restrictions regarding the types and duration of calls for which it will pay. If the current call will not be paid for by the selected third party, then the cost of the call will simply be billed to the employee placing the call. In this event the employee will be notified of the rejected charges. In either case, the process ends in step 3307.

Figure 32:
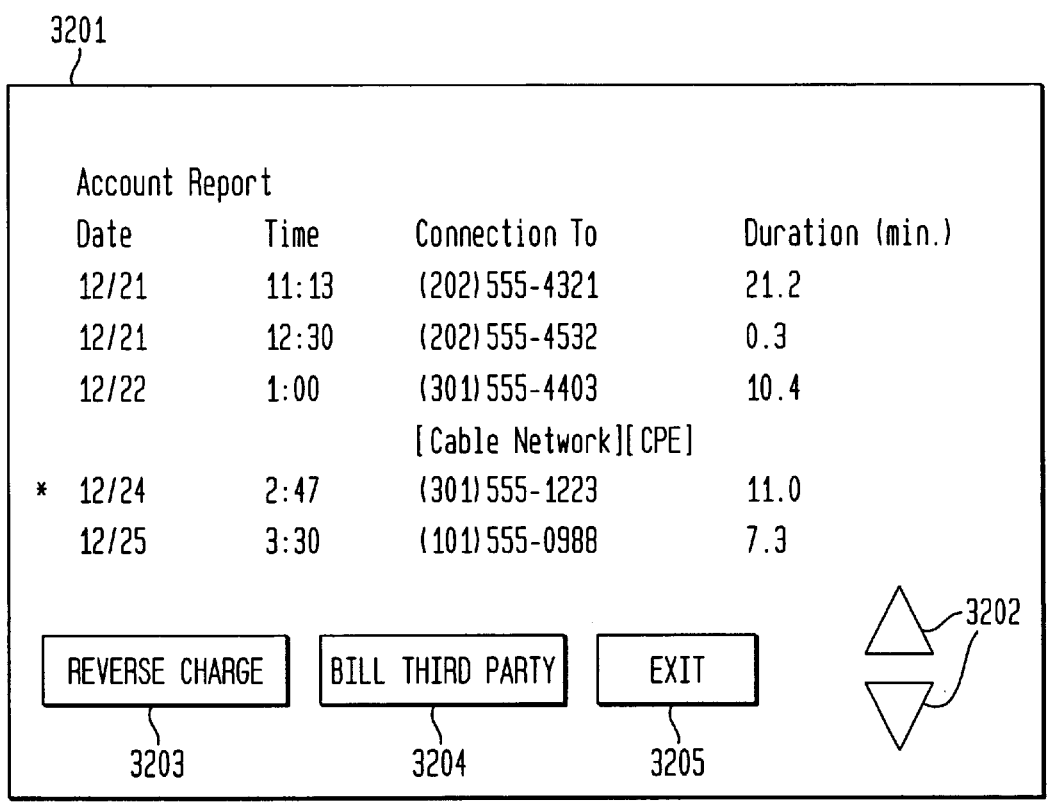
FIG. 32 shows an exemplary user interface for redirection of connection charges.

In a further embodiment, the employee may reverse charges or bill third parties after the call is completed. The head end and/or ISD/IRG records information regarding calls that have not yet been billed. Using a personal computer 2508c, video phone, handset, and/or set-top enabled video phone that is communicatively connected to the employee's ISD/IRG 2508a, the employee can access this information. An exemplary interface used by the employee for this purpose is shown in FIG. 32. In FIG. 32, a number of unbilled connections are listed. The listing includes the date, time, the number and/or cable network address connected to, and the duration of the connection. Using the onscreen arrow keys (3202), the employee can scroll through the list of unbilled calls and highlight an entry. In FIG. 32, the fourth entry is highlighted. If the employee then presses either the "Reverse Charge" 3203 or "Bill 3rd Party" 3204 buttons with an entry highlighted, a process similar to that described above will occur. The appropriate database will be consulted to determine whether the called party or a third party has agreed to pay the charge for the call, and if so, the cost of the call will be removed from the employee's bill and added to the called party or third party who has agreed to pay for such calls.

The preceding discussion described an employee who was using a personal computer to adjust billing after call completion. In an alternate embodiment, the employee may choose instead to use a visionphone, such as that shown in FIG. 3a and described above, to adjust the billing. In another embodiment, the employee may adjust the billing using a set-top box and television set, as described above, where the interface appears on the television screen.

In yet a further embodiment, the employee may designate a particular phone in the employee's home to be a "work" phone, and all calls placed from the "work" phone are automatically billed to the employer. In this manner, the employee does not need to press the "Reverse Charges" 2905 or "Bill 3rd Party" 2906 buttons to redirect the billing. Instead, the ISD/IRG and/or head end is simply configured to bill the employer for all calls originating from the particular CPE address of the work phone.

In still a further embodiment, the database and software necessary for managing the database described above are stored as a user profile for the employee. This user profile can "follow" the employee to different locations. For example, if the employee wishes to set up a temporary office in another location, the employee can receive the same services described above by simply downloading the user profile into the second location's ISD/IRG. This may be done by a smart card and/or by simply transporting the ISD/IRG such as the settop. Alternatively, the employee may simply contact the head end 2506 and register the second location as a temporary equivalent to the employee's home, identifying the pieces of CPE connected to the second location's ISD/IRG that will be used by the employee. The head end may then download the necessary database information to the second location's ISD/IRG. This information may be stored in a database or uploaded from the individual user's ISD/IRG. Also, the head end may then contact the second location's ISD/IRG to determine which pieces of equipment located at the second location will be used by the employee. The head end may also enter a temporary entry into its own database to reflect the employee's temporary office.

In addition to the above features, the present invention also supports the various features described in "Network Server Platform Based WAN Interconnectivity for Telecommuting", U.S. application Ser. No. 09/001,540, filed Dec. 31, 1997, which is herein incorporated by reference, through the use of the cable network.

The following applications are hereby incorporated by reference:
1. A Hybrid Fiber Twisted-pair Local Loop Network Service Architecture, U.S. application Ser. No. 09/001,360, filed Dec. 31, 1997;
2. Dynamic Bandwidth Allocation for use in the Hybrid Fiber Twisted-pair Local Loop Network Service Architecture, U.S. application Ser. No. 09/001,425, filed Dec. 31, 1997;
3. The VideoPhone, U.S. application Ser. No. 09/001,905, filed Dec. 31, 1997;
4. VideoPhone Privacy Activator, U.S. application Ser. No. 09/001,909, filed Dec. 31, 1997;
5. VideoPhone Form Factor, U.S. application Ser. No. 09/001,583 filed Dec. 31, 1997;
6. VideoPhone Centrally Controlled User Interface With User Selectable Options, U.S. application Ser. No. 09/001,576, filed Dec. 31, 1997;
7. VideoPhone User Interface Having Multiple Menu Hierarchies, U.S. application Ser. No. 09/001,908, filed Dec. 31, 1997;
8. VideoPhone Blocker, U.S. Pat. No. 5,949,474, issued on Sep. 7, 1999;
9. VideoPhone Inter-com For Extension Phones, U.S. application Ser. No. 09/001,358, filed Dec. 31, 1997;
10. Advertising Screen Saver, U.S. Pat. No. 6,084,583, issued on Jul. 4, 2000;

11. VideoPhone FlexiView Advertising Information Display for Visual Communication Device, U.S. Pat. No. 6,222,520, issued on Apr. 24, 2001;
12. VideoPhone Multimedia Announcement Answering Machine, U.S. application Ser. No. 09/001,911, filed Dec. 31, 1997;
13. VideoPhone Multimedia Announcement Message Toolkit, U.S. application Ser. No. 09/001,345, filed Dec. 31, 1997;
14. VideoPhone Multimedia Video Message Reception, U.S. application Ser. No. 09/001,362, filed Dec. 31, 1997;
15. VideoPhone Multimedia Interactive Corporate Menu Answering Machine U.S. Pat. No. 6,226,362, issued on May 1, 2001; Announcement,
16. VideoPhone Multimedia Interactive On-Hold Information Menus, U.S. Pat. No. 6,020,916, issued on Feb. 1, 2000;
17. VideoPhone Advertisement When Calling Video Non-enabled VideoPhone Users, U.S. application Ser. No. 09/001,361, filed Dec. 31, 1997;
18. Motion Detection Advertising, U.S. application Ser. No. 09/001,355, filed Dec. 31, 1997;
19. Interactive Commercials, U.S. Pat. No. 6,178,446, issued on Jan. 23, 2001;
20. Video communication device providing in-home Catalogue Services, U.S. Pat. No. 5,970,473, issued on Oct. 19, 1999;
21. A Facilities Management Platform For Hybrid Fiber Twisted-pair Local Loop Network, Service Architecture, U.S. application Ser. No. 09/001,422, filed Dec. 31, 1997;
22. Life Line Support for Multiple Service Access on Single Twisted-pair, U.S. application Ser. No. 09/001,343, filed Dec. 31, 1997;
23. A Network Server Platform (NSP) For a Hybrid Fiber Twisted-pair (HFTP) Local Loop Network Service Architecture, U.S. Pat. No. 6,229,810, issued on May 8, 2001;
24. A Communication Server Apparatus For Interactive Commercial Service, U.S. application Ser. No. 09/001,344, filed Dec. 31, 1997;
25. NSP Multicast, PPV Server NSP Based Multicast Digital Program Delivery Services, U.S. application Ser. No. 09/001,580, filed Dec. 31, 1997;
26. NSP Internet, JAVA Server and VideoPhone application Server, U.S. Pat. No. 6,044,403, issued on Mar. 28, 2000;
27. NSP WAN Interconnectivity Services for Corporate Telecommuters Telecommuting, U.S. application Ser. No. 09/001,540, filed Dec. 31, 1997;
28. NSP Telephone Directory White-Yellow Page Services, U.S. Pat. No. 6,052,439, issued on Apr. 18, 2000;
29. NSP Integrated Billing System For NSP services and Telephone services, U.S. application Ser. No. 09/001,359, filed Dec. 31, 1997;
30. Network Server Platform/Facility Management Platform Caching Server, U.S. application Ser. No. 09/001,419, filed Dec. 31, 1997;
31. An Integrated Services Director (ISD) Overall Architecture, U.S. application Ser. No. 09/001,417, filed Dec. 31, 1997;
32. ISD/VideoPhone (Customer Premises) Local House Network, U.S. application Ser. No. 09/001,418, filed Dec. 31, 1997;
33. ISD Wireless Network, U.S. application Ser. No. 09/001,363, filed Dec. 31, 1997;
34. ISD Controlled Set-Top Box, U.S. application Ser. No. 09/001,424, filed Dec. 31, 1997;
35. Integrated Remote Control and Phone, U.S. application Ser. No. 09/001,423, filed Dec. 31, 1997;
36. Integrated Remote Control and Phone User Interface, U.S. application Ser. No. 09/001,420, filed Dec. 31, 1997;
37. Integrated Remote Control and Phone Form Factor, U.S. application Ser. No. 09/001,910, filed Dec. 31, 1997;
38. VideoPhone Mail Machine, U.S. application Ser. No. 60/070,104, filed Dec. 31, 1997;
39. Restaurant Ordering Via VideoPhone, U.S. application Ser. No. 60/070,121, filed Dec. 31, 1997;
40. Ticket Ordering Via VideoPhone, U.S. application Ser. No. 09/218,171, filed Dec. 31, 1997;
41. Multi-Channel Parallel/Ser. Concatenated Convolutional Codes And Trellis Coded Modulation Encode/Decoder, U.S. Pat. No. 6,088,387, issued on Jul. 11, 2000;
42. Spread Spectrum Bit Allocation Algorithm, U.S. application Ser. No. 09/001,842, filed Dec. 31, 1997;
43. Digital Channelizer With Arbitrary Output Frequency, U.S. application Ser. No. 09/001,581, filed Dec. 31, 1997;
44. Method And Apparatus For Allocating Data Via Discrete Multiple Tones, U.S. Pat. No. 6,134,274, issued on Oct. 17, 2000;
45. Method And Apparatus For Reducing Near-End Cross Talk In Discrete Multi-Tone Modulators/Demodulators, U.S. application Ser. No. 08/997,176, filed Dec. 23, 1997;

In addition, the following two earlier filed patent applications are hereby incorporated by reference:

1. U.S. Pat. No. 6,061,326 issued on May 9, 2000, entitled Wideband Communication System for the Home, to Robert R. Miller, II and Jesse E. Russell, and
2. U.S. Pat. No. 6,111,895 issued on Aug. 29, 2000, entitled Wide Band Transmission Through Wire, to Robert R. Miller, II, Jesse E. Russell and Richard R. Shively.

The following patent applications are related by subject matter and are concurrently filed herewith (the seventh listed application being the present application), and hereby incorporated by reference:

1. U.S. application Ser. No. 09/224,283, entitled "Coaxial Cable/Twisted Pair Cable Telecommunications Network Architecture" of Gerszberg et al.
2. U.S. application Ser. No. 09/224,286, entitled "Set Top Integrated Visionphone User Interface Having Multiple Menu Hierarchies" of Gerszberg et al.
3. U.S. application Ser. No. 09/224,281, entitled "Coaxial Cable/Twisted Pair Fed, Integrated Residence Gateway Controlled, Set-top Box" of Gerszberg et al.
4. U.S. application Ser. No. 09/224,285, entitled "A Network Server Platform (NSP) for a Hybrid Coaxial/Twisted Pair Local Loop Network Service Architecture" of Gerszberg et al.
5. U.S. application Ser. No. 09/224,287, entitled "A Facilities Management Platform for a Hybrid Coaxial/Twisted Pair Local Loop Network Service Architecture" of Gerszberg et al.
6. U.S. application Ser. No. 09/224,290, entitled "Intercom for Extension Phones Using an ISD in a Cable Environment" of Gerszberg et al.
7. U.S. application Ser. No. 09/224,288, entitled "Video Phone Multimedia Video Message Reception" of Gerszberg et al.
8. U.S. application Ser. No. 09/224,284, entitled "Cable Connected NSP for Telephone White-Yellow Page Services and Emergency 911 Location Identification" of Gerszberg et al.
9. U.S. application Ser. No. 09/224,282, entitled "A Network Server Platform for Providing Integrated Billing for CATV, Internet, Telephony and Enhanced Bandwidth Services" of Gerszberg et al.

10. U.S. application Ser. No. 09/224,289, entitled "Method and Apparatus for Providing Uninterrupted Service in a Hybrid Fiber Coaxial System" by Gerszberg et al.

11. U.S. application Ser. No.09/224,276, entitled "Lifeline Service for HFCLA Network Using Wireless ISD" of Gerszberg et al.

We claim:

1. A method for allowing an employee to access an employer's office network to work from home, comprising the steps of:

responsive to receiving outgoing data signals from one or more pieces of equipment associated with the employee's home, an integrated residence gateway converting said outgoing data signals into outgoing packets and transmitting said outgoing packets to a head end via a cable network;

responsive to receiving said outgoing packets, said head end transmitting said outgoing packets to said office network;

responsive to receiving incoming packets from said office network, said head end transmitting said incoming packets to said integrated residence gateway;

responsive to receiving said incoming packets, said integrated residence gateway converting said incoming packets into incoming data signals, and distributing said incoming data signals to one or more of said pieces of equipment, wherein the transmission of said incoming and outgoing packets forms a data connection between the employee's integrated residence gateway and the office network, further comprising the steps of:

receiving a request from the employee to reverse the charges for the data connection;

consulting a database to determine whether the employer has agreed to pay for the data connection; and billing said employer, and not the employee, for the cost of the data connection.

2. The method of claim 1, further comprising the steps of said integrated residence gateway transmitting data to and receiving data from said head end via a local exchange carrier.

3. The method of claim 1, wherein said steps of conversion further include encryption and decryption of the data to be transmitted.

4. The method of claim 1, wherein said incoming and outgoing data signals include signals for a telephone call.

5. The method of claim 4, further comprising the steps of:

responsive to receiving incoming telephone signals for said employee, said office network converting said incoming telephone signals to said incoming packets and transmitting said incoming packets to said head end.

6. The method of claim 5, wherein said incoming packets are addressed to a specific telephone that is connected to said integrated residence gateway.

7. The method of claim 1, wherein said incoming packets are addressed to said integrated residence gateway.

8. The method of claim 7, wherein said incoming packets are further addressed to a particular piece of equipment connected to said integrated residence gateway.

9. The method of claim 7, wherein said incoming packets are further addressed to a particular category of equipment that could be connected to said integrated residence gateway.

10. The method of claim 7, further comprising the step of automatically keeping the head end up-to-date regarding the active pieces of equipment connected to said integrated residence gateway by transmitting messages to said head-end.

11. The method of claim 1, further comprising the step of dynamically allocating the bandwidth on said cable network among customers connected to said cable network based on level of service purchased by said customers.

12. The method of claim 11, wherein said step of dynamically allocating the bandwidth on said cable network does not affect the bandwidth allocated to customers who have purchased dedicated bandwidth.

13. A method for allowing an employee to access an employer's office network to work from home, comprising the steps of:

responsive to receiving outgoing data signals from one or more pieces of equipment associated with the employee's home, an integrated residence gateway converting said outgoing data signals into outgoing packets and transmitting said outgoing packets to a head end via a cable network;

responsive to receiving said outgoing packets, said head end transmitting said outgoing packets to said office network;

responsive to receiving incoming packets from said office network, said head end transmitting said incoming packets to said integrated residence gateway;

responsive to receiving said incoming packets, said integrated residence gateway converting said incoming packets into incoming data signals, and distributing said incoming data signals to one or more of said pieces of equipment, wherein the transmission of said incoming and outgoing packets forms a data connection between the employee's integrated residence gateway and the office network;

determining that the data connection is for purposes of allowing the employee to work from home;

billing the employer, and not the employee, for the cost of the data connection;

receiving a signal from said employee indicating that said employee wishes to connect to said office network from a second location that is not the employee's home;

responsive to receiving said signal, establishing a second data connection between said office network and said second location; and billing the cost of said second data connection to said employer.

* * * * *